(12) United States Patent
Nakagami et al.

(10) Patent No.: US 9,924,189 B2
(45) Date of Patent: Mar. 20, 2018

(54) IMAGE PROCESSING DEVICE AND METHOD

(71) Applicant: SONY CORPORATION, Tokyo (JP)

(72) Inventors: Ohji Nakagami, Tokyo (JP); Yoshitomo Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 230 days.

(21) Appl. No.: 14/422,858

(22) PCT Filed: Sep. 19, 2013

(86) PCT No.: PCT/JP2013/075294
§ 371 (c)(1),
(2) Date: Feb. 20, 2015

(87) PCT Pub. No.: WO2014/050695
PCT Pub. Date: Apr. 3, 2014

(65) Prior Publication Data
US 2015/0229945 A1    Aug. 13, 2015

(30) Foreign Application Priority Data

Sep. 28, 2012 (JP) .................................. 2012-218306
Mar. 4, 2013 (JP) .................................. 2013-041903
Jun. 27, 2013 (JP) .................................. 2013-134839

(51) Int. Cl.
*H04B 1/66* (2006.01)
*H04N 19/513* (2014.01)
(Continued)

(52) U.S. Cl.
CPC ......... *H04N 19/513* (2014.11); *H04N 19/137* (2014.11); *H04N 19/436* (2014.11);
(Continued)

(58) Field of Classification Search
CPC ...................................................... H04N 19/57
(Continued)

(56) References Cited

U.S. PATENT DOCUMENTS

2008/0172384 A1* 7/2008 Cai ..................... G06T 7/2026
2010/0110302 A1 5/2010 Yokoyama
(Continued)

FOREIGN PATENT DOCUMENTS

CN 101282478 A 10/2008
CN 101917619 A 12/2010
(Continued)

OTHER PUBLICATIONS

International Search Report dated Nov. 5, 2013 in PCT/JP2013/075294.
(Continued)

*Primary Examiner* — Jamie Atala
*Assistant Examiner* — Fabio Lima
(74) *Attorney, Agent, or Firm* — Oblon, McClelland, Maier & Neustadt, L.L.P.

(57) ABSTRACT

An image processing device including a reception section configured to receive an encoded stream set in syntax of the encoded stream in which motion vector (MV) range limit information is encoded in units in which image data have a hierarchical structure and the MV range limit information, the MV range limit information being information about a limit of a value of a vertical direction of an MV for referring to a view different from a view of a current block in an inter-view MV corresponding to the current block, and a decoding section configured to decode the encoded stream received by the reception section using the MV range limit information received by the reception section.

13 Claims, 63 Drawing Sheets

(51) Int. Cl.

| | | |
|---|---|---|
| *H04N 19/597* | (2014.01) | |
| *H04N 19/70* | (2014.01) | |
| *H04N 19/436* | (2014.01) | |
| *H04N 19/55* | (2014.01) | |
| *H04N 19/137* | (2014.01) | |
| *H04N 19/44* | (2014.01) | |
| *H04N 19/46* | (2014.01) | |
| *H04N 21/218* | (2011.01) | |

(52) U.S. Cl.
CPC ............. *H04N 19/44* (2014.11); *H04N 19/46* (2014.11); *H04N 19/55* (2014.11); *H04N 19/597* (2014.11); *H04N 19/70* (2014.11); *H04N 21/21805* (2013.01)

(58) Field of Classification Search
USPC ...................................................... 375/240.16
See application file for complete search history.

(56) References Cited

U.S. PATENT DOCUMENTS

| 2010/0208796 A1* | 8/2010 | Luo ....................... H04N 19/597 375/240.02 |
| 2013/0114689 A1* | 5/2013 | Chang ................... H04N 19/597 375/240.03 |
| 2013/0182755 A1* | 7/2013 | Chen ....................... H04N 19/70 375/240.01 |
| 2013/0251038 A1* | 9/2013 | Yokoyama ........... H04N 19/176 375/240.13 |
| 2014/0133567 A1* | 5/2014 | Rusanovskyy ...... H04N 19/597 375/240.16 |
| 2014/0192876 A1* | 7/2014 | Yie ....................... H04N 19/176 375/240.12 |
| 2015/0201215 A1* | 7/2015 | Chen .................... H04N 19/597 348/42 |
| 2015/0237365 A1* | 8/2015 | Takahashi ............ H04N 19/513 375/240.16 |

FOREIGN PATENT DOCUMENTS

| JP | 2002-245451 A | 8/2002 |
| JP | 2010-541470 A | 12/2010 |
| WO | WO 2012/017858 A1 | 2/2012 |

OTHER PUBLICATIONS

Ohji Nakagami, et al., "MV-HEVC: Vertical length restriciton of inter-view vector for HEVC simple 3D extension" Joint Collaborative Team on 3D Video Coding Extension Development of ITU-T SG 16 WP 3 and ISO/IEC JTC 1/SC 29/WG 11, JCT3V-B0037_rl, Oct. 2012, pp. 1-7.

Ying Chen, et al., "View scalability information SEI message for MVC" Joint Video Team (JVT) of ISO/IEC MPEG & ITU-T VCEG (ISO/IEC JTC1/SC29/WG11 and ITU-T SG16 Q.6), JVT-W037, Apr. 2007, pp. 1-10.

P. Yang, et al., "View Parallel Processing on MVC" Joint Video Team (JVT) of ISO/IEC MPEG & ITU-T VCEG (ISO/IEC JTC1/SC29/WG11 and ITU-T SG16 Q.6), JVT-W077, Apr. 2007, pp. 1-10.

Tadashi Uchiumi et al., "3D-CE5.h related: Restricted motion vector coding for inter-view prediction" Joint Collaborative Team on 3D Video Coding Extension Development of ITU-T SG 16 WP 3 and ISO/IEC JTC 1/SC 29/WG 11, JCT3V-B0113, Oct. 2012, pp. 1-4.

Benjamin Bross, et al., "High Efficiency video coding (HEVC text specification draft 8" Joint Collaborative Team on Video Coding (JCT-VC) of ITU-T SG16 WP3 and ISO/IEC JTC1/SC29/WG11, JCTVC-J1003_d7, Jul. 2012, 261 Pages.

Extended European Search Report dated Apr. 21, 2016 in Patent Application No. 13842989.9.

Wei Zhu, et al., "Fast Disparity Estimation Using Spatio-Temporal Correlation of Disparity Field for Multiview Video Coding" IEEE Transactions on Consumer Electronics, vol. 56, No. 2, XP011312762, May 1, 2010, pp. 957-964.

Anthony Vetro, et al., "Joint Draft 8.0 on Multiview Video Coding" Joint Video Team (JVT) of ISO/IEC MPEG & ITU-T VCEG (ISO/IEC JTC1/SC29/WG11 and ITU-T SG16 Q.6), XP055105993, Nov. 27, 2008, pp. 1-64 and Cover pages.

Ismaël Daribo, et al., "Joint Depth-Motion Dense Estimation for Multiview Video Coding" Journal of Visual Communication and Image Representation, vol. 21, No. 5-6, XP027067825, Jul. 1, 2010, pp. 487-497.

Search Report and Written Opinion dated Oct. 19, 2017 in Singapore Application No. 10201601307S, 8 pages.

Search Report and Written Opinion dated Oct. 19, 2017 in Singapore Application No. 10201601308U, 8 pages.

* cited by examiner

FIG. 15

Syntax
- seq_parameter_set_rbsp( ) {
  ...
  · if ( profile_idc == "Multi-view support Profile" ) {
    —    interview_vector_v_range_restrict_flag    u(1)
  · }
  }

Semantics
- interview_vector_v_range_restrict_flag equal to 1 represents vertical component of inter-view vectors, which are used in the dependent view pictures, is equal to or less than (LCUsize-8) in units of luma samples. If not present, the value shall be inferred to be 0. If profile_idc is equal to "Stereo profile", the value shall be set equal to 1.

FIG.18

Syntax

- seq_parameter_set_rbsp( ) {

...

. if ( profile_idc == "Multi-view support Profile" ){
          interview_vector_v_range_restrict_flag    u(1)
          if (interview_vector_v_range_restrict_flag == 1 ){
              interview_vector_v_range                u(8)
          }
  }

Semantics

- interview_vector_v_range_restrict_flag equal to 1 represents vertical component of inter-view vectors, which are used in the dependent view pictures, are equal to or less than the value interview_vector_v_range in units of luma samples. If not present, the value shall be inferred to be 0. If profile_idc is equal to "Stereo profile", the value shall be set equal to 1.

- interview_vector_v_range represents the maximum value of vertical component of the inter-view vectors in units of luma samples.
  If not present, the value shall be inferred to be 0.

FIG.19

Syntax

- seq_parameter_set_rbsp() {
  ...
  - if ( profile_idc == "Multi-view support Profile" ) {
        interview_vector_v_range_restrict_flag        u(1)
        if (interview_vector_v_range_restrict_flag == 1 ){
            interview_vector_v_range                  u(8)
            interview_vector_h_range                  u(8)
        }
    }
    ...
  }

Semantics

— interview_vector_v_range_restrict_flag equal to 1 represents vertical component of inter-view vectors, which are used in the dependent view pictures, are equal to or less than the value interview_vector_v_range in units of luma samples. If not present, the value shall be inferred to be 0. If profile_idc is equal to "Stereo profile", the value shall be set equal to 1.

— interview_vector_v_range represents the maximum value of vertical component of the inter-view vectors in units of luma samples. If not present, the value shall be inferred to be 0.

— interview_vector_h_range represents the maximum value of horizontal component of the inter-view vectors in units of luma samples. If not present, the value shall be inferred to be 0. If the value is 255, it represents that there is no restriction about the horizontal component.

FIG. 20

| Format nickname | Luma width | Luma height | constraint |
|---|---|---|---|
| SQCIF | 128 | 96 | 56 |
| QCIF | 176 | 144 | 56 |
| QVGA | 320 | 240 | 56 |
| 525 SIF | 352 | 240 | 56 |
| CIF | 352 | 288 | 56 |
| 525 HHR | 352 | 480 | 56 |
| 625 HHR | 352 | 576 | 56 |
| Q720p | 640 | 360 | 56 |
| VGA | 640 | 480 | 56 |
| 525 4SIF | 704 | 480 | 56 |
| 525 SD | 720 | 480 | 56 |
| 4CIF | 704 | 576 | 56 |
| 625 SD | 720 | 576 | 56 |
| 480p (16:9) | 864 | 480 | 56 |
| SVGA | 800 | 600 | 56 |
| QHD | 960 | 540 | 56 |
| XGA | 1024 | 768 | 56 |
| 720p HD | 1280 | 720 | 56 |
| 4VGA | 1280 | 960 | 56 |
| SXGA | 1280 | 1024 | 56 |
| 525 16SIF | 1408 | 960 | 56 |
| 16CIF | 1408 | 1152 | 56 |
| 4SVGA | 1600 | 1200 | 56 |
| 1080 HD | 1920 | 1080 | 56 |
| 2Kx1K | 2048 | 1024 | 56 |
| 2Kx1080 | 2048 | 1080 | 56 |
| 4XGA | 2048 | 1536 | 120 |
| 16VGA | 2560 | 1920 | 120 |
| 3616x1536 (2.35:1) | 3616 | 1536 | 120 |
| 3672x1536 (2.39:1) | 3680 | 1536 | 120 |
| 3840x2160 (4*HD) | 3840 | 2160 | 120 |
| 4Kx2K | 4096 | 2048 | 120 |
| 4096x2160 | 4096 | 2160 | 120 |
| 4096x2304 (16:9) | 4096 | 2304 | 120 |
| 7680x4320 | 7680 | 4320 | 248 |
| 8192x4096 | 8192 | 4096 | 248 |
| 8192x4320 | 8192 | 4320 | 248 |

FIG.21

Syntax

| sps_extension() { | Descriptor |
|---|---|
| disparity_vector_constraint_flag | u(1) |
| } | |

Semantics
disparity_vector_constraint_flag equal to 1 specifies that disparity vector is constrained in the CVS. When disparity_vector_constraint_flag is equal to 1, the vertical component of the disparity vector shall be equal to or less than dv_constraint_value in pixel. The variable dv constraint value is specified as follows.
   dv_constraint_value = ((1 + (pic_height_in_luma_samples * 0.05) >>6 ) <<6 ) − 8
When disparity_vector_constraint_flag is equal to 0, there is no constraint for disparity vector length. When not present, the value is inferred to be 0.

Stereo profile
   Bitstreams conforming to the Stereo profile shall obey the following constraints:

Sequence parameter set extensions in the non-base view shall have disparity vector constraint flag equal to 1 only.

FIG.22

Table A-dv_constraint_value

| Level | Max luma height | dv_constraint_value |
|---|---|---|
| 1 | 144 | 56 |
| 2 | 288 | 56 |
| 2.1 | 360 | 56 |
| 3 | 540 | 56 |
| 3.1 | 720 | 56 |
| 4 | 1080 | 56 |
| 4.1 | 1080 | 56 |
| 5 | 2160 | 120 |
| 5.1 | 2160 | 120 |
| 5.2 | 2160 | 120 |
| 6 | 4320 | 248 |
| 6.1 | 4320 | 248 |
| 6.2 | 4320 | 248 |

Semantics
disparity_vector_constraint_flag equal to 1 specifies that disparity vector is constrained in the CVS. When disparity_vector_constraint_flag is equal to 1, the vertical component of the disparity vector shall be equal to or less than dv_constraint_value in pixel. The variable dv_constraint_value is specified in Table A. When disparity_vector_constraint_flag is equal to 0, there is no constraint for disparity vector length. When not present, the value is inferred to be 0.

FIG. 26

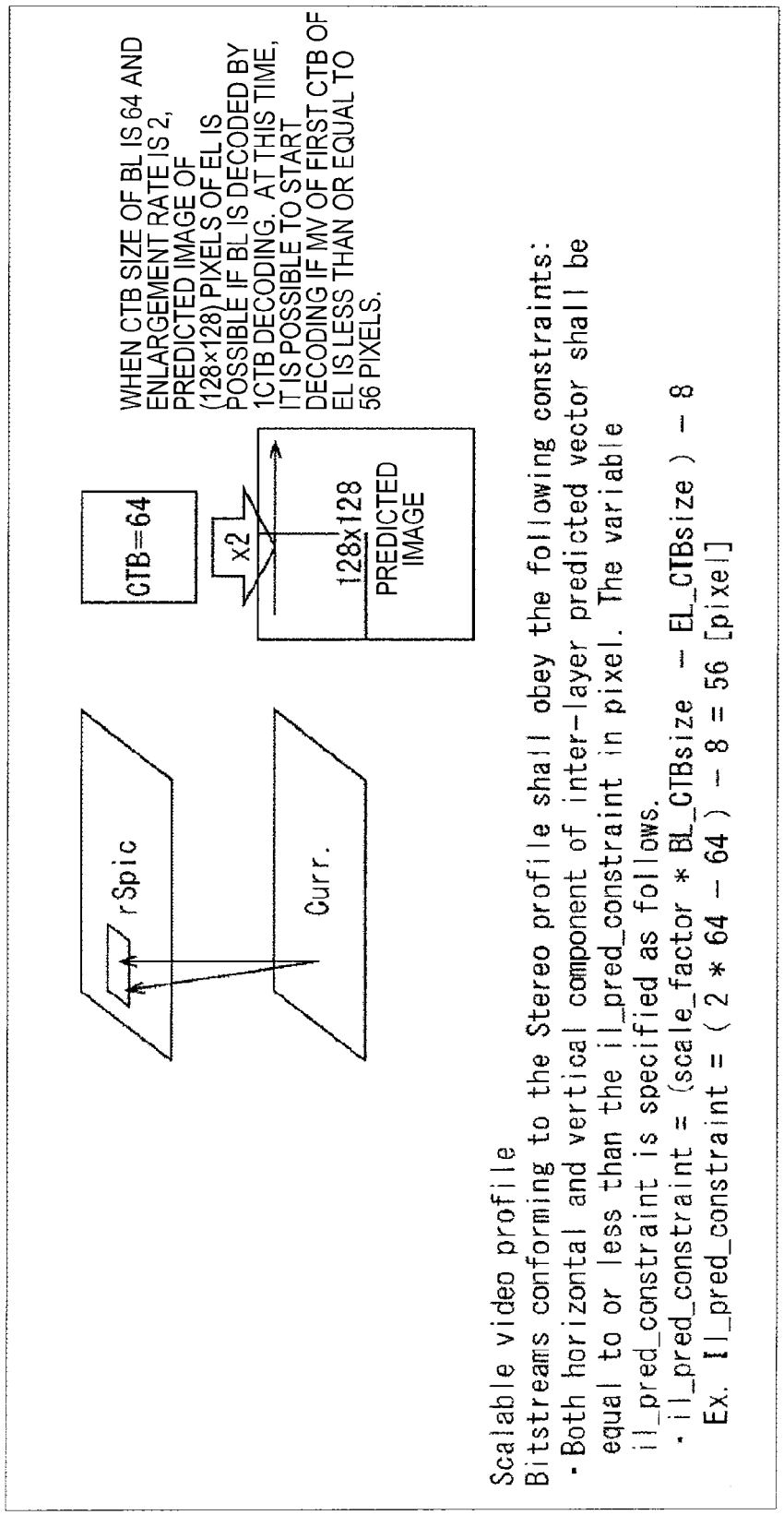

Scalable video profile
Bitstreams conforming to the Stereo profile shall obey the following constraints:
- Both horizontal and vertical component of inter-layer predicted vector shall be equal to or less than the il_pred_constraint in pixel. The variable il_pred_constraint is specified as follows.
- il_pred_constraint = (scale_factor * BL_CTBsize — EL_CTBsize ) — 8
    Ex. Il_pred_constraint = ( 2 * 64 — 64 ) — 8 = 56 [pixel]

FIG.27

Syntax

| | Descriptor |
|---|---|
| vps_extension() { | |
|   for(i=1;i <= vps_max_layers_minus1;i++) | |
|     inter_view_mv_vert_constraint_flag[i] | u(1) |
| } | |

Semantics
inter_view_mv_vert_constraint_flag[i] specifies the value of the inter_view_mv_vert_constraint_flag syntax element in VCL NAL units of the i-th layer. For i in a range from 1 to vps_max_layers_minus1, inclusive, when not present, the value of inter_view_mv_vert_constraint_flag[i] is inferred to be equal to 0. inter_view_mv_vert_constraint_flag equal to 1 specifies that vertical component of motion vectors used for inter-layer prediction are constrained in the CVS. When inter_view_mv_vert_constraint_flag is equal to 1, the vertical component of the motion vectors used for inter-layer prediction shall be equal to or less than 56 in units of luma samples. When inter_view_mv_vert_constraint_flag is equal to 0, no constraint for of the vertical component of the motion vectors used for inter-layer prediction is signalled by this flag.

FIG.28

[CASE OF SPS_EXT SYNTAX]

F.1.1.1  Stereo Main profile

Bitstreams conforming to the Stereo Main profile shall obey the following constraints:

- The sub-bitstream resulting from the sub-bitstream extraction process with any value of tIdTarget and a value of 0 in layerIdListTarget as inputs shall conform to the Main profile.

- The bitstream shall contain one layer with nuh_layer_id equal to i for which ViewId[i] is greater than 0.

- When ViewId[i] is greater than 0, inter_view_mv_vert_constraint_flag shall be equal to 1 in the sps_extension( ) syntax structure of the active layer SPS of any coded pictures with nuh_layer_id equal to i.

[CASE OF VPS_EXT SYNTAX]

F.1.1.1  Stereo Main profile

Bitstreams conforming to the Stereo Main profile shall obey the following constraints:

- The sub-bitstream resulting from the sub-bitstream extraction process with any value of tIdTarget and a value of 0 in layerIdListTarget as inputs shall conform to the Main profile.

- The bitstream shall contain one layer with nuh_layer_id equal to i for which ViewId[i] is greater than 0.

- When ViewId[i] is greater than 0, inter_view_mv_vert_constraint_flag of the ViewId[i] shall be equal to 1 in the vps_extension( ) syntax structure of any coded pictures with nuh_layer_id equal to i.

FIG. 29

| SAME POINT AS SPS_EXT | DIFFERENT POINT FROM SPS_EXT |
|---|---|
| TRANSCODING OF BITSTREAM LEVEL IS POSSIBLE BECAUSE ENCODING FOR EVERY VIEW IS POSSIBLE | BECAUSE VPS IS HIGHER SYNTAX THAN SPS, IN CASE OF MULTI-VIEW, BITSTREAM RESTRICTION IN EACH EARLIER VIEW IS KNOWN SOONER. THUS, LOAD DISPERSION OF DECODER CORE IS EASY. AS MODIFIED EXAMPLE, WHEN SYNTAX INDICATING THAT FLAG IS SENT ONLY IN CASE OF 3D PROFILE IS SET, DETERMINATION IS EASY. |

FIG.32

| | Descriptor |
|---|---|
| sps_extension_vui_parameters() { | |
| if( bitstream_restriction_flag ) { | |
| inter_view_mv_vert_constraint_flag | u(1) |
| } | |
| } | |

FIG.35

CASE OF SPS_EXT SYNTAX

F.1.1. Stereo Main profile

Bitstreams conforming to the Stereo Main profile shall obey the following constraints:

- The sub-bitstream resulting from the sub-bitstream extraction process with any value of tIdTarget and a value of 0 in layerIdListTarget as inputs shall conform to the Main profile.

- The bitstream shall contain one layer with nuh_layer_id equal to i for which ViewId[i] is greater than 0.

- When ViewId[i] is greater than 0, inter_view_mv_vert_constraint_flag shall be equal to 1 in the sps_extension( ) syntax structure of the active layer SPS of any coded pictures with nuh_layer_id equal to i.

MV_V ≤ 56pixel
⇔
ONE-LINE DELAY WHEN CTU SIZE = 64
TWO-LINE DELAY WHEN CTU SIZE = 32
FOUR-LINE DELAY WHEN CTU SIZE = 16
⇔
1<<(6-Log2CTUsize) LINE DELAY

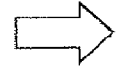

CONSTRAINT BY CTU LINE

F.1.1.1 Stereo Main profile

Bitstreams conforming to the Stereo Main profile shall obey the following constraints:

- The sub-bitstream resulting from the sub-bitstream extraction process with any value of tIdTarget and a value of 0 in layerIdListTarget as inputs shall conform to the Main profile.

- The bitstream shall contain one layer with nuh_layer_id equal to i for which ViewId[i] is greater than 0.

- When ViewId[i] is greater than 0, num_delay_ref_layers shall be equal to 1 and min_spatial_segment_delay[0] shall be equal to 1<<( ( 6 - refLog2CtbSizeY) in the sps_extension_vui_parameters( ) syntax structure of the active layer SPS of any coded pictures with nuh_layer_id equal to i.

FIG. 36

| SAME POINT AS interview_vector_v_range_restrict_flag | DIFFERENT POINTS FROM interview_vector_v_range_restrict_flag |
|---|---|
| SAME AS DELAY INFORMATION | RESTRICTION OF MV_V ≤ 56 IS CHANGED ACCORDING TO ON/OFF OF LOOP FILTER IN REFERENCE PLANE OR WHETHER DISPARITY VECTOR OF Y DIRECTION HAS INTEGER PRECISION<br><br>• IN CASE OF LOOP FILTER OFF, MV IS EXTENDED UP TO MV_V ≤ 60 (= 64 − 4 OF OFFSET OF MC FILTER) PIXELS<br><br>• BECAUSE MC FILTER IS UNNECESSARY WHEN MV LENGTH IS INTEGER, MV IS EXTENDED UP TO MV_V ≤ 60 (= 64 − 4 OF OFFSET OF LOOP FILTER)<br><br>• WHEN LOOP FILTER IS TURNED OFF AND MV LENGTH IS INTEGER, MV IS EXTENDED UP TO MV_V ≤ 64 |

FIG.57

```xml
<?xml version="1.0"?>
<MPD
 xmlns:xsi="http://www.w3.org/2001/XMLSchema-instance"
 xmlns="urn:mpeg:DASH:schema:MPD:2011"
 xsi:schemaLocation="urn:mpeg:DASH:schema:MPD:2011 DASH-MPD.xsd"
 type="static"
 mediaPresentationDuration="PT3256S"
 minBufferTime="PT1.2S"
 profiles="urn:mpeg:dash:profile:isoff-on-demand:2011">

<BaseURL>http://cdn1.example.com/</BaseURL>
<BaseURL>http://cdn2.example.com/</BaseURL>

<Period>
<!--English Audio-->
<AdaptationSet mimeType="audio/mp4" codecs="mp4a.0x40" lang="en" subsegmentAlignment="true" subsegmentStartsWithSAP="1" >
 <ContentProtection schemeIdUri="urn:uuid:706D6953-656C-5244-4D48-656164657221" />
 <Representation id="1" bandwidth="64000">
   <BaseURL>765741234B.mp4</BaseURL>
 </Representation>
 <Representation id="2" bandwidth="32000">
   <BaseURL>3463R4634B.mp4</BaseURL>
 </Representation>
</AdaptationSet>
<!--Video-->
<AdaptationSet mimeType="video/mp4" codecs="avc1.4d0228" subsegmentAlignment="true" subsegmentStartsWithSAP="2" >
 <ContentProtection schemeIdUri="urn:uuid:706D6953-656C-5244-4D48-656164657221" />
 <Representation id="6" bandwidth="256000" width="320" height="240">
   <BaseURL>8563456473.mp4</BaseURL>
 </Representation>
 <Representation id="7" bandwidth="512000" width="320" height="240">
   <BaseURL>5683B3634.mp4</BaseURL>
 </Representation>
 <Representation id="8" bandwidth="1024000" width="640" height="480">
   <BaseURL>5B2465736.mp4</BaseURL>
 </Representation>
 <Representation id="9" bandwidth="1384000" width="640" height="480">
   <BaseURL>41325645.mp4</BaseURL>
 </Representation>
 <Representation id="A" bandwidth="1536000" width="1280" height="720">
   <BaseURL>89045625.mp4</BaseURL>
 </Representation>
 <Representation id="B" bandwidth="2048000" width="1280" height="720">
   <BaseURL>2353B745734.mp4</BaseURL>
 </Representation>
</AdaptationSet>
</Period>
</MPD>
```

IMAGE PROCESSING DEVICE AND METHOD

TECHNICAL FIELD

The present disclosure relates to an image processing device and method, and more particularly to an image processing device and method configured to enable pictures of a plurality of views to be processed in parallel.

BACKGROUND ART

Recently, devices for compressing and encoding an image by adopting an encoding scheme of handling image information digitally and performing compression by an orthogonal transform such as a discrete cosine transform and motion compensation using image information-specific redundancy for the purpose of information transmission and accumulation with high efficiency when the image information is handled digitally have become widespread. Moving Picture Experts Group (MPEG), H.264, MPEG-4 Part 10 (Advanced Video Coding) (hereinafter referred to as H.264/AVC), and the like are examples of such encoding schemes.

Therefore, for the purpose of improving encoding efficiency compared to H.264/AVC, standardization of an encoding scheme referred to as high efficiency video coding (HEVC) by Joint Collaboration Team-Video Coding (JCTVC), which is a joint standardizing organization of International Telecommunication Union Telecommunication Standardization Sector (ITU-T) and International Organization for Standardization (ISO)/International Electrotechnical Commission (IEC), is currently in progress (for example, see Non-Patent Literature 1).

In the draft of HEVC at the present time, a dependent slice is adopted as one parallel processing tool. Parallel decoding of picture units of each view using the dependent slice is possible.

CITATION LIST

Non-Patent Literature

Non-Patent Literature 1: Benjamin Bross, Woo-Jin Han, Jens-Rainer Ohm, Gary J. Sullivan, Thomas Wiegand, "High efficiency video coding (HEVC) text specification draft 8," JCTVC-J1003_d7, Jul. 7, 2012

SUMMARY OF INVENTION

Technical Problem

However, even when the dependent slice is used, it is difficult to decode pictures of a plurality of views in parallel because there is dependency of motion compensation between the views.

The present disclosure has been made in view of the above circumstances, and enables pictures of a plurality of views to be processed in parallel.

Solution to Problem

An image processing device according to a first aspect of the present disclosure includes a reception section configured to receive an encoded stream set in syntax of the encoded stream in which motion vector (MV) range limit information is encoded in units in which image data have a hierarchical structure and the MV range limit information, the MV range limit information being information about a limit of a value of a vertical direction of an MV for referring to a view different from a view of a current block in an inter-view MV corresponding to the current block, and a decoding section configured to decode the encoded stream received by the reception section using the MV range limit information received by the reception section.

The MV range limit information may be a flag indicating that there is a limit of the vertical direction in a range of the inter-view MV.

The MV range limit information may be a value indicating a limit of a vertical positive direction of the range of the inter-view MV.

A value of a limit of a vertical positive direction of the range of the inter-view MV may be preset and may be (largest coding unit (LCU) size—8).

A value of a limit of a vertical positive direction of the range of the inter-view MV may be preset and may be (LCU size—4) when a loop filter is turned off.

A value of a limit of a vertical positive direction of the range of the inter-view MV may be determined according to vertical resolution of an image format.

A value of a limit of a vertical positive direction of the range of the inter-view MV may be determined according to a level.

The MV range limit information may be set in a sequence parameter set (SPS).

The MV range limit information may be set in a video parameter set (VPS).

The MV range limit information may be set in video usability information (VUI).

The decoding section may decode the MV range limit information received by the reception section, and may decode the encoded stream received by the reception section using the decoded MV range limit information.

A first image processing method of the present disclosure includes receiving, by an image processing device, an encoded stream set in syntax of the encoded stream in which MV range limit information is encoded in units in which image data have a hierarchical structure and the MV range limit information, the MV range limit information being information about a limit of a value of a vertical direction of an MV for referring to a view different from a view of a current block in an inter-view MV corresponding to the current block, and decoding, by the image processing device, the received encoded stream using the received MV range limit information.

A second image processing device of the present disclosure includes a setting section configured to set MV range limit information which is information about a limit of a value of a vertical direction of an MV for referring to a view different from a view of a current block in an inter-view MV corresponding to the current block in syntax of an encoded stream, an encoding section configured to generate the encoded stream by encoding image data in units having a hierarchical structure using the MV range limit information set by the setting section, and a transmission section configured to transmit the encoded stream generated by the encoding section and the MV range limit information set by the setting section.

The setting section may set a flag indicating that there is a limit of the vertical direction in a range of the inter-view MV as the MV range limit information.

The setting section may a value indicating the limit of the vertical positive direction in the range of the inter-view MV as the MV range limit information.

A value of a limit of a vertical positive direction of the range of the inter-view MV may be preset and may be (LCU size—8).

A value of a limit of a vertical positive direction of the range of the inter-view MV may be preset and may be (LCU size—4) when a loop filter is turned off.

A value of a limit of a vertical positive direction of the range of the inter-view MV may be determined according to vertical resolution of an image format.

A value of a limit of a vertical positive direction of the range of the inter-view MV may be determined according to a level.

The setting section may set the MV range limit information in an SPS.

The setting section may set the MV range limit information in a VPS.

The setting section may set the MV range limit information in VUI.

The encoding section may generate the encoded stream by encoding the MV range limit information set by the setting section and encoding the image data using the encoded MV range limit information.

An image processing method according to a second aspect of the present disclosure includes setting, by an image processing device, MV range limit information which is information about a limit of a value of a vertical direction of an MV for referring to a view different from a view of a current block in an inter-view MV corresponding to the current block in syntax of an encoded stream, generating, by the image processing device, the encoded stream by encoding image data in units having a hierarchical structure using the set MV range limit information, and transmitting, by the image processing device, the generated encoded stream and the set MV range limit information.

An image processing device according to a third aspect of the present disclosure includes a reception section configured to receive an encoded stream set by a number of coding tree unit (CTU) lines in syntax of an encoded stream in which MV range limit information is encoded in units in which image data have a hierarchical structure and the MV range limit information, the MV range limit information being information about a limit of a value of a vertical direction of an MV for referring to a view different from a view of a current block in an inter-view MV corresponding to the current block, and a decoding section configured to decode the encoded stream received by the reception section using the MV range limit information received by the reception section.

The MV range limit information may be set by the number of CTU lines of the vertical direction delayed from the different view.

The number of CTU lines of the vertical direction may be

[Math 3]

$$1<<(6-\mathrm{Log}_2\mathrm{CTUsize}) \qquad (3)$$

The MV range limit information may be set in an SPS.

An image processing method according to the third aspect of the present disclosure includes receiving, by an image processing device, an encoded stream set by a number of CTU lines in syntax of an encoded stream in which MV range limit information is encoded in units in which image data have a hierarchical structure and the MV range limit information, the MV range limit information being information about a limit of a value of a vertical direction of an MV for referring to a view different from a view of a current block in an inter-view MV corresponding to the current block, and decoding, by the image processing device, the received encoded stream using the received MV range limit information.

An image processing device according to a fourth aspect of the present disclosure includes a setting section configured to set MV range limit information by a number of CTU lines, the MV range limit information being information about a limit of a value of a vertical direction of an MV for referring to a view different from a view of a current block in an inter-view MV corresponding to the current block in syntax of an encoded stream, an encoding section configured to generate the encoded stream by encoding image data in units having a hierarchical structure using the MV range limit information set by the setting section, and a transmission section configured to transmit the encoded stream generated by the encoding section and the MV range limit information set by the setting section.

The setting section may set the MV range limit information by the number of CTU lines of the vertical direction delayed from the different view.

The number of CTU lines of the vertical direction may be

[Math 3]

$$1<<(6-\mathrm{Log}_2\mathrm{CTUsize}) \qquad (3)$$

The setting section may set the MV range limit information in an SPS.

An image processing method according to a fourth aspect of the present disclosure includes setting, by an image processing device, MV range limit information by a number of CTU lines, the MV range limit information being information about a limit of a value of a vertical direction of an MV for referring to a view different from a view of a current block in an inter-view MV corresponding to the current block in syntax of an encoded stream, generating, by the image processing device, the encoded stream by encoding image data in units having a hierarchical structure using the set MV range limit information, and transmitting, by the image processing device, the generated encoded stream and the set MV range limit information.

In the first aspect of the present disclosure, an encoded stream set in syntax of the encoded stream in which motion vector (MV) range limit information is encoded in units in which image data have a hierarchical structure and the MV range limit information are received, the MV range limit information being information about a limit of a value of a vertical direction of an MV for referring to a view different from a view of a current block in an inter-view MV corresponding to the current block. The received encoded stream is decoded using the received MV range limit information.

In the second aspect of the present disclosure, MV range limit information which is information about a limit of a value of a vertical direction of an MV for referring to a view different from a view of a current block in an inter-view MV corresponding to the current block in syntax of an encoded stream is set, the encoded stream is generated by encoding image data in units having a hierarchical structure using the set MV range limit information, and the generated encoded stream and the set MV range limit information are transmitted.

In the third aspect of the present disclosure, an encoded stream set by a number of coding tree unit (CTU) lines in syntax of an encoded stream in which MV range limit information is encoded in units in which image data have a hierarchical structure and the MV range limit information are received, the MV range limit information being information about a limit of a value of a vertical direction of an MV for referring to a view different from a view of a current block in an inter-view MV corresponding to the current block, and the received encoded stream is decoded using the received MV range limit information.

In the fourth aspect of the present disclosure, MV range limit information by a number of CTU lines is set, the MV range limit information being information about a limit of a value of a vertical direction of an MV for referring to a view different from a view of a current block in an inter-view MV corresponding to the current block in syntax of an encoded stream, and the encoded stream is generated by encoding image data in units having a hierarchical structure using the set MV range limit information. The generated encoded stream and the set MV range limit information are transmitted.

Also, the above-described image processing device may be an independent device or an inner block constituting one image encoding device or image decoding device.

Advantageous Effects of Invention

According to the first and third aspects of the present disclosure, it is possible to decode an image. In particular, it is possible to process pictures of a plurality of views in parallel.

According to the second and fourth aspects of the present disclosure, it is possible to encode an image. In particular, it is possible to process pictures of a plurality of views in parallel.

BRIEF DESCRIPTION OF DRAWINGS

FIG. 15 is a diagram illustrating an example of syntax.
FIG. 18 is a diagram illustrating an example of syntax.
FIG. 19 is a diagram illustrating an example of syntax.
FIG. 20 is a diagram illustrating an example of a limit value for a general image format.
FIG. 21 is a diagram illustrating an example of syntax.
FIG. 22 is a diagram illustrating an example of syntax.
FIG. 26 is a diagram illustrating a constraint in which an inter-layer prediction vector is X pixels or less.
FIG. 27 is a diagram illustrating another example (video parameter set (VPS)_extension (EXT)) of the syntax.
FIG. 28 is a diagram illustrating the constraint of a stereo profile.
FIG. 29 is a diagram illustrating an example of syntax.
FIG. 32 is a diagram illustrating still another example (video usability information (VUI)_EXT) of the syntax.
FIG. 35 is a diagram illustrating constraints in the stereo profile.
FIG. 36 is a diagram illustrating a technical difference from the technology of other reference literature.

FIG. 57 is a functional block diagram illustrating a configuration of a content server of the content reproduction system.

DESCRIPTION OF EMBODIMENTS

Hereinafter, modes (hereinafter referred to as embodiments) for carrying out the present disclosure will be described. Also, the description will be given in the following order.

1. First embodiment (multi-view image encoding device)

2. Second embodiment (multi-view image decoding device)

3. Third embodiment (example of syntax)

4. Fourth embodiment (other example of limit value)

5. Fifth embodiment (constraint method of case of scalable HEVC)

6. Sixth embodiment (other example of syntax)

7. Seventh embodiment (constraint method by coding tree unit (CTU) line)

8. Eighth embodiment (multi-view image encoding device, multi-view image decoding device)

9. Ninth embodiment (hierarchical image encoding device, hierarchical image decoding device)

10. Tenth embodiment (computer)

11. Application example

12. Application example of scalable video coding.

13. Eleventh embodiment (set/unit/module/processor)

14. Application example of content reproduction system of MPEG-dynamic adaptive streaming over hypertext transfer protocol (HTTP) (DASH)

15. Application example of wireless communication system of wireless fidelity (Wi-Fi) standard First Embodiment Configuration Example of Multi-View Image Encoding Device FIG. 1 illustrates a configuration of an embodiment of the multi-view image encoding device serving as an image processing device to which the present disclosure is applied.

Figure 1:
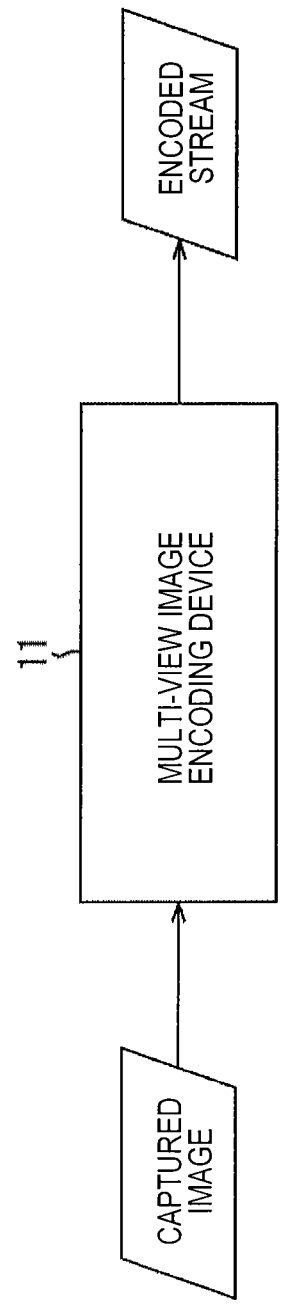
FIG. 1 is a diagram illustrating an example of a multi-view image encoding device to which the present technology is applied.

The multi-view image encoding device 11 of FIG. 1 encodes a captured image such as a captured multi-view image in an HEVC scheme and generates an encoded stream. The generated encoded stream is transmitted to a multi-view image decoding device 211 to be described later and the like.

Figure 2:
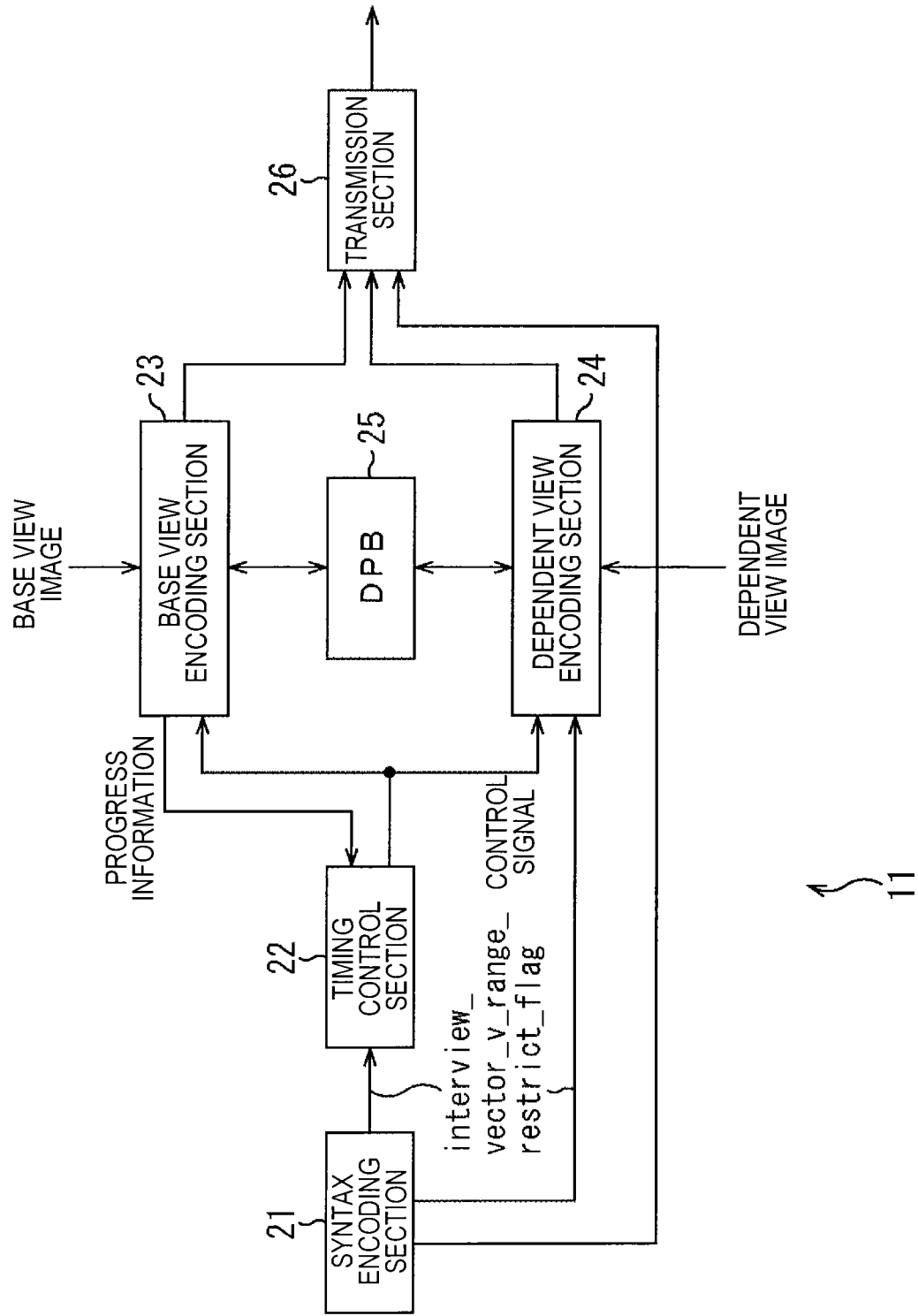
FIG. 2 is a block diagram illustrating a main configuration of the multi-view image encoding device.

FIG. 2 is a block diagram illustrating a configuration example of the multi-view image encoding device of FIG. 1. Also, in the example of FIG. 2, an example in which a two-view image including a base view (view) and a dependent view (view) is encoded is shown. Hereinafter, the image of the base view is referred to as a base view image, and the image of the dependent view is referred to as a dependent view image.

In the example of FIG. 2, the multi-view image encoding device 11 includes a syntax encoding section 21, a timing control section 22, a base view encoding section 23, a dependent view encoding section 24, a decoded picture buffer (DPB) 25, and a transmission section 26.

The syntax encoding section 21 sequentially sets syntaxes of an encoded stream such as an SPS, a picture parameter set (PPS), supplemental enhancement information (SEI), and a slice header and encodes the set syntaxes. The syntax encoding section 21 supplies the encoded syntaxes to the transmission section 26.

In particular, the syntax encoding section 21 sets interview_vector_v_range_restrict_flag which is information about a limit of a vertical (V) direction of a search range of an inter-view MV as one of the syntaxes. The inter-view MV is an MV found between views. interview_vector_v_range_restrict_flag is a flag indicating that the limit of the V direction of the search range of the inter-view MV is present in encoding (decoding) of the dependent view. interview_vector_v_range_restrict_flag, for example, is set in the SPS. Also, the information about the limit of the V direction of the search range of the inter-view MV is not limited to the flag.

The syntax encoding section 21 supplies the set interview_vector_v_range_restrict_flag to the timing control section 22 and the dependent view encoding section 24.

According to interview_vector_v_range_restrict_flag supplied from the syntax encoding section 21, the timing control section 22 refers to progress information of an encoding process from the base view encoding section 23 and supplies a control signal for controlling timings of a base view image encoding process and a dependent image encoding process.

That is, the timing control section 22 starts the encoding process of the base view encoding section 23. Then, the timing control section 22 causes the base view encoding section 23 and the dependent view encoding section 24 to operate in parallel if the encoding process of the base view encoding section 23 reaches a predetermined LCU line when interview_vector_v_range_restrict_flag supplied from the syntax encoding section 21 is 1 (ON).

On the other hand, the timing control section 22 waits for the end of the encoding process of the base view encoding section 23 when interview_vector_v_range_restrict_flag supplied from the syntax encoding section 21 is 0 (OFF) and causes the encoding process of the dependent view encoding section 24 to be activated.

The base view image is input to the base view encoding section 23. The base view encoding section 23 encodes the base view image input as an external encoding target and supplies encoded data of the base view image obtained as its result to the transmission section 26. Also, the base view encoding section 23 selects a reference picture to be referred to when an image to be encoded is encoded from a decoded image of the base view stored in the DPB 25 and encodes an image using the selected reference picture. At this time, the decoded image of a local decoding result is temporarily stored in the DPB 25.

The dependent view image is input to the dependent view encoding section 24. The dependent view encoding section 24 encodes the dependent view image input as an external encoding target and supplies encoded data of the dependent view image obtained as its result to the transmission section 26. Also, the dependent view encoding section 24 selects a reference picture to be referred to when an image to be encoded is encoded from a decoded image of the base view or the dependent view stored in the DPB 25 and encodes an image using the selected reference picture. At this time, the decoded image of a local decoding result is temporarily stored in the DPB 25.

In particular, when interview_vector_v_range_restrict_flag supplied from the syntax encoding section 21 is turned on, the dependent view encoding section 24 finds an interview MV of a current block of the dependent view image by limiting a vertical positive direction of the search range in the decoded image of the base view to a preset value.

The DPB 25 temporarily stores a locally decoded image (decoded image) obtained by encoding the image to be encoded by each of the base view decoding section 23 and the dependent view encoding section 24 and locally decoding the encoded image as (a candidate for) a reference picture to be referred to when a predicted image is generated.

Because the DPB 25 is shared by the base view encoding section 23 and the dependent view encoding section 24, each of the base view encoding section 23 and the dependent view encoding section 24 can refer to, in addition to the decoded image obtained locally, a decoded image obtained y another view encoding section. Note that the base view encoding section 23 that encodes a base viewpoint image refers only to an image of the same viewpoint (base view).

The transmission section 26 generates an encoded stream by multiplexing the syntax from the syntax encoding section 21, the encoded data of the base view from the base view encoding section 23, and the encoded data of the dependent view from the dependent view encoding section 24.

[Configuration Example of View Encoding Section]

Figure 3:
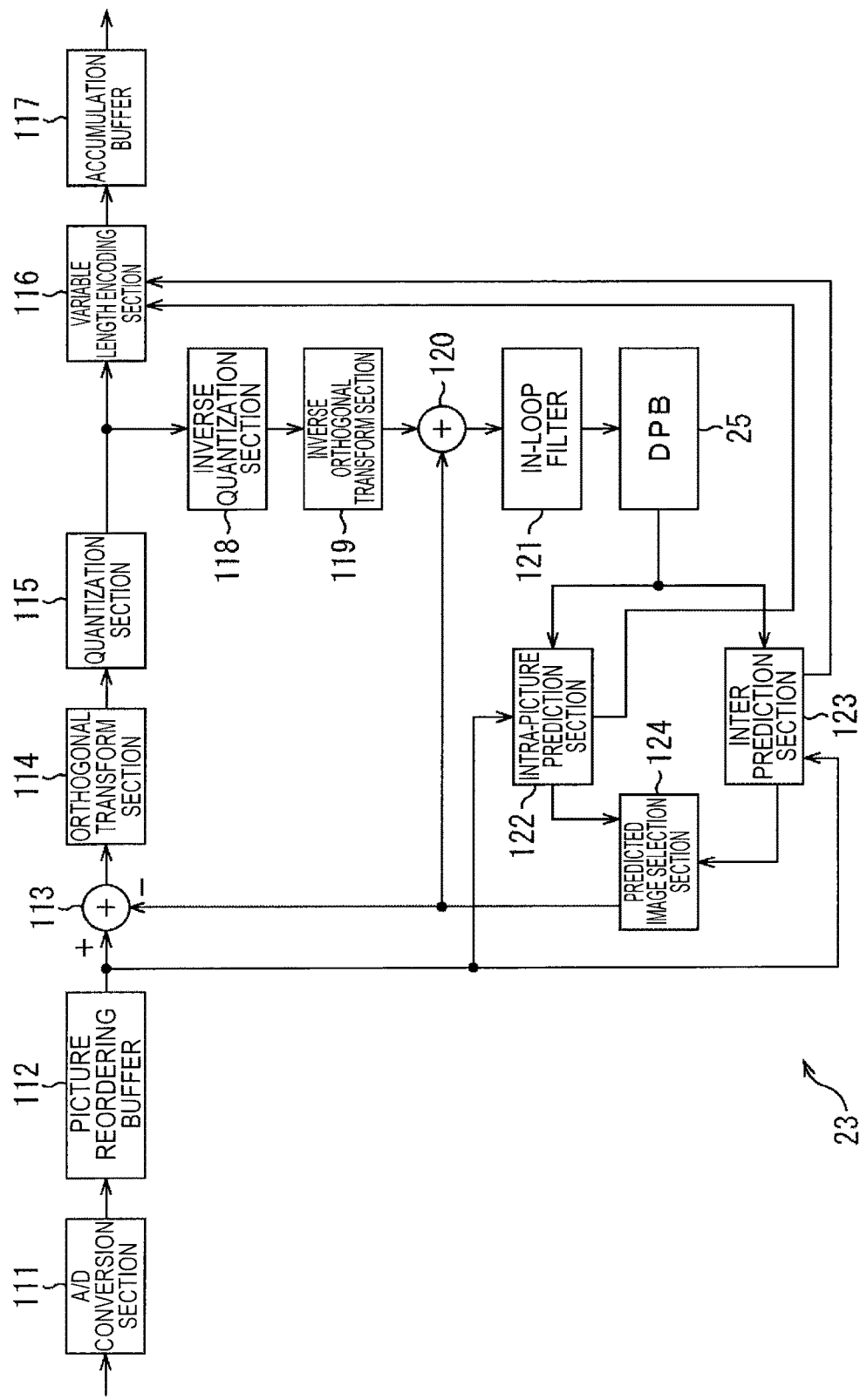
FIG. 3 is a block diagram illustrating a configuration example of a view encoding section.

FIG. 3 is a block diagram illustrating a configuration of the base view encoding section 23. Also, the dependent view encoding section 24 is also configured to be basically similar to the base view encoding section 23.

In FIG. 3, the base view encoding section 23 has an analog/digital (A/D) conversion section 111, a picture reordering buffer 112, a calculation section 113, an orthogonal transform section 114, a quantization section 115, a variable length encoding section 116, an accumulation buffer 117, an inverse quantization section 118, an inverse orthogonal transform section 119, a calculation section 120, an in-loop filter 121, an intra-picture prediction section 122, an inter prediction section 123, and a predicted image selection section 124.

A picture of the image of the base view that is an image (moving image) to be encoded is sequentially supplied to the A/D conversion section 111 in the display order.

When the picture supplied to the A/D conversion section 111 is an analog signal, the A/D conversion section 111 converts the analog signal according to A/D conversion and supplies the converted analog signal to the picture reordering buffer 112.

The picture reordering buffer 112 temporarily stores a picture from the A/D conversion section 111 and reads a picture according to a structure of a predetermined group of pictures (GOP), so that a process of reordering a picture sequence from the display order to the encoding order (decoding order) is performed.

The picture read from the picture reordering buffer 112 is supplied to the calculation section 113, the intra-picture prediction section 122, and the inter prediction section 123.

In addition to the supply of a picture from the picture reordering buffer 112, a predicted image generated by the intra-picture prediction section 122 or the inter prediction section 123 from the predicted image selection section 124 is supplied to the calculation section 113.

The calculation section 113 designates the picture read from the picture reordering buffer 112 as a target picture which is a picture to be encoded and sequentially designates a macro block (largest coding unit (LCU)) constituting the target picture as the target block to be encoded.

Then, the calculation section 113 performs prediction encoding after calculating a subtraction value by subtracting a pixel value of the predicted image supplied from the predicted image selection section 124 from the pixel value of the target block if necessary, and supplies a prediction encoding result to the orthogonal transform section 114.

The orthogonal transform section 114 performs an orthogonal transform such as a discrete cosine transform or a Karhunen-Loeve transform on (a residual obtained by subtracting the predicted image or a pixel value of) a target block from the calculation section 113, and supplies a transform coefficient obtained as a result thereof to the quantization section 115.

The quantization section 115 quantizes the transform coefficient supplied from the orthogonal transform section 114 and supplies a quantization value obtained as a result thereof to the variable length encoding section 116.

The variable length encoding section 116 performs lossless encoding such as variable length encoding (for example, context-adaptive variable length coding (CAVLC) or the like) or arithmetic encoding (for example, context-adaptive binary arithmetic coding (CABAC) or the like) on a quantization value from the quantization section 115, and supplies encoded data obtained as a result thereof to the accumulation buffer 117.

Also, in addition to the supply of the quantization value from the quantization section 115, header information included in a header of the encoded data from the intra-picture prediction section 122 or the inter prediction section 123 is supplied to the variable length encoding section 116.

The variable length encoding section 116 encodes the header information from the intra-picture prediction section 122 or the inter prediction section 123 and includes the encoded header information in the header of the encoded data.

The accumulation buffer 117 temporarily stores the encoded data from the variable length encoding section 116 and outputs the stored encoded data at a predetermined data rate.

The encoded data output from the accumulation buffer 117 is supplied to the transmission section 26 of FIG. 1.

The quantization value obtained by the quantization section 115 is supplied to the inverse quantization section 118 as well as the variable length encoding section 116 and locally decoded in the inverse quantization section 118, the inverse orthogonal transform section 119, and the calculation section 120.

That is, the inverse quantization section 118 inversely quantizes the quantization value from the quantization section 115 into a transform coefficient and supplies the transform coefficient to the inverse orthogonal transform section 119.

The inverse orthogonal transform section 119 performs an inverse orthogonal transform on the transform coefficient from the inverse quantization section 118 and supplies the transformed transform coefficient to the calculation section 120.

The calculation section 120 obtains a decoded image in which a target block is decoded (locally decoded) by adding the pixel value of the predicted image supplied from the predicted image selection section 124 to the data supplied from the inverse orthogonal transform section 119 if necessary, and supplies the obtained decoded image to the in-loop filter 121.

The in-loop filter 121, for example, is constituted of a deblocking filter. Also, for example, when the HEVC scheme is adopted, the in-loop filter 121 is constituted of a deblocking filter and an adaptive offset filter (sample adaptive offset (SAO)). The in-loop filter 121 removes (reduces) block distortion occurring in the decoded image by filtering the decoded image from the calculation section 120, and supplies the decoded image after the distortion removal (reduction) to the DPB 25.

Here, the DPB 25 stores a decoded image from the in-loop filter 121, that is, an image of a base view encoded in the base view encoding section 23 and locally decoded, as (a candidate for) a reference picture to be referred to when a predicted image to be used in prediction encoding (encoding in which subtraction of a predicted image is performed by the calculation section 113) to be performed later in time is generated.

Because the DPB 25 is shared by the base view encoding section 23 and the dependent view encoding section 24 as described above with reference to FIG. 2, the DPB 25 also stores an image of the dependent view encoded in the dependent view encoding section 24 and locally decoded in addition to an image of the base view encoded in the base view encoding section 23.

Also, the local decoding by the inverse quantization section 118, the inverse orthogonal transform section 119, and the calculation section 120, for example, is performed by targeting I-, P-, and Bs-pictures which are referable pictures capable of serving as reference pictures. In the DPB 25, decoded images of the I-, P-, and Bs-pictures are stored.

The intra-picture prediction section 122 and the inter prediction section 123 perform motion prediction in units of PUs.

When the target block is an I-picture, a P-picture, or a B-picture (including Bs-pictures) obtained by intra prediction (intra-picture prediction), the intra-picture prediction section 122 reads an already decoded portion (decoded image) from a target block from the DPB 25. Then, the intra-picture prediction section 122 designates part of the decoded image of the target picture read from the DPB 25 as the predicted image of the target block of the target picture supplied from the picture reordering buffer 112.

Further, the intra-picture prediction section 122 obtains an encoding cost required to encode the target block using the predicted image, that is, an encoding cost required to encode a residual or the like for the predicted image in the target block, and supplies the obtained encoding cost to the predicted image selection section 124 along with the predicted image.

The inter prediction section 123 reads one or more pictures encoded before a target picture and locally decoded as a candidate picture (a candidate of a reference picture) from the DPB 25 when the target picture is a P-picture or a B-picture (including Bs-pictures) obtained by inter prediction.

The inter prediction section 123 detects an inter-MV representing the motion serving as a shift between a target block and a corresponding block (a block having a smallest sum of absolute differences (SAD) from the target block) of the candidate picture corresponding to the target block by motion estimation (ME) (motion detection) using a target block of a target picture from the picture reordering buffer 112 and the candidate picture. Also, in the encoding of the dependent view image, the inter-MV includes an inter-view MV indicating an inter-view shift as well as an MV indicating a temporal shift. In addition, when interview_vector_v_range_restrict_flag supplied from the syntax encoding section 21 of FIG. 2 is turned on, a search range of the vertical direction of the inter-view MV is constrained.

The inter prediction section 123 generates a predicted image by performing motion compensation for compensating for a shift of a motion amount of a candidate picture from the DPB 25 according to the inter-MV of the target block.

That is, the inter prediction section 123 acquires a corresponding block that is a block (region) of a position moved (shifted) according to the MV of the target block from the position of the target block in the candidate picture as a predicted image.

Further, the inter prediction section 123 obtains the encoding cost required to encode the target block using the predicted image for every candidate picture for use in generation of a predicted image or every inter prediction mode having a variable macro block type.

Then, the inter prediction section 123 supplies a predicted image and an encoding cost obtained in an optimum inter prediction mode to the predicted image selection section 124 by designating an inter prediction mode or an inter-view prediction mode having a lowest encoding cost as the optimum inter prediction mode which is an optimal inter prediction mode. Also, in the encoding of the dependent view image, the inter-view prediction mode is also included in the inter prediction mode.

The predicted image selection section 124 selects one having a lower encoding cost from predicted images from the intra-picture prediction section 122 and the inter prediction section 123, and supplies the selected predicted image to the calculation sections 113 and 120.

Here, the intra-picture prediction section 122 supplies information about intra prediction as header information to the variable length encoding section 116. The inter prediction section 123 supplies information about inter prediction (information of the MV or the like) as the header information to the variable length encoding section 116.

The variable length encoding section 116 selects header information that generates a predicted image having a lower encoding cost among the header information from the intra-picture prediction section 122 and the inter prediction section 123, and includes the selected header information in the header of the encoded data.

[Outline of Present Technology]

Next, with reference to FIG. 4, the limit of the search range of the inter-view MV by the present technology will be described.

In HEVC, a dependent slice is adopted as one parallel processing tool. Parallel decoding of picture units of each view using the dependent slice is possible.

However, even when the dependent slice is used, it is difficult to decode pictures of a plurality of views in parallel because there is dependency of motion compensation between the views.

Also, for example, when a stereo image is considered, a horizontal line is shifted in the base view image and the dependent view image, but a shift of the vertical direction is a shift of a unit of about several pixels and thus is not a substantial shift.

Therefore, in the present technology, a parallel decoding process of a plurality of views is enabled by setting dependency of motion compensation between views, that is, the limit of the vertical direction (in particular, the vertical positive direction) of the search range of the inter-view MV.

Figure 4:
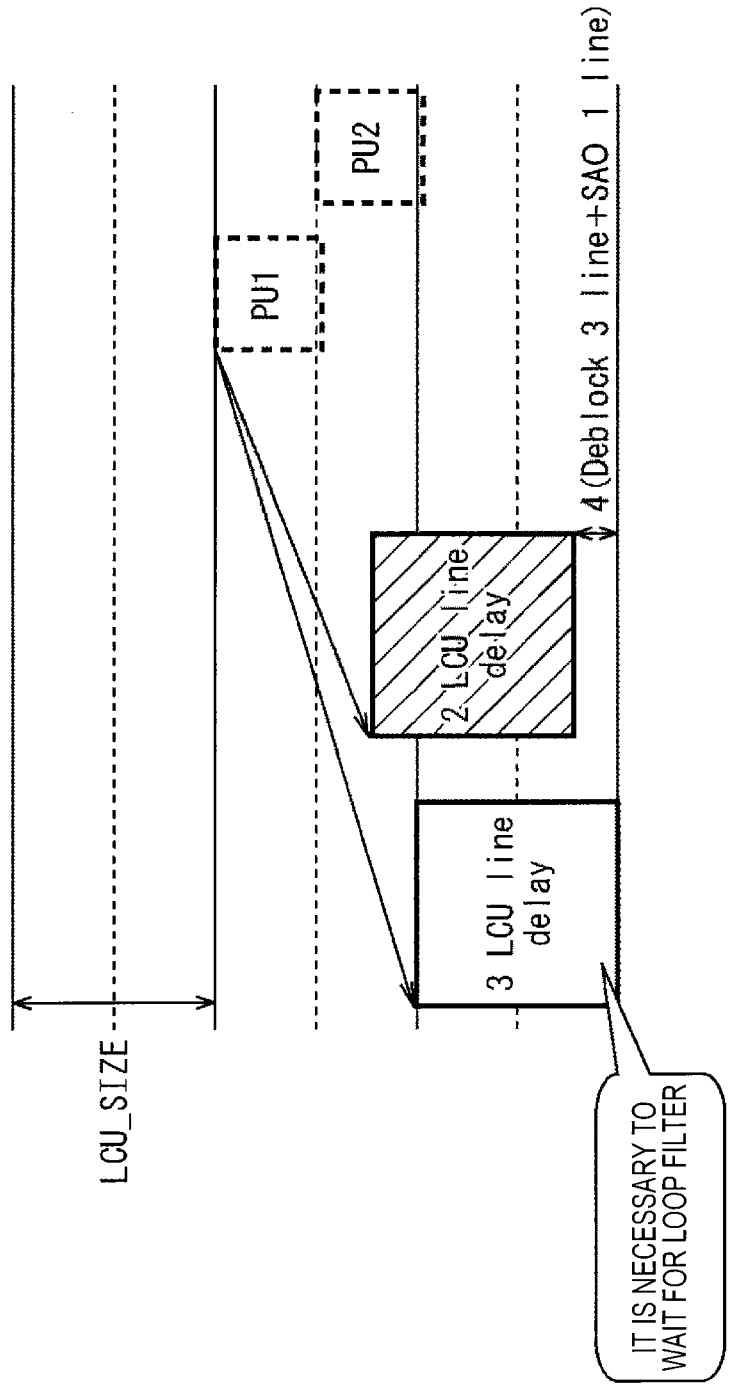
FIG. 4 is a diagram illustrating the constraint of a search range of an inter-view motion vector.

In the example of FIG. 4, the horizontal line of the solid line represents an LCU line in the base view, and an LCU size between LCU lines is indicated. In addition, blocks PU1 and PU2 in a second LCU line from the top are indicated by the dotted line so as to represent PUs of the dependent view.

It is necessary to decode at least the same LCU line in the base view in order to decode an LCU line of PU1 of the dependent view, and it is necessary to apply a loop filter to four lines which are an LCU boundary of a lower side in order to decode the same LCU line. Among the four lines which are the LCU boundary of the lower side, three lines are lines for the deblocking filter and one line is a line for an adaptive loop filter (SAO).

That is, in order to apply the loop filter to the four lines which are the LCU boundary of the lower side, it is also necessary to decode four lines of an LCU boundary of an upper side of an LCU line below the lower side.

Therefore, if the encoding of the dependent view is delayed by two lines for the encoding of the base view, reference from the dependent view is enabled because decoding up to a position of the vertical direction of the LCU block indicated by two-LCU-line delay is completed (that is, from the LUC size of the LCU line after the LCU line to which a current PU belongs to a size of (LCU size—4) lines excluding four lower lines).

In contrast, because it is necessary to wait for a loop filter of the four lower lines before reference up to a position of the vertical direction of the LCU in which three-LCU-line delay is shown (that is, up to the LCU line after an LCU line to which a current PU belongs) from the dependent view is enabled, it is necessary to delay encoding of the dependent view by three LCU lines for encoding of the base view.

Figure 5:
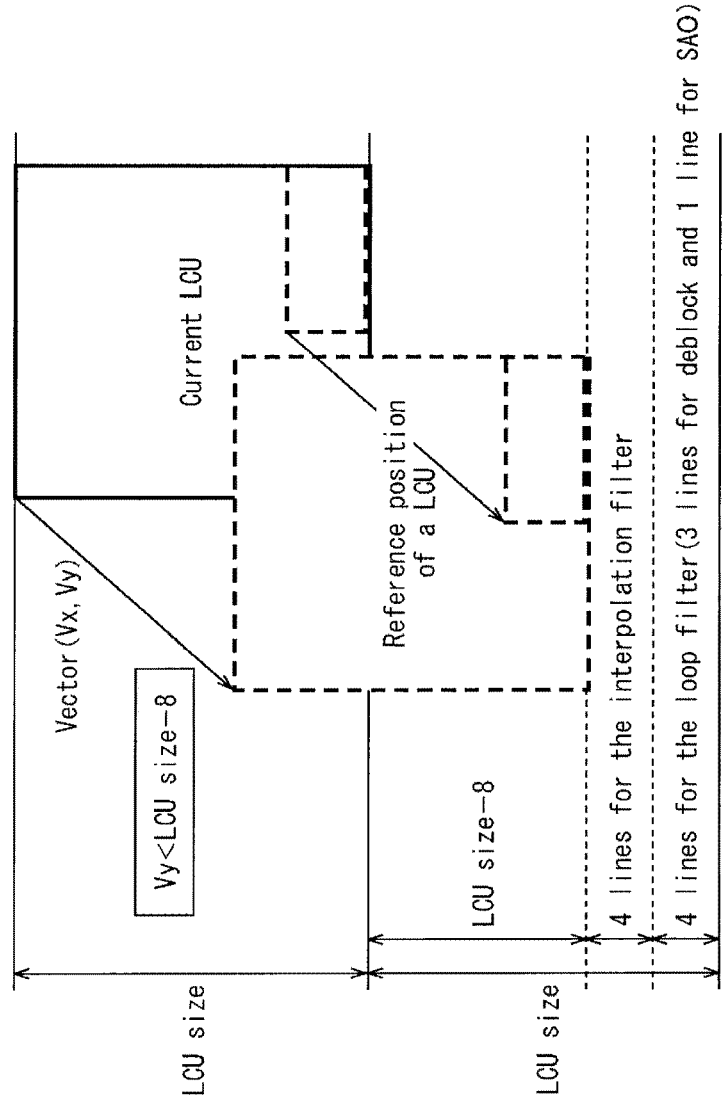
FIG. 5 is a diagram illustrating the constraint of a search range of an inter-view motion vector.

Also, while it is necessary for four lower lines in the LCU to wait for the loop filter as described above with reference to FIG. 4, four lines above the four waiting lines of the loop filter are actually lines necessary for an interpolation filter of motion compensation as illustrated in FIG. 5.

Therefore, when the encoding of the dependent view is delayed by two lines with respect to the encoding of the base view, reference from the dependent view is actually enabled from an LCU size of the LCU after the current LCU line to a size of (LCU size—8) lines excluding eight lower lines.

That is, in this case, a maximum value of the positive direction of a Vy component of the inter-view MV becomes (LCU size—8).

Also, when the loop filter is set to be turned off in the multi-view image encoding device 11, the reference range of the inter-view MV is constrained to lines excluding four lines for the interpolation filter of the motion compensation among the LCU lines after the current LCU line because it is not necessary to wait for the four waiting lines of the loop filter described above with reference to FIG. 4.

Figure 6:
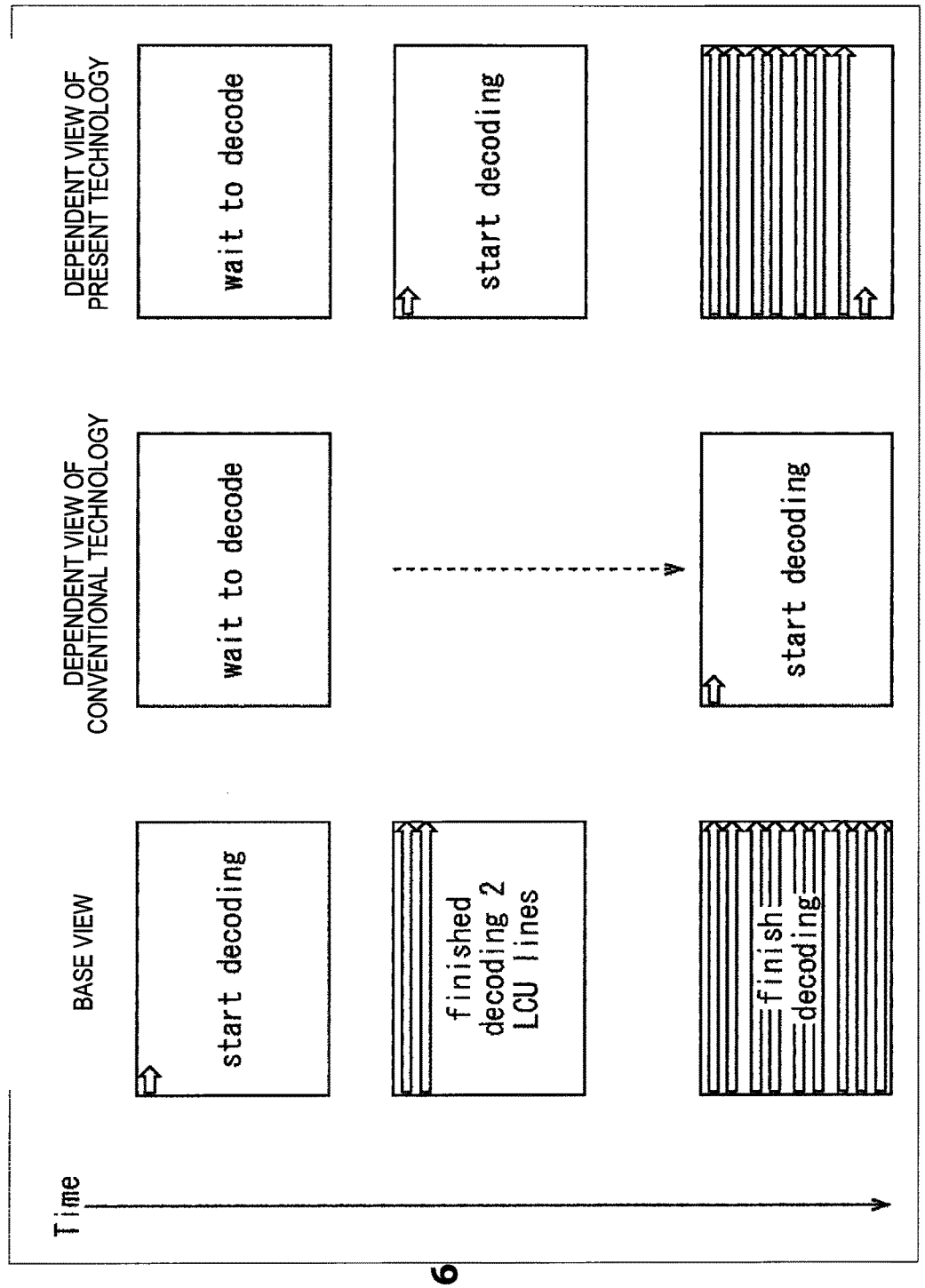
FIG. 6 is a diagram illustrating an example of an effect of the present technology.

As described above, it is possible to start decoding of the dependent view image at a position at which two LCU lines of the decoding of the base view image end in the present technology as illustrated in FIG. 6 by limiting the reference range of the vertical direction of the inter-view MV.

That is, while the decoding of the dependent view image does not start if the decoding of the base view image does not end in the conventional technology (HEVC), it is possible to perform parallel processing of decoding of the base view image and decoding of the dependent view image from a second LCU line of the base view image in the present technology.

Also, although an example of the decoding has been described in the example of FIG. 6, the same is true even in the encoding. In addition, because the reference range is constrained in the encoding, a search process of the inter-view MV becomes simple.

[Operation of Multi-View Image Encoding Device]

Figure 7:
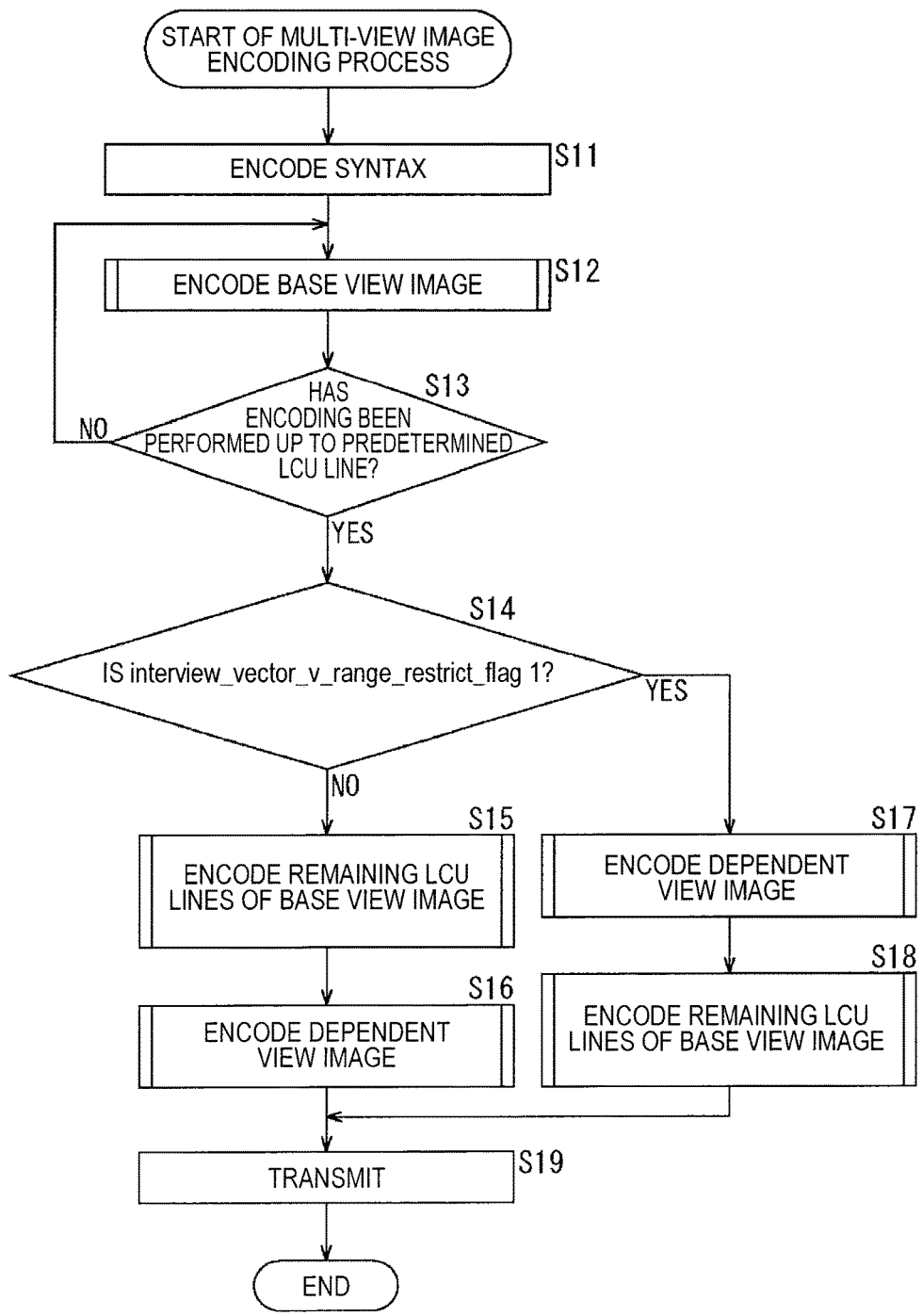
FIG. 7 is a flowchart illustrating a multi-view image encoding process.

Next, with reference to a flowchart of FIG. 7, a multi-view image encoding process will be described as an operation of the multi-view image encoding device 11 of FIG. 1. In the example of FIG. 7, the delays of the encoding process and the decoding process are two LCU lines and are preset to be limited to (LCU size—8) or less when there is a limit of the positive direction of the Vy component of the inter-view MV. In addition, the number of lines of the delay during view processing and a value of the limit of the positive direction of the V component of the inter-view MV are exemplary and the present disclosure is not limited to the above-described values.

In step S11, the syntax encoding section 21 sets and encodes syntaxes of a base view and a dependent view. Also, at this time, the syntax encoding section 21 sets inter-view_vector_v_range_restrict_flag, which is information about the limit of the V direction of the search range of the inter-view MV, as one of the syntaxes.

The syntax encoding section 21 supplies interview_vector_v_range_restrict_flag to the timing control section 22 and the dependent view encoding section 24. In addition, the encoded syntax is supplied to the transmission section 26.

In step S12, the base view encoding section 23 encodes a base view image under control of the timing control section 22. Also, the encoding process will be described in detail with reference to FIG. 8. In the process of step S12, encoded data of the base view image is supplied to the transmission section 26. At this time, the base view encoding section 23 supplies progress information of the encoding process of the base view image to the timing control section 22.

In step S13, the timing control section 22 determines whether the base view encoding section 23 has encoded predetermined LCU lines (for example, two LCU lines) by referring to the progress information from the base view encoding section 23. The number of predetermined LCU lines differs with each example.

When it is determined that the base view encoding section 23 has not yet encoded the predetermined LCU lines in step S13, the process returns to step S12. A subsequent process is iterated. On the other hand, when it is determined that the base view encoding section 23 has encoded the predetermined LCU lines in step S13, the process proceeds to step S14.

In step S14, the timing control section 22 determines whether interview_vector_v_range_restrict_flag (a search range limit flag of the V direction) supplied from the syntax encoding section 21 is 1. When it is determined that interview_vector_v_range_restrict_flag supplied from the syntax encoding section 21 is 0 in step S14, the process proceeds to step S15.

The timing control section 22 causes the base view encoding section 23 to encode the remaining LCU lines of the base view image in step S15. Then, the timing control section 22 causes the dependent view encoding section 24 to perform a dependent view image encoding process in step S16 after the encoding of the base view image is completed in step S15.

That is, in step S15, the base view encoding section 23 encodes the remaining LCU lines of the base view image. Then, in step S16, the dependent view encoding section 24 encodes the dependent image. Also, the encoding process in steps S15 and S16 is also basically similar to an encoding process to be described later with reference to FIG. 8. In the process of step S15, the encoded data of the base view is supplied to the transmission section 26. In the process of step S16, the encoded data of the dependent view image is supplied to the transmission section 26.

On the other hand, when it is determined that interview_vector_v_range_restrict_flag supplied from the syntax encoding section 21 is 1 in step S14, the process proceeds to step S17.

The timing control section 22 causes the dependent view encoding section 24 to perform a dependent view image encoding process in step S17. In parallel with this, the timing control section 22 causes the base view encoding section 23 to encode the remaining LCU lines of the base view image in step S18.

That is, in step S17, the dependent view encoding section 24 encodes the dependent image. Also, the dependent view image encoding process will be described later with reference to FIG. 9. In this encoding process, the search range of the V direction of the inter-view MV is constrained according to interview_vector_v_range_restrict_flag supplied from the syntax encoding section 21 and the encoding process is performed. The encoded data of the dependent view image is supplied to the transmission section 26.

In addition, in parallel with the process of step S17, the base view encoding section 23 encodes the remaining LCU lines of the base view image in step S18. Also, the encoding process in step S18 is also similar to the encoding process to be described later with reference to FIG. 8. In the process of step S18, the encoded data of the base view image is supplied to the transmission section 26.

In step S19, the transmission section 26 generates an encoded stream by multiplexing the syntax from the syntax encoding section 21, the encoded data of the base view from the base view encoding section 23, and the encoded data of the dependent view from the dependent view encoding section 24.

[Example of Encoding Process]

Figure 8:
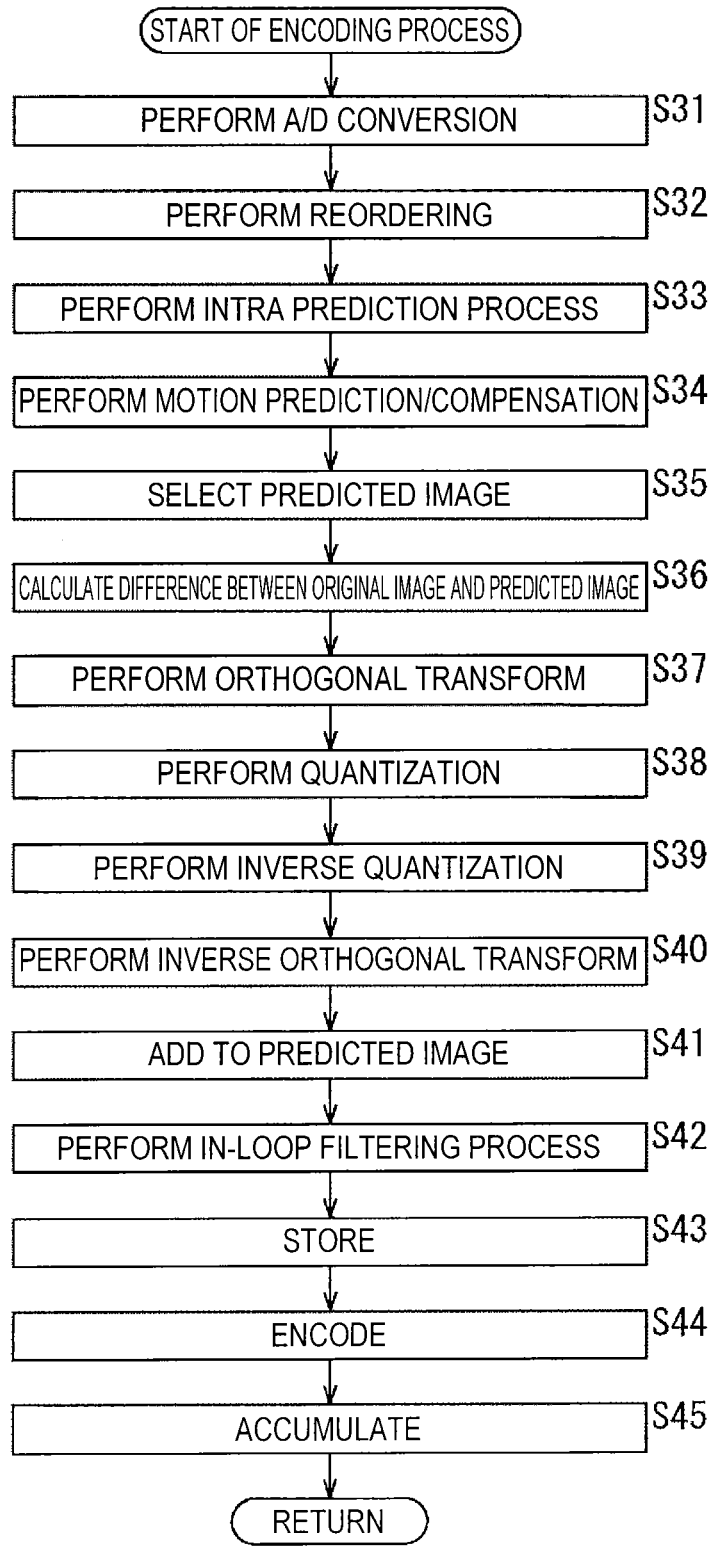
FIG. 8 is a flowchart illustrating an encoding process.

Next, with reference to the flowchart of FIG. 8, the encoding process of step S12 of FIG. 7 will be described. Also, the encoding process of steps S15, S16, and S18 of FIG. 7 is performed as in the process of FIG. 8.

A picture of the image of the base view that is an image (moving image) to be encoded is sequentially supplied to the A/D conversion section 111 in the display order. In step S31, the A/D conversion section 111 converts an analog signal according to A/D conversion when the supplied picture is an analog signal, and supplies the converted analog signal to the picture reordering buffer 112.

In step S32, the picture reordering buffer 112 temporarily stores a picture from the A/D conversion section 111 and reads a picture according to a structure of a predetermined GOP, so that a process of reordering a picture sequence from the display order to the encoding order is performed. The picture read from the picture reordering buffer 112 is supplied to the calculation section 113, the intra-picture prediction section 122, and the inter prediction section 123.

In step S33, the intra-picture prediction section 122 performs intra prediction (intra-picture prediction) to generate a predicted image. At this time, the intra-picture prediction section 122 obtains an encoding cost required to encode the target block using the predicted image, that is, an encoding cost required to encode a residual or the like for the predicted image in the target block, and supplies the obtained encoding cost to the predicted image selection section 124 along with the predicted image.

In step S34, the inter prediction section 123 performs a motion prediction/compensation process to generate a predicted image. That is, the inter prediction section 123 performs motion detection using a target block of a target picture from the picture reordering buffer 112 and a candidate picture read from the DPB 25 and detects an inter-MV (which also includes an inter-view MV). The inter prediction section 123 generates the predicted image by performing motion compensation for compensating for a shift of a motion amount of the candidate picture from the DPB 25 according to the inter-MV of the target block.

In step S35, the predicted image selection section 124 selects one having a lower encoding cost from predicted images from the intra-picture prediction section 122 and the inter prediction section 123, and supplies the selected predicted image to the calculation sections 113 and 120.

Here, the intra-picture prediction section 122 supplies information about intra prediction as header information to the variable length encoding section 116. The inter prediction section 123 supplies information about inter prediction (information of the MV or the like) as the header information to the variable length encoding section 116.

In step S36, the calculation section 113 calculates a difference between the original image of the picture reordering buffer 112 and the predicted image supplied from the predicted image selection section 124, and supplies the calculated difference to the orthogonal transform section 114.

In step S37, the orthogonal transform section 114 performs an orthogonal transform such as a discrete cosine transform or a Karhunen-Loeve transform on (a residual obtained by subtracting the predicted image or a pixel value of) a target block from the calculation section 113, and supplies a transform coefficient obtained as a result thereof to the quantization section 115.

In step S38, the quantization section 115 quantizes the transform coefficient supplied from the orthogonal transform section 114 and supplies a quantization value obtained as a result thereof to the inverse quantization section 118.

In step S39, the inverse quantization section 118 inversely quantizes the quantization value from the quantization section 115 into a transform coefficient and supplies the transform coefficient to the inverse orthogonal transform section 119.

In step S40, the inverse orthogonal transform section 119 performs an inverse orthogonal transform on the transform coefficient from the inverse quantization section 118 and supplies the transformed transform coefficient to the calculation section 120.

In step S41, the calculation section 120 obtains a decoded image in which a target block is decoded (locally decoded) by adding the pixel value of the predicted image supplied from the predicted image selection section 124 to the data supplied from the inverse orthogonal transform section 119 if necessary, and supplies the obtained decoded image to the in-loop filter 121.

In step S42, the in-loop filter 121 performs an in-loop filtering process. For example, when the in-loop filter 121 is constituted of a deblocking filter, the in-loop filter 121 removes (reduces) block distortion occurring in the decoded image by filtering the decoded image from the calculation section 120, and supplies the decoded image after the distortion removal (reduction) to the DPB 25.

In step S43, the DPB 25 stores the decoded image from the in-loop filter 121.

The quantization value quantized in the above-described step S38 is supplied to the variable length encoding section 116 as well as the inverse quantization section 118.

In step S44, the variable length encoding section 116 performs lossless encoding on the quantization value from the quantization section 115 and supplies encoded data obtained as a result thereof to the accumulation buffer 117.

In step S45, the accumulation buffer 117 temporarily stores the encoded data from the variable length encoding section 116 and outputs the stored encoded data at a predetermined data rate. The encoded data output from the accumulation buffer 117 is supplied to the transmission section 26 of FIG. 1.

[Example of Encoding Process]

Figure 9:
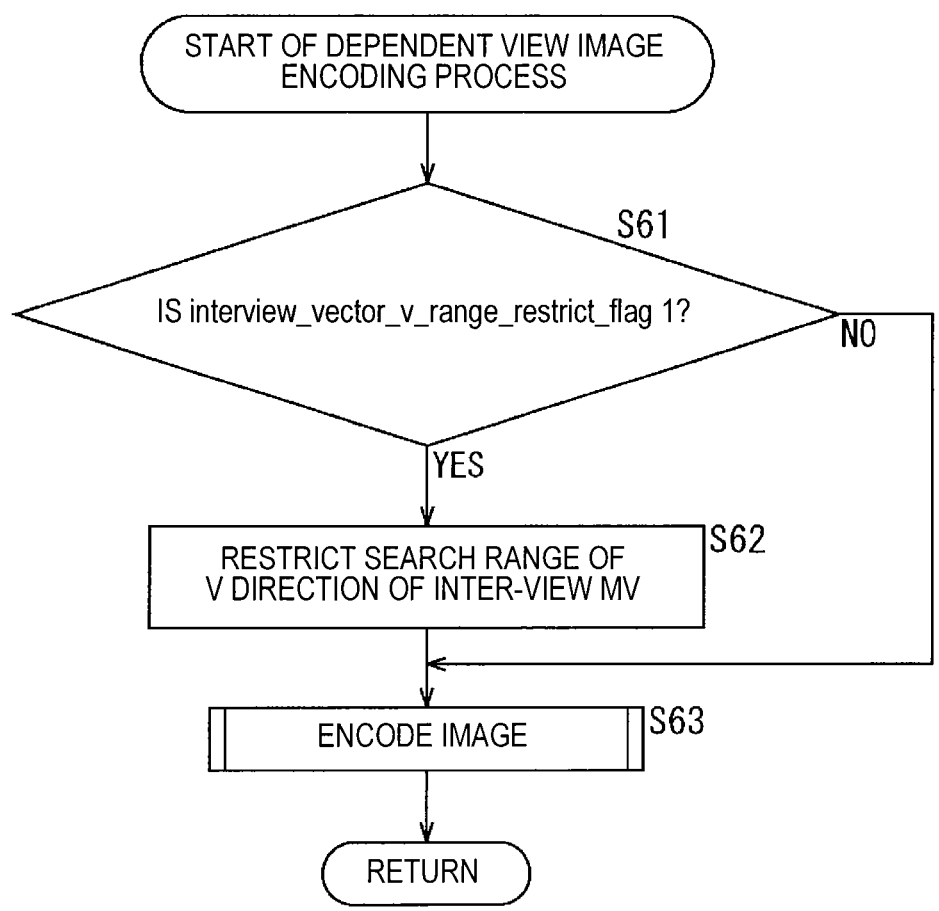
FIG. 9 is a flowchart illustrating an encoding process of a dependent view image.

Next, with reference to a flowchart of FIG. 9, the dependent view image encoding process of step S17 of FIG. 7 will be described.

In the case of YES in step S14 of FIG. 7, the dependent view encoding section 24 receives a control signal indicating an encoding process start from the timing control section 22. In correspondence with this, in step S61, the dependent view encoding section 24 determines whether interview_vector_v_range_restrict_flag (a search range limit flag of the V direction) supplied from the syntax encoding section 21 is 1.

In step S61, when it is determined that interview_vector_v_range_restrict_flag supplied from the syntax encoding section 21 is 1 in step S14, the process proceeds to step S62.

In step S62, the dependent view encoding section 24 restricts the search range of the V direction of the inter-view MV, for example, to a range of (LCU size—8) lines. That is, the V component of the positive direction of the inter-view MV is limited to (LCU size—8) or less. Also, a V component of a negative direction of the inter-view MV may also be limited.

When it is determined that interview_vector_v_range_restrict_flag supplied from the syntax encoding section 21 is 0 in step S61, the process of step S62 is skipped. The process proceeds to step S63.

In step S63, the dependent view encoding section 24 encodes a dependent view image. This encoding process is basically similar to the above-described encoding process of FIG. 8, except that the search range of the V direction of the inter-view MV is constrained in the motion prediction/compensation process of step S34 of FIG. 8. Therefore, description thereof is omitted to avoid redundancy.

In the process of step S15, the encoded data of the dependent view image is generated and the encoded data of the dependent view image is supplied to the transmission section 26.

When interview_vector_v_range_restrict_flag is 1 in this manner, the search range of the V direction of the inter-view MV is constrained to a range up to a preset value when a motion prediction/compensation process is performed in the dependent view image.

Thereby, because an image out of the constrained search range is not used, it is possible to perform parallel processing of a base view image and a dependent image on the encoding side or the decoding side.

2. Second Embodiment

Configuration Example of Multi-View Image Decoding Device

Figure 10:
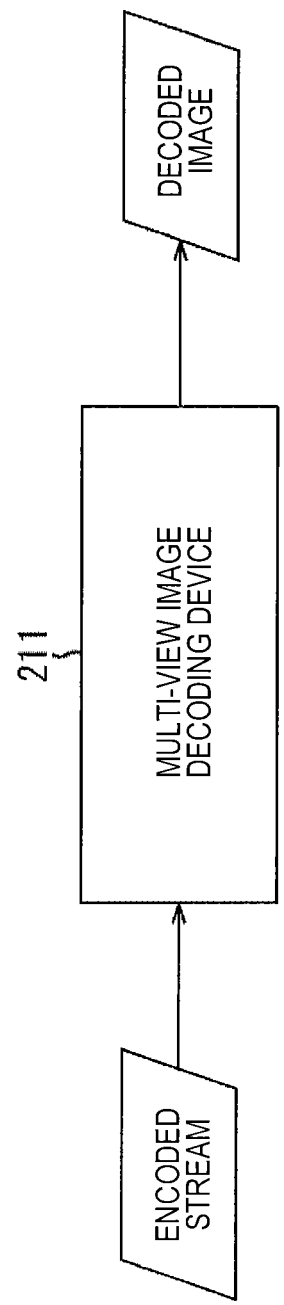
FIG. 10 is a diagram illustrating an example of a multi-view decoding device to which the present technology is applied.

FIG. 10 illustrates a configuration of an embodiment of a multi-view image decoding device serving as an image processing device to which the present disclosure is applied.

The multi-view image decoding device 211 of FIG. 10 decodes an encoded stream encoded by the multi-view image encoding device 11 of FIG. 1. That is, in the syntax of the encoded stream, search range limit information of the inter-view MV, which is information about the limit of a reference range of the vertical direction of the inter-view MV, is set.

Figure 11:
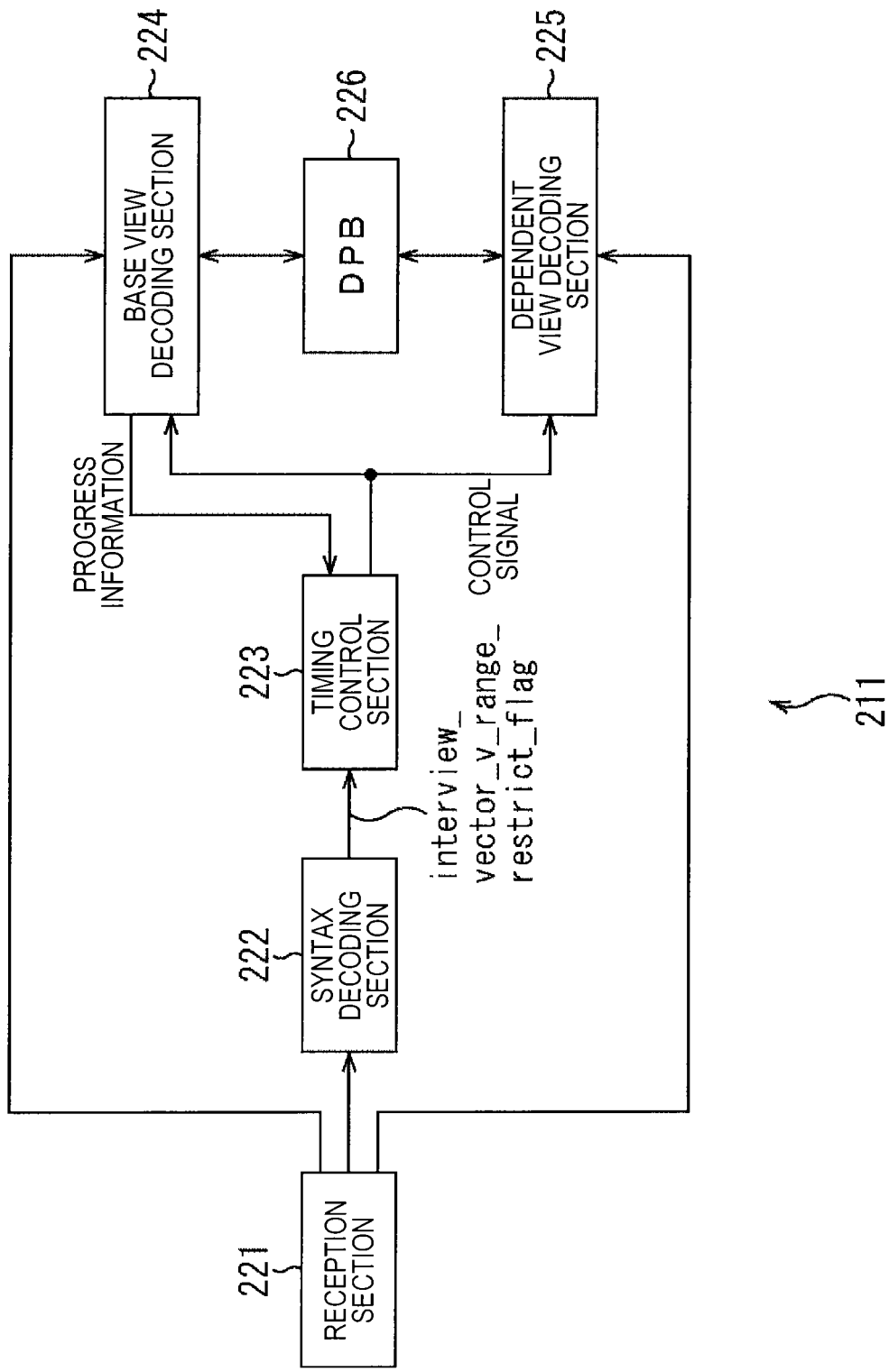
FIG. 11 is a block diagram illustrating a main configuration example of the multi-view image decoding device.

FIG. 11 is a block diagram illustrating a configuration example of the multi-view image decoding device 211 of FIG. 10. Also, in the example of FIG. 11, an example in which a two-view image including a base view (view) and a dependent view (view) is encoded is shown in association with the example of FIG. 2.

In the example of FIG. 11, the multi-view image decoding device 211 is configured to include a reception section 221, a syntax decoding section 222, a timing control section 223, a base view decoding section 224, a dependent view decoding section 225, and a DPB 226. That is, the multi-view image decoding device 211 receives an encoded stream transmitted from the multi-view image encoding device 11 and decodes encoded data of a base view image and encoded data of a dependent view image.

The reception section 221 receives the encoded stream transmitted from the multi-view image encoding device 11 of FIG. 1. The reception section 221 separates the encoded data of the base view image, the encoded data of the dependent view image, and the like from the received bitstream.

Then, the reception section 221 supplies the encoded data of the base view image to the base view decoding section 224. The reception section 221 supplies the encoded data of the dependent view image to the dependent view decoding section 225. In addition, the reception section 221 supplies the encoded data of the base view image and the encoded data of the dependent view image to the syntax decoding section 222.

The syntax decoding section 222 extracts and sequentially decodes an SPS, a PPS, SEI, and a slice header from the encoded data of the base view image and the encoded data of the dependent view image. Then, the syntax decoding section 222, for example, decodes interview_vector_v_range_restrict_flag set in the SPS and supplies the decoded interview_vector_v_range_restrict_flag to the timing control section 223.

According to interview_vector_v_range_restrict_flag supplied from the syntax decoding section 222, the timing control section 223 refers to progress information of a decoding process from the base view decoding section 224 and supplies a control signal for controlling timings of a base view image decoding process and a dependent image decoding process.

That is, the timing control section 223 starts the decoding process of the base view decoding section 224. Then, the timing control section 223 causes the base view decoding section 224 and the dependent view decoding section 225 to operate in parallel if the decoding process of the base view decoding section 224 reaches a predetermined LCU line when interview_vector_v_range_restrict_flag supplied from the syntax decoding section 222 is 1 (ON).

On the other hand, the timing control section 223 starts the decoding process of the dependent view decoding section 225 when the decoding process of the base view decoding section 224 ends if interview_vector_v_range_restrict_flag supplied from the syntax decoding section 222 is 0 (OFF).

The base view decoding section 224 decodes the encoded data of the base view supplied from the reception section 221 and generates a base view image. Also, the base view decoding section 224 selects a reference picture to be referred to when decoding a decoding target image from the decoded image of the base view stored in the DPB 226 and decodes the image using the selected reference picture. At this time, the decoded image of the decoding result is temporarily stored in the DPB 226.

The dependent view decoding section 225 decodes the encoded data of the dependent view supplied from the reception section 221 and generates an image of the dependent view. Also, the dependent view decoding section 225 selects a reference picture to be referred to when decoding a decoding target image from the decoded image of the dependent view stored in the DPB 226 and decodes the image using the selected reference picture. At this time, the decoded image of the decoding result is temporarily stored in the DPB 226.

Also, when interview_vector_v_range_restrict_flag is turned on, the dependent view decoding section 225 decodes the encoded data of the dependent view encoded by limiting the vertical direction of the search range in the decoded image of the base view. Therefore, a vertical (V) component of the obtained MV is included in a constrained search range.

The DPB 226 temporarily stores an image (decoded image) after decoding obtained by decoding an image of a decoding target in each of the base view decoding section 224 and the dependent view decoding section 225 as (a candidate for) a reference picture to be referred to when the predicted image is generated.

Because the DPB 226 is shared by the base view decoding section 224 and the dependent view decoding section 225, each of the base view decoding section 224 and the dependent view decoding section 225 can refer to, in addition to the decoded image obtained locally, a decoded image obtained y another view encoding section. Note that the base view encoding section 23 that encodes a base viewpoint image refers only to an image of the same viewpoint (base view).

[Configuration Example of View Decoding Section]

Figure 12:
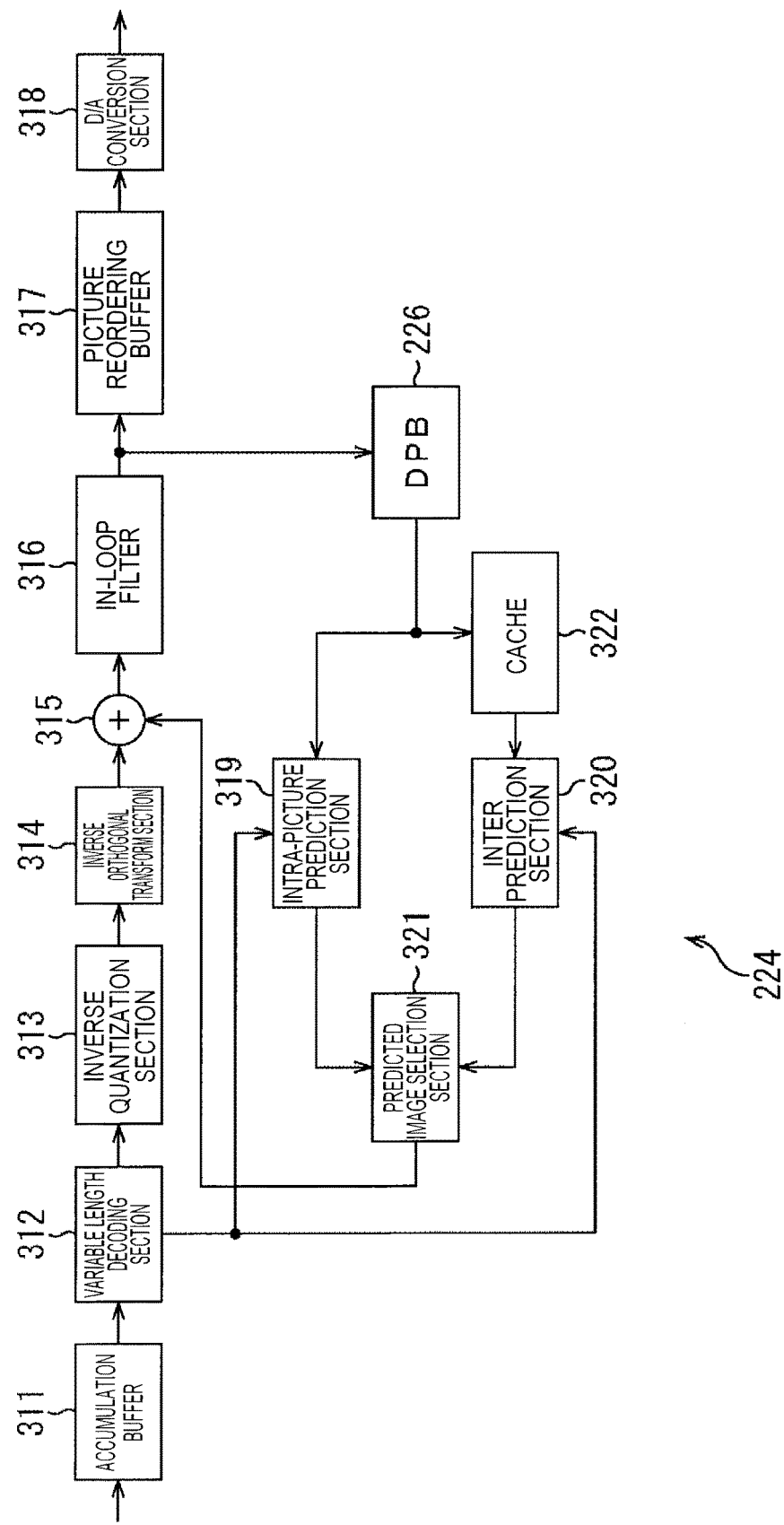
FIG. 12 is a block diagram illustrating a configuration example of a view decoding section.

FIG. 12 is a block diagram illustrating a configuration example of a base view decoding section 224. Also, the dependent view decoding section 225 is also configured to be basically similar to the base view decoding section 224.

In the example of FIG. 12, the base view decoding section 224 includes an accumulation buffer 311, a variable length decoding section 312, an inverse quantization section 313, an inverse orthogonal transform section 314, a calculation section 315, an in-loop filter 316, a picture reordering buffer 317, a digital/analog (D/A) conversion section 318, an intra-picture prediction section 319, an inter prediction section 320, a predicted image selection section 321, and a cache 322.

The encoded data of the base view image from the reception section 221 (FIG. 11) is supplied to the accumulation buffer 311.

The accumulation buffer 311 temporarily stores the encoded data to be supplied thereto and supplies the stored encoded data to the variable length decoding section 312.

The variable length decoding section 312 restores a quantization value or header information by performing variable length decoding on encoded data from the accumulation buffer 311. Then, the variable length decoding section 312 supplies the quantization value to the inverse quantization section 313 and supplies the header information to the intra-picture prediction section 319 and the inter prediction section 320.

The inverse quantization section 313 inversely quantizes the quantization value from the variable length decoding section 312 into a transform coefficient and supplies the transform coefficient to the inverse orthogonal transform section 314.

The inverse orthogonal transform section 314 inversely transforms the transform coefficient from the inverse quantization section 313 and supplies the inversely transformed transform coefficient to the calculation section 315 in units of macro blocks (LCUs).

The calculation section 315 performs decoding by adding the predicted image supplied from the predicted image selection section 321 to the target block if necessary using the macro block supplied from the inverse orthogonal transform section 314 as a target block of the decoding target. The calculation section 315 supplies the decoded image obtained as a result thereof to the in-loop filter 316.

The in-loop filter 316, for example, is constituted of a deblocking filter. Also, for example, when the HEVC scheme is adopted, the in-loop filter 316 is constituted of a deblocking filter and an adaptive offset filter. The in-loop filter 316, for example, performs similar filtering to the in-loop filter 121 of FIG. 3 on the decoded image from the calculation section 315 and supplies the decoded image after the filtering to the picture reordering buffer 317.

The picture reordering buffer 317 reorders a picture sequence to an original sequence (display order) by temporarily storing a picture of the decoded image from the in-loop filter 316 and supplies a reordered result to the D/A conversion section 318.

When it is necessary to output the picture from the picture reordering buffer 317 in an analog signal, the D/A conversion section 318 performs D/A conversion on the picture and outputs a D/A conversion result.

In addition, the in-loop filter 316 supplies the DPB 226 with decoded images of an intra (I)-picture, a P-picture, and Bs-pictures that are referable pictures among filtered decoded images.

Here, the DPB 226 stores a picture of a decoded image from the in-loop filter 316, that is, a picture of a base view image, as a candidate (candidate picture) of a reference picture to be referred to when a predicted image to be used in decoding to be performed at a later time is generated.

Because the DPB 226 is shared by the base view decoding section 224 and the dependent view decoding section 225 as described with reference to FIG. 11, an image of the dependent view decoded in the dependent view decoding section 225 or the like as well as an image of the base view decoded in the base view decoding section 224 is stored.

The intra-picture prediction section 319 recognizes whether the target block is encoded using the predicted image generated in intra prediction (inter-picture prediction) based on header information from the variable length decoding section 312.

When the target block is encoded using the predicted image generated in intra prediction, the intra-picture prediction section 319 reads an already decoded portion (decoded image) from a picture (target picture) including the target block from the DPB 226 as in the intra-picture prediction section 33 of FIG. 3. Then, the intra-picture prediction section 319 supplies part of the decoded image of the target picture read from the DPB 226 as the predicted image of the target block to the predicted image selection section 321.

The cache 322 reads pixels of a range available in the inter prediction section 320 from among pictures of the DPB 226 and temporarily accumulates the read pixels.

The inter prediction section 320 recognizes whether the target block is encoded using the predicted image generated in intra prediction based on header information from the variable length decoding section 312.

When the target block is encoded using a predicted image generated in the inter prediction, the inter prediction section 320 recognizes an optimum inter prediction mode (including an inter-view prediction mode) of the target block based on the header information from the variable length decoding section 312, and reads a candidate picture corresponding to the optimum inter prediction mode as a reference picture from candidate pictures stored in the cache 322.

Further, the inter prediction section 320 generates a predicted image by recognizing an inter-MV representing motion used in generation of the predicted image of the target block based on the header information from the variable length decoding section 312 and performing motion compensation of a reference picture according to the inter-MV as in the inter prediction section 123 of FIG. 3. Also, in the dependent view, the inter-MV includes an inter-view MV representing an inter-view shift as well as an MV representing a temporal shift.

That is, the inter prediction section 320 acquires a block (corresponding block) of a position moved (shifted) according to the inter MV of the target block from the position of the target block in the candidate picture as a predicted image.

Then, the inter prediction section 320 supplies the predicted image to the predicted image selection section 321.

When the predicted image is supplied from the intra-picture prediction section 319, the predicted image selection section 321 selects the predicted image and supplies the selected predicted image to the calculation section 315. When the predicted image is supplied from the inter prediction section 320, the predicted image selection section 321 selects the predicted image and supplies the selected predicted image to the calculation section 315.

[Operation of Multi-View Image Decoding Device]

Next, with reference to a flowchart of FIG. 13, the multi-view image decoding process will be described as the operation of the multi-view image decoding device 211 of FIG. 10. Also, as described above with reference to FIG. 7, in the example of FIG. 13, delays of encoding and decoding processes on a base view and a dependent view are two LCU lines and a Vy component is preset to be limited to (LCU size—8) or less when the positive direction of the Vy component of the inter-view MV is limited. That is, the search range of the vertical (V) positive direction of the inter-view MV is set to (LCU size—8) lines.

In step S111, the reception section 221 receives the encoded stream transmitted from the multi-view image encoding device 11 of FIG. 1. The reception section 221 separates the encoded data of the base view image, the encoded data of the dependent view image, and the like from the received bitstream.

Then, the reception section 221 supplies the encoded data of the base view image to the base view decoding section 224. The reception section 221 supplies the encoded data of the dependent view image to the dependent view decoding section 225. In addition, the reception section 221 supplies the encoded data of the base view image and the encoded data of the dependent view image to the syntax decoding section 222.

The syntax decoding section 222 decodes the syntax in step S112. That is, the syntax decoding section 222 extracts and sequentially decodes an SPS, a PPS, SEI, and a slice header from the encoded data of the base view image and the encoded data of the dependent view image. Then, the syntax decoding section 222, for example, decodes interview_vector_v_range_restrict_flag set in the SPS and supplies the decoded interview_vector_v_range_restrict_flag to the timing control section 223.

In step S113, the base view decoding section 224 decodes encoded data of a base view image under control of the timing control section 223. Also, this decoding process will be described later with reference to FIG. 14. In the process of step S113, the encoded data is decoded and the base view image for every LCU is generated. At this time, the base view decoding section 224 supplies progress information of the base view image encoding process to the timing control section 22.

In step S114, the timing control section 223 determines whether the base view decoding section 224 has decoded predetermined LCU lines (for example, two LCU lines) by referring to the progress information from the base view decoding section 224. The number of LCU lines differs with each example.

When it is determined that the base view decoding section 224 has not yet encoded the predetermined LCU lines in step S114, the process returns to step S113. A subsequent process is iterated. On the other hand, when it is determined that the base view decoding section 224 has decoded the predetermined LCU lines in step S114, the process proceeds to step S115.

In step S115, the timing control section 223 determines whether interview_vector_v_range_restrict_flag (a search range limit flag of the V direction) supplied from the syntax decoding section 222 is 1. When it is determined that interview_vector_v_range_restrict_flag supplied from the syntax decoding section 222 is 0 in step S115, the process proceeds to step S116.

The timing control section 223 causes the base view decoding section 224 to decode the remaining LCU lines of the base view image in step S116. Then, the timing control section 223 causes the dependent view decoding section 225 to perform a dependent view image decoding process in step S117 after the decoding of the base view image is completed in step S116.

That is, in step S116, the base view decoding section 224 decodes the remaining LCU lines of the base view image. Then, in step S117, the dependent view decoding section 225 decodes the dependent image. Also, the decoding process in steps S116 and S117 is also basically similar to a decoding process to be described later with reference to FIG. 14. In the process of step S116, the base view is generated. In the process of step S117, the dependent view image is generated.

On the other hand, when it is determined that inter-view_vector_v_range_restrict_flag supplied from the syntax decoding section 222 is 1 in step S115, the process proceeds to step S118.

The timing control section 223 causes the dependent view decoding section 225 to perform a dependent view image decoding process in step S118. In parallel with this, the timing control section 223 causes the base view decoding section 224 to decode the remaining LCU lines of the base view image in step S119.

That is, in step S118, the dependent view decoding section 225 decodes a dependent image. The decoding process in S118 is also basically similar to a decoding process to be described later with reference to FIG. 14. That is, the only difference is that encoded data on which the encoding process is performed by limiting the search range of the V direction of the inter-view MV is decoded, and the dependent view image decoding process is basically the same as the decoding process of step S117. In the process of step S118, a dependent view image is generated.

In addition, in parallel with the process of step S118, in step S119, the base view decoding section 224 encodes the remaining LCU lines of the base view image. Also, the encoding process in step S119 is also basically similar to a decoding process to be described later with reference to FIG. 14. In the process of step S119, a base view image is generated.

[Example of Decoding Process]

Next, with reference to a flowchart of FIG. 14, the decoding process of step S113 of FIG. 13 will be described. Also, the decoding process of steps S116 to S119 of FIG. 13 is also basically similar to a process of FIG. 14.

Encoded data of an image of a base view is supplied from the reception section 221 (FIG. 11) to the accumulation buffer 311. In step S131, the accumulation buffer 311 temporarily stores the supplied encoded data and supplies the stored encoded data to the variable length decoding section 312.

In step S132, the variable length decoding section 312 restores a quantization value or header information by performing variable length decoding on encoded data from the accumulation buffer 311. Then, the variable length decoding section 312 supplies the quantization value to the inverse quantization section 313 and supplies the header information to the intra-picture prediction section 319 and the inter prediction section 320.

In step S133, the cache 322 reads pixels of a range available in the inter prediction section 320 from among pictures of the DPB 226 and temporarily accumulates the read pixels.

Figure 13:
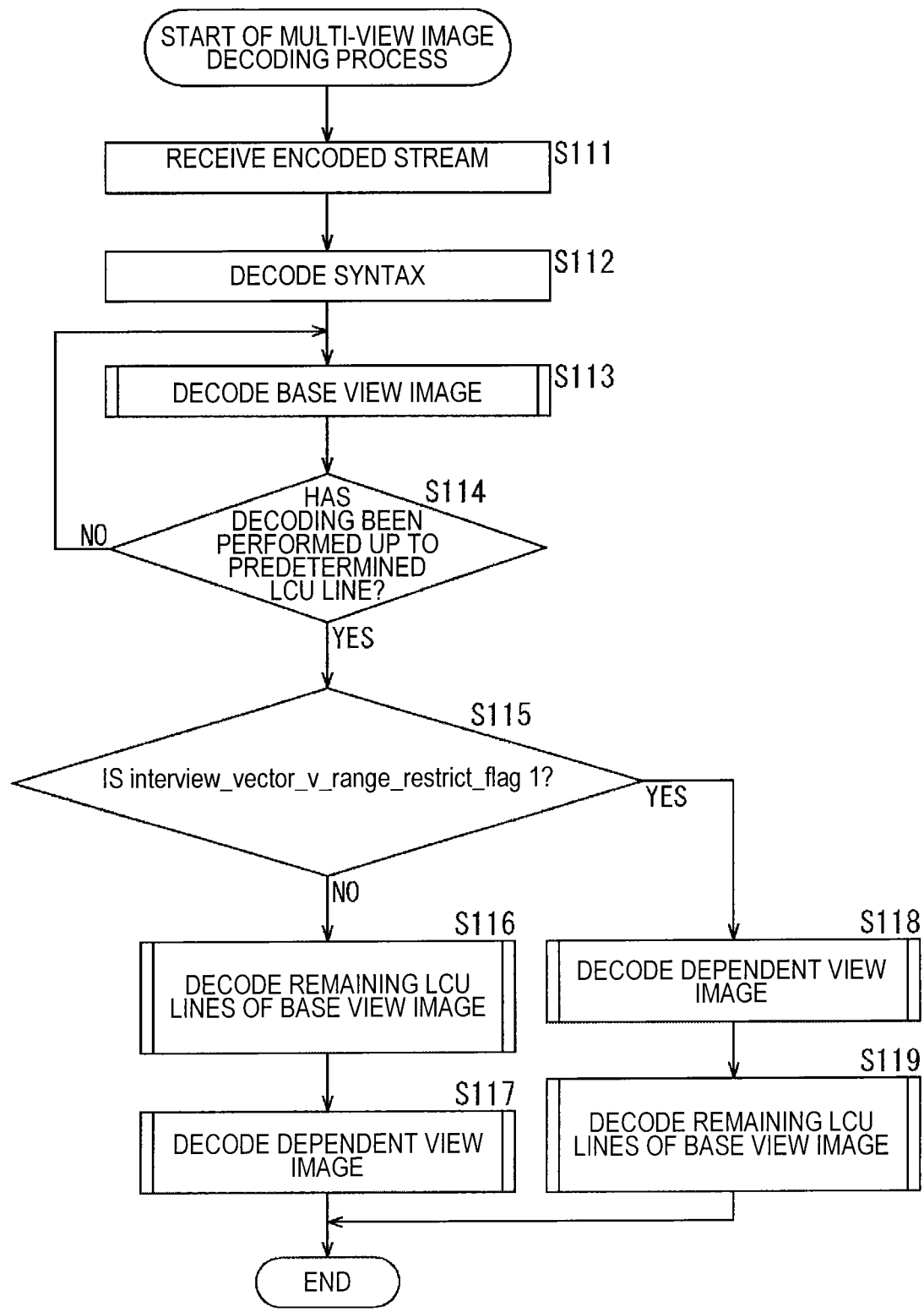
FIG. 13 is a flowchart illustrating a multi-view image decoding process.
Figure 14:
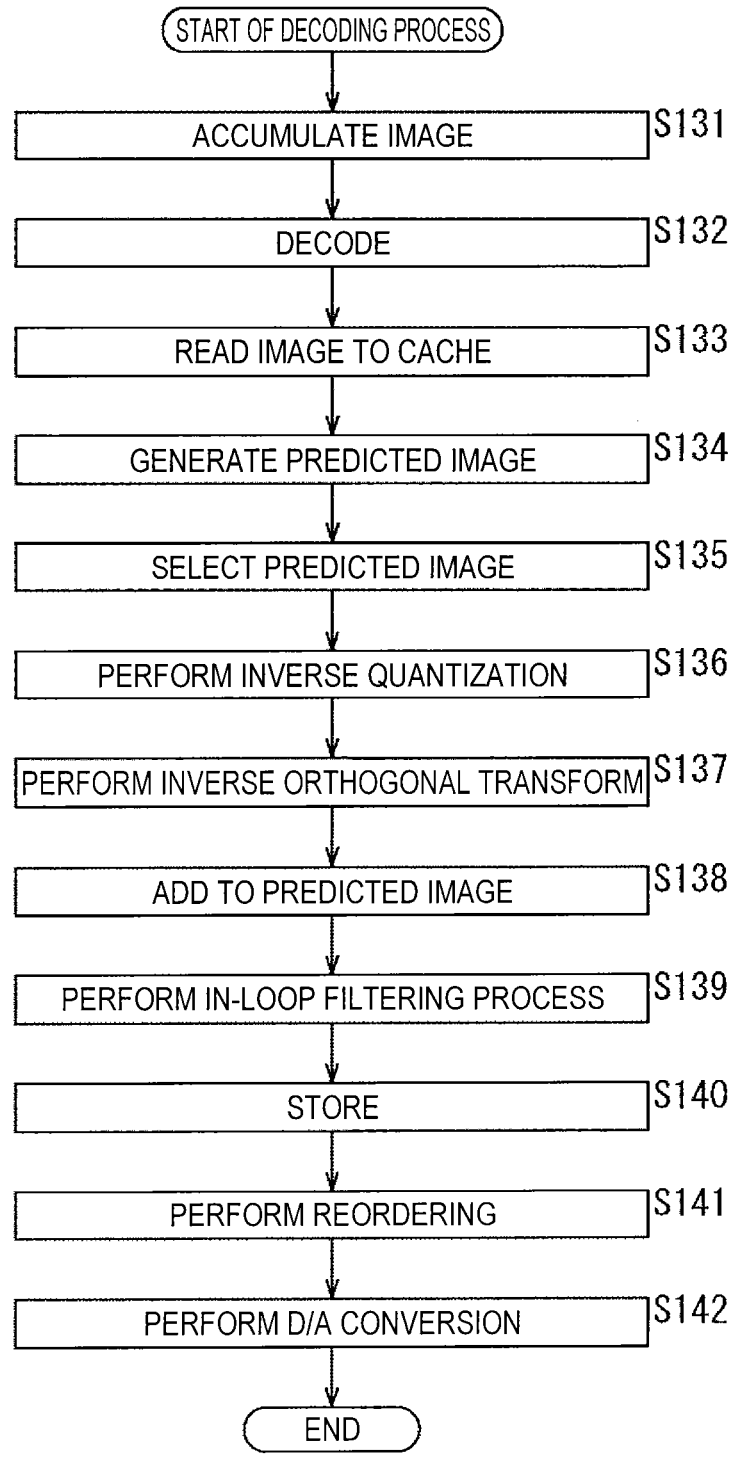
FIG. 14 is a flowchart illustrating a decoding process.

That is, in the decoding process of steps S113, S116, S117, and S119 of FIG. 13, for example, a range of pixels by which an MV can be found is read to the cache 322. On the other hand, in the decoding process of step S118 of FIG. 13, encoded data on which the encoding process is performed by limiting the search range of the V direction of the inter-view MV is decoded. That is, the search range of the V direction of the inter-view MV is constrained. Therefore, because it is only necessary to read pixels of a search range constrained at the time of encoding when the inter-view reference image is read to the cache 322 in the decoding of the dependent view image, the cache 322 need not have a large capacity.

In step S134, the intra-picture prediction section 319 or the inter prediction section 320 generates a predicted image according to a prediction mode of header information from the variable length decoding section 312. Also, at this time, the intra-picture prediction section 319 reads an already decoded portion (decoded image) from pictures including a target block, and supplies part of the decoded image of a target picture read from the DPB 226 as a predicted image of the target block to the predicted image selection section 321.

On the other hand, the inter prediction section 320 recognizes an optimum inter prediction mode of the target block based on the header information from the variable length decoding section 312, and reads a candidate picture corresponding to the optimum inter prediction mode as a reference picture from candidate pictures stored in the cache 322. In addition, the inter prediction section 320 recognizes an inter-MV representing motion used in generation of the predicted image of the target block based on the header information from the variable length decoding section 312, and generates the predicted image by performing motion compensation of the reference picture according to the inter-view MV as in the inter prediction section 123 of FIG. 3. The generated predicted image is supplied to the predicted image selection section 321.

In step S135, when the predicted image is supplied from the intra-picture prediction section 319, the predicted image selection section 321 selects the predicted image and supplies the selected predicted image to the calculation section 315. When the predicted image is supplied from the inter prediction section 320, the predicted image selection section 321 selects the predicted image and supplies the selected predicted image to the calculation section 315.

In step S136, the inverse quantization section 313 inversely quantizes the quantization value from the variable length decoding section 312 into a transform coefficient and supplies the transform coefficient to the inverse orthogonal transform section 314.

In step S137, the inverse orthogonal transform section 314 inversely transforms the transform coefficient from the inverse quantization section 313 and supplies the inversely transformed transform coefficient to the calculation section 315 in units of macro blocks (LCUs).

In step S138, the calculation section 315 performs decoding by adding the predicted image supplied from the predicted image selection section 321 to the target block if necessary using the macro block supplied from the inverse orthogonal transform section 314 as a target block of the decoding target. The thus obtained decoded image is supplied to the in-loop filter 316.

In step S139, the in-loop filter 316, for example, performs similar filtering to the in-loop filter 121 of FIG. 3 on the decoded image from the calculation section 315 and supplies the decoded image after the filtering to the DPB 226 and the picture reordering buffer 317.

In step S140, the DPB 226 stores a picture of a decoded image from the in-loop filter 316, that is, a picture of a base view image, as a candidate (candidate picture) of a reference picture to be referred to when a predicted image to be used in decoding to be performed at a later time is generated.

In step S141, the picture reordering buffer 317 reorders a picture sequence to an original sequence (display order) by temporarily storing a picture of the decoded image from the in-loop filter 316 and supplies a reordered result to the D/A conversion section 318.

In step S142, when it is necessary to output the picture from the picture reordering buffer 317 in an analog signal, the D/A conversion section 318 performs D/A conversion on the picture and outputs a D/A conversion result.

As described above, when interview_vector_v_range_restrict_flag is 1 and a motion prediction/compensation process is performed on the dependent view image, the search range of the V direction of the inter-view MV is constrained to a preset value. Therefore, because an image out of the constrained search range is not used, it is possible to perform parallel processing of a base view image and a dependent image on the encoding side or the decoding side.

In addition, because it is not necessary to read an image out of the search range, it is possible to reduce the capacity of the cache 322.

3. Third Embodiment

Example of Syntax

FIG. 15 is a diagram illustrating examples of syntax of an SPS and semantics about the SPS. Also, the example of the FIG. 15 is an example in which (LCU size—8) preset as a range limit value of the V direction is used.

In the case of the example of FIG. 15, as shown in the syntax, for example, when a profile is a "multi-view support profile" that is a profile for supporting multi-view in the SPS, interview_vector_v_range_restrict_flag, which is information about the limit of the V direction of the search range of the inter-view MV, is set.

In addition, the semantics is defined as follows.

When interview_vector_v_range_restrict_flag is 1, the vertical component of the inter-view MV used in the dependent view image is represented to be (LCU size—8) or less in units of luma pixels. If this flag is absent, its value is regarded as 0. If the profile is equal to a "stereo profile," its value is set to 1.

[Other Example of Syntax Encoding Process]

Figure 16:
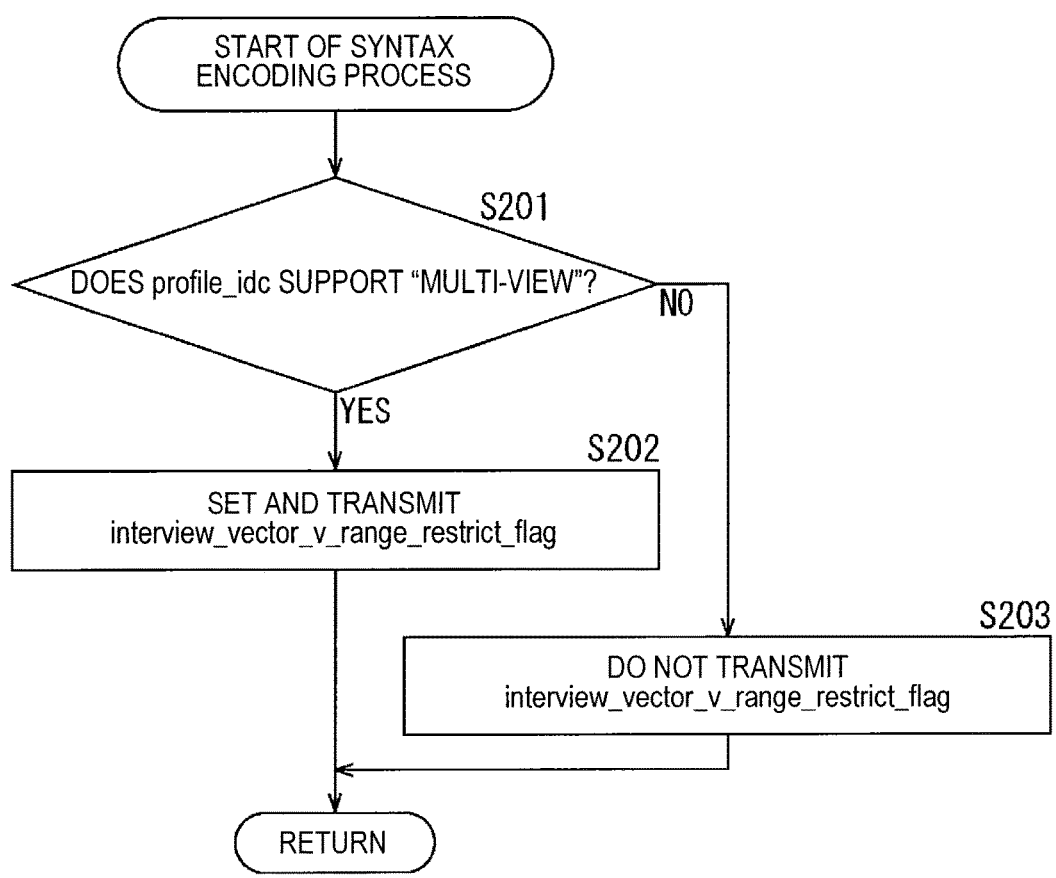
FIG. 16 is a flowchart illustrating an example of a syntax encoding process.

Next, with reference to a flowchart of FIG. 16, a syntax (SPS in the case of FIG. 15) encoding process to be performed in step S11 of FIG. 7 in the case of the syntax of FIG. 15 will be described.

In step S201, the syntax encoding section 21 determines whether the profile supports multi-view. That is, it is determined whether the profile is the "multi-view support profile."

When it is determined that the profile supports multi-view in step S201, the process proceeds to step S202. In step S202, the syntax encoding section 21 sets interview_vector_v_range_restrict_flag to 1 and transmits the SPS to the decoding side.

On the other hand, when it is determined that the profile does not support multi-view in step S201, the process proceeds to step S203. In step S203, the syntax encoding section 21 does not transmit interview_vector_v_range_restrict_flag to the decoding side. That is, when interview_vector_v_range_restrict_flag is regarded as 0 on the decoding side, the syntax encoding section 21 does not set interview_vector_v_range_restrict_flag in the SPS in step S202.

[Other Example of Dependent View Image Encoding Process]

Figure 17:
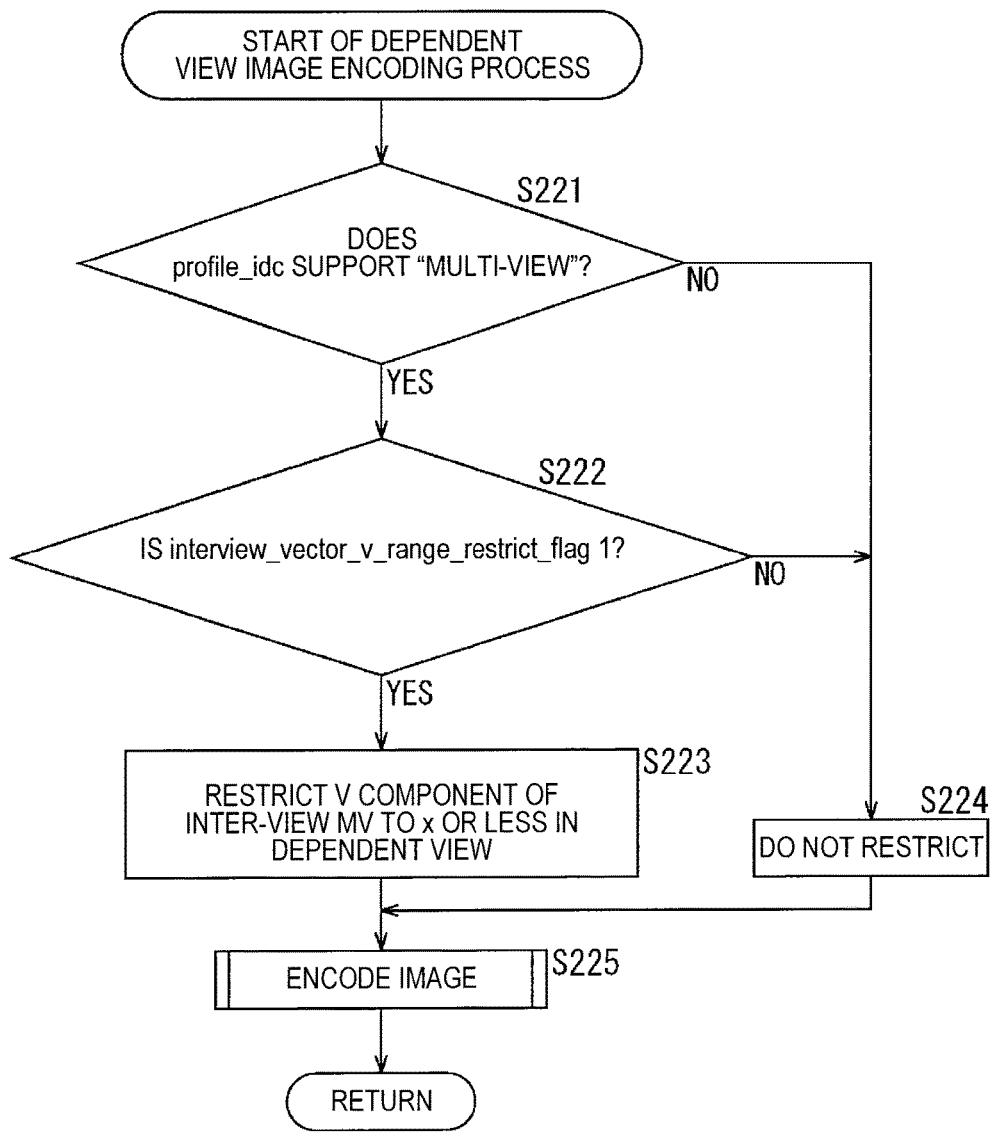
FIG. 17 is a flowchart illustrating an encoding process of a dependent view image.

Next, with reference to a flowchart of FIG. 17, an example of the dependent view image encoding process to be performed in step S17 of FIG. 7 in the case of the syntax of FIG. 15 will be described. Also, this process is another example of the dependent view image encoding process of FIG. 9.

In addition, in the case of this example, profile_idc is supplied from the syntax encoding section 21 to the timing control section 22 and the dependent view encoding section 24. interview_vector_v_range_restrict_flag is supplied only when profile_idc supports multi-view.

The dependent view encoding section 24 receives a control signal indicating an encoding process start from the timing control section 22 in the case of YES in step S14 of FIG. 7. In response, in step S221, the dependent view encoding section 24 refers to profile_idc supplies from the syntax encoding section 21 and determines whether profile_idc supports multi-view.

When it is determined that profile_idc supports multi-view in step S221, the process proceeds to step S222. In step S222, the dependent view encoding section 24 determines whether interview_vector_v_range_restrict_flag (a search range limit flag of the V direction) supplied from the syntax encoding section 21 is 1.

When it is determined that interview_vector_v_range_restrict_flag supplied from the syntax encoding section 21 is 1 in step S222, the process proceeds to step S223.

In step S223, the dependent view encoding section 24 limits the vertical (V) component of the inter-view MV to x (for example, (LCU size—8) which is preset)) in the dependent view.

On the other hand, when it is determined that profile_idc does not support multi-view in step S221 or when it is determined that interview_vector_v_range_restrict_flag is 0 in step S222, the process proceeds to step S224.

In step S224, the dependent view encoding section 24 does not limit the V component of the inter-view MV in the dependent view as in the past.

After the process in step S223 or S224, the process proceeds to step S225. In step S225, the dependent view encoding section 24 encodes a dependent view image. This encoding process is basically similar to the above-described encoding process of FIG. 8, except that the value of the V component (that is, the search range of the V direction) of the inter-view MV is constrained in the motion prediction/compensation process of step S34 of FIG. 8. Therefore, description thereof is omitted to avoid redundancy.

In the process of step S15, the encoded data of the dependent view image is generated and the encoded data of the dependent view image is supplied to the transmission section 26.

When the motion prediction/compensation process is performed in the dependent view image if profile_idc supports multi-view and interview_vector_v_range_restrict_flag is 1 as described above, (the positive direction of) the V component of the inter-view MV is limited to a preset value.

Therefore, because an image out of the constrained search range is not used, it is possible to perform parallel processing of a base view image and a dependent image on the encoding side or the decoding side.

[Other Example of Syntax]

FIG. 18 is a diagram illustrating examples of syntax of the SPS and semantics about the SPS. Also, the example of FIG. 18 is an example in which a range limit value of the V direction is written as the syntax.

As shown in the syntax of the example of FIG. 18, for example, when a profile is a "multi-view support profile" that is a profile for supporting multi-view in the SPS, interview_vector_v_range_restrict_flag, which is information about the limit of the V direction of the search range of the inter-view MV, is setIn addition, when interview_vector_v_range_restrict_flag is 1, the range limit value of the V direction is set as interview_vector_v_range.

The semantics are defined as follows.

When interview_vector_v_range_restrict_flag is 1, the vertical component of the inter-view MV used in the dependent view image is represented to be less than or equal to a value set in interview_vector_v_range in units of luma pixels. If this flag is absent, its value is regarded as 0. If the profile is equal to the "stereo profile," its value is set to 1.

This interview_vector_v_range represents a maximum value of the vertical component of the inter-view MV in units of luma pixels. If this setting is absent, its value is regarded as 0.

[Still Other Example of Syntax]

FIG. 19 is a diagram illustrating examples of syntax of the SPS and semantics about the SPS. Also, the example of FIG. 19 is an example in which a range limit value of the V direction and the H direction is written as the syntax.

As shown in the syntax of the example of FIG. 19, for example, when a profile is a "multi-view support profile" that is a profile for supporting multi-view in the SPS, interview_vector_v_range_restrict_flag, which is information about the limit of the V direction of the search range of the inter-view MV, is set. In addition, when interview_vector_v_range_restrict_flag is 1, the range limit value of the V direction and the range limit value of the H direction are set as interview_vector_v_range.

The semantics are defined as follows.

When interview_vector_v_range_restrict_flag is 1, the vertical component of the inter-view MV used in the dependent view image is represented to be less than or equal to a value set in interview_vector_v_range in units of luma pixels. If this flag is absent, its value is regarded as 0. If the profile is equal to the "stereo profile," its value is set to 1.

This interview_vector_v_range represents a maximum value of the vertical component of the inter-view MV in units of luma pixels. If this setting is absent, its value is regarded as 0.

In addition, interview_vector_h_range represents a maximum value of a horizontal component of the inter-view MV in units of luma pixels. If its setting is absent, its value is regarded as 0. If the value is 255, this represents that there is no limit for a horizontal component.

In this manner, the horizontal component (that is, the search range of the horizontal (H) direction) of the inter-view MV can also be set to be limited. In this case, because the range of pixels to be read to the cache 322 of FIG. 12 is further narrowed down than in the case of only the V direction in the decoding side, it is possible to further reduce the capacity of the cache 322. Thereby, it is possible to cheaply configure the device.

Also, the range of the horizontal direction can also be estimated from a minimum value and a maximum value of depth (or disparity) such as an SEI. The minimum and the maximum value capable of being estimated from the SEI become Dmin and Dmax in the case of the disparity and become Znear and Zfar in the case of the depth.

The disparity can be obtained by computing a minimum value and a maximum value of a limit value Ivx of the H component of the inter-view MV from Dmax. Likewise, the depth can be obtained as IVx=fL/Zmax (f: focal length and L: inter-camera distance) by computing the minimum value and the maximum value of the limit value Ivx of the H component of the inter-view MV from Znear.

In this case, because the range of pixels to be read to the cache 322 of FIG. 12 is further narrowed down than in the case of only the V direction in the decoding side, as in the limit of the horizontal component, by performing decoding using the value IVx, it is possible to further reduce the capacity of the cache 322. Thereby, it is possible to cheaply configure the device.

As described above, according to the present technology, the range (length) of the MV of the decoding result does not exceed the limit. Therefore, information of whether its limit is present is transmitted from the encoding side, and the range of the MV is limited when the transmitted information is true.

Also, although the case in which the limit value of the range of the MV is a fixed value has been described above, its constraint may be strict as the size of the picture increases when the limit value is the fixed value. Then, next, the case in which the limit value is not a fixed value will be described. Also, hereinafter, the limit value will be described as a constraint value.

4. Fourth Embodiment

Constraint Value According to Vertical Resolution of Picture

First, a method of obtaining a constraint value according to vertical resolution of a picture will be described. For example, a constraint value is represented by the following Formula (1) which is a computation formula by a ratio of the vertical resolution of the picture.

[Math 1]

$$\text{constraint} = ((1 + (\text{pic\_height\_in\_luma\_samples} * \alpha) >> \text{Log 2LCUsize}) << \text{Log 2LCUsize}) - 8 \qquad (8)$$

Here, pic_height_in_luma_samples prescribes the vertical resolution of a picture (image format) in the SPS. $\alpha$ denotes an allowed amount for an upward/downward picture shift between views. For example, although $\alpha=0.05$, a is not limited to 0.05 if it is a value of about 0.01 to 0.3. Also, a may be transmitted as a variable to the decoding side.

In addition, 2 in Formula (1) is the base of Log, and Log 2LCUsize=4, 5, or 6 (the LCU size is 16, 32, or 64). For example, when Log 2LCUsize=6, >>6 and <<6 in Formula (1) represent that the constraint value increase in a unit of a maximum coding tree block (CTB) size, that is, an LCU size of 64. This is because it is a processing unit of a worst case when a parallel decoding process is considered.

Then, the final subtraction of 8 is performed because there are 4 pixels for the in-loop filter and 4 pixels for the motion compensation filter.

FIG. 20 is a diagram illustrating an example of constraint values for a general image format. These constraint values are computed as $\alpha=0.05$ and Log 2LCUsize=6 in Formula (1).

In the example of FIG. 20, a mnemonic name, horizontal resolution, vertical resolution and a constraint value of the image format from the left are illustrated. The constraint value of the case of the vertical resolution up to a size of about 1200 is 56. The constraint value of the case of the vertical resolution up to the size of 1536 or more or about 2304 is 120. The constraint value of the case of the vertical resolution of about 4096 is 248.

[Example of Syntax]

FIG. 21 is a diagram illustrating an example of syntax of an SPS, semantics about the SPS, and a profile. The example of FIG. 21 is an example in which Formula (1) in which the constraint values according to the resolution, that is, $\alpha=0.05$ and Log 2LCUsize=6, are set as the range limit value (constraint value) of the V direction is used.

In the case of the example of FIG. 21, as shown in the syntax, disparity_vector_constraint_flag is set in an extension of the SPS.

Semantics for this is defined as follows. disparity_vector_constraint_flag=1 specifies that the disparity vector is constrained in a coded video sequence (CVS).

When disparity_vector_constraint_flag is 1, the vertical component of the disparity_vector is equal to or less than a constraint value (dv_constraint_value) in pixel. Various constraint values are specified in Formula (1) in which α=0.05 and Log 2LCUsize=6.

When disparity_vector_constraint_flag is 0, the length of the disparity vector is not constrained. Then, when the flag is absent, it is preferable that its value be 0.

Further, the stereo profile is defined as follows. Bitstreams conforming to a stereo profile obey the following constraints. The extension of the SPS in a non-base view has only disparity_vector_constraint_flag which is equal to 1.

[Constraint Value According to Level]

Next, a method of obtaining the constraint value according to the level will be described. Although the constraint value itself is the same as the case of the above-described vertical resolution, a representation method in a written standard is different. In addition, when a small image frame is encoded at a high level, the constraint is mitigated. That is, for example, when a high definition (HD) image is encoded at a level 5, the constraint value is only 56 in the case of the vertical resolution, but the constraint value becomes 120 in the case of the level, so that it is possible to further mitigate the constraint than in the case of the vertical resolution.

FIG. 22 is a diagram illustrating an example of the semantics. Also, the example of FIG. 22 is an example in which the constraint value according to the level is used as a range limit value (constraint value) of the V direction. The level represents how many pixels are included and a range of a certain extent is settable in the encoding side.

disparity_vector_constraint_flag=1 specifies that the disparity vector is limited in the CVS.

When disparity_vector_constraint_flag=1, the vertical component of the disparity_vector is equal to or less than a constraint value (dv_constraint_value) in pixel. Various constrain values are specified in Table A (right in FIG. 22).

In Table A, a level, a maximum height, and a constraint value (dv_constraint_value) are shown. Also, a value after the decimal point in the level represents a difference of a frame rate of a temporal direction. The constraint value is 56 when an integer value of the level is up to 4. The constraint value is 120 when the integer value of the level is 5. The constraint value is 248 when the integer value of the level is 6.

In addition, when disparity_vector_constraint_flag is 0, the length of the disparity_vector is not constrained. Then, when the flag is absent, it is preferable that its value be 0.

As described above, it is possible to mitigate a strict constraint in an increase of a picture size using a constraint value according to a vertical resolution of the picture or a level. Thereby, even when the picture size increases, it is possible to process pictures of a plurality of views in parallel.

Also, although an example of two views of the base view and the dependent view has been described above, the present technology is not limited to the two views. The present technology is also applicable to encoding and decoding of multi-view images in addition to the two views.

In addition, although the present technology is also applicable to an SHVC which is a standard for scalable video coding (hierarchical coding) to be described later, the necessity of the following constraints is also considered in addition to the above-described example when the present technology is applied to the SHVC.

5. Fifth Embodiment

Constraints when Present Technology is Applied to SHVC

Next, with reference to FIG. 23, the necessary constraints when the present technology is applied to the SHVC will be described.

Figure 23:
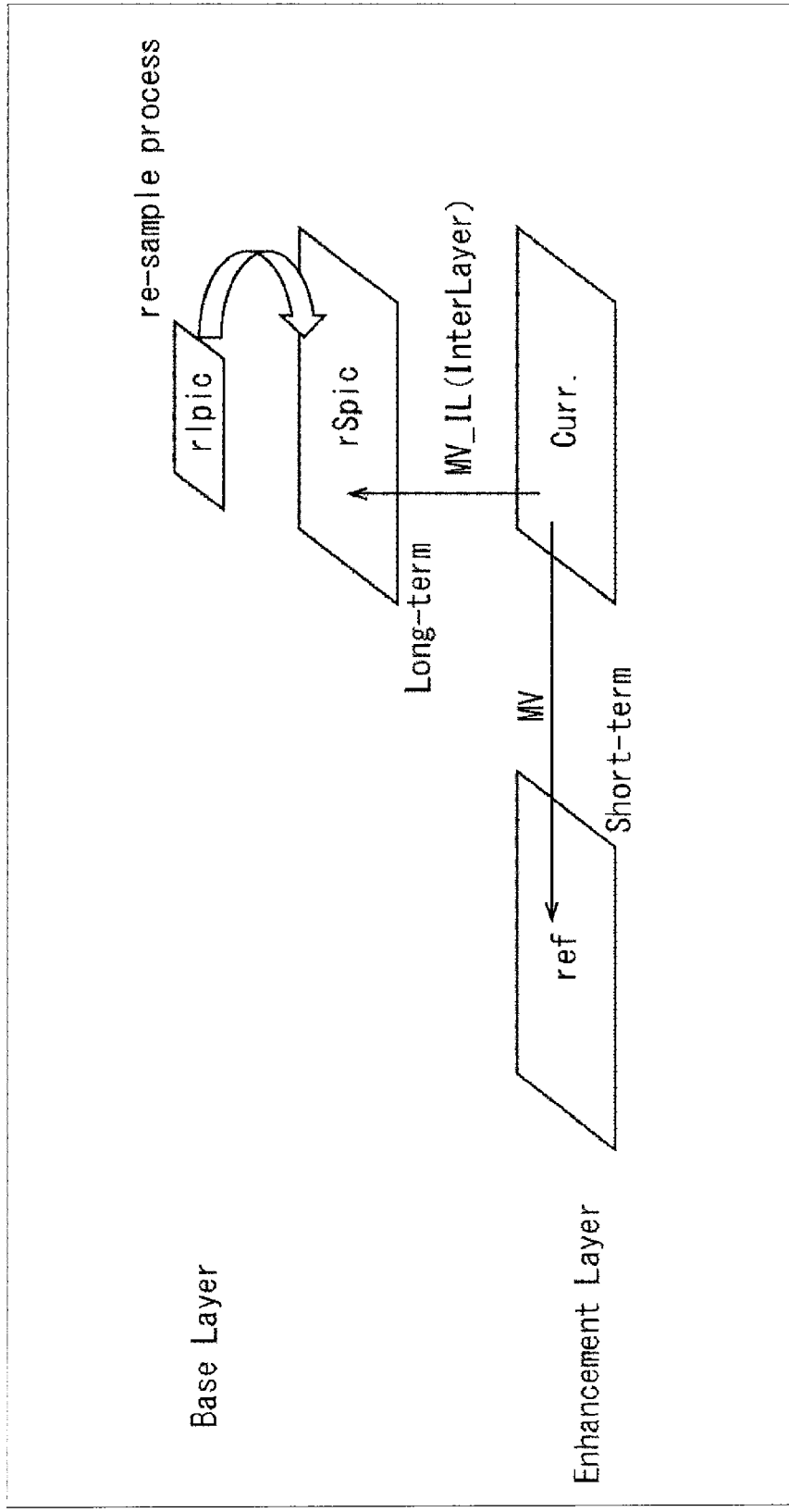
FIG. 23 is a diagram illustrating a necessary constraint in the case of the application of scalable HEVC (SHVC).

In the example of FIG. 23, a base layer and an enhancement layer are shown. In a current image Curr. of the enhancement layer, the MV is found for a reference image ref as a short-term predicted vector. In addition, in the current image Curr. of the enhancement layer, MV_IL (Inter Layer) is found for an image rSpic as a long-term predicted vector. This image rSpic. is an image obtained by up-sampling a low-resolution reference image rlpic of a base layer within the DPB, for example, the DPB 25 of FIG. 2 (the DPB 226 of FIG. 11), according to a resample process.

In this case, the necessity of the following three types of constraints is considered for MV_IL which is a predicted vector between layers (inter-layer predicted vector).

MV_IL necessarily needs to be 0.
MV_IL needs to be one pixel or less.
MV_IL needs to be X pixels or less.

[In Terms of Constraint MV_IL=0]

Figure 24:
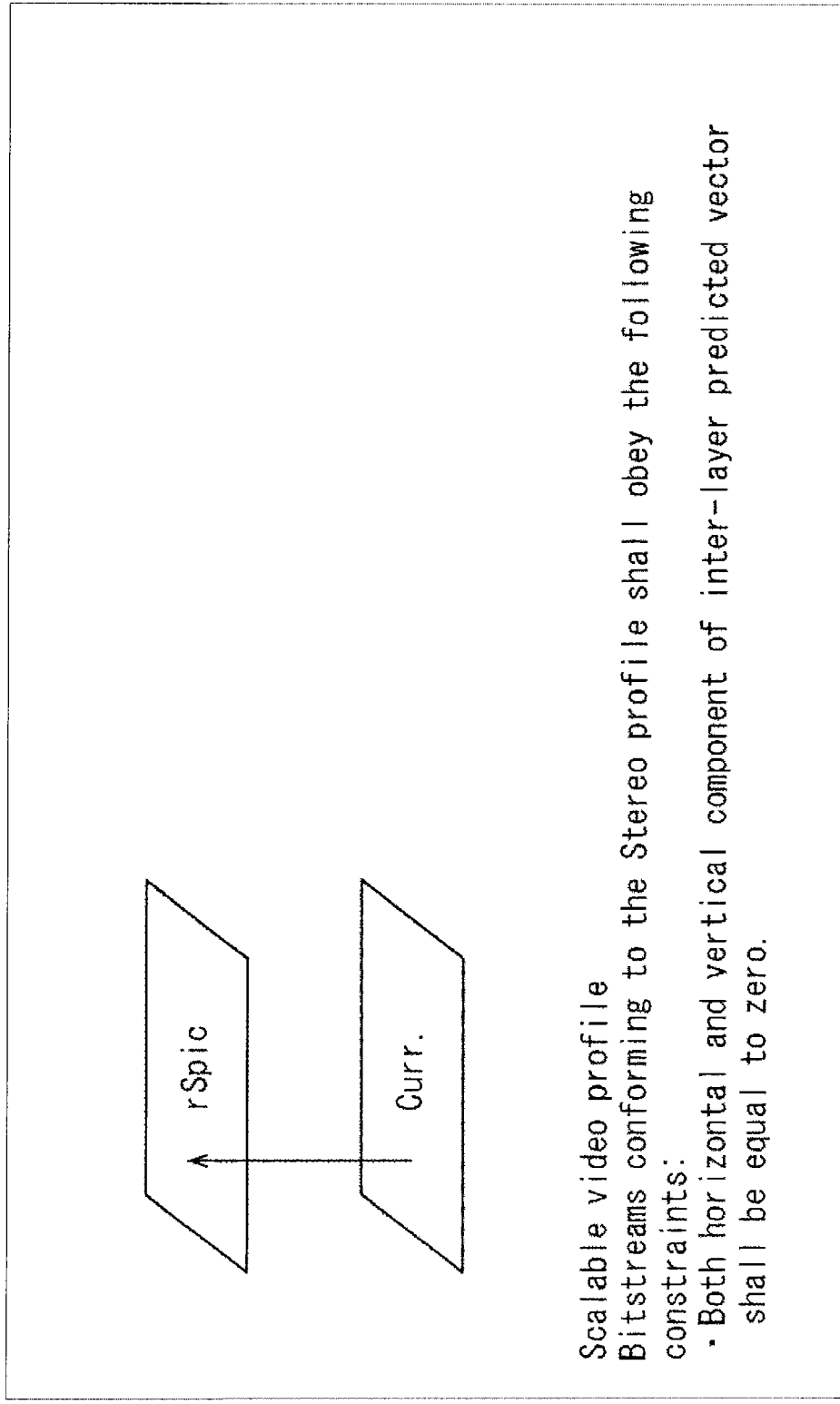
FIG. 24 is a diagram illustrating the constraint of inter-layer prediction vector=0.

First, with reference to FIG. 24, the constraint of MV_IL=0 will be described. In the example of FIG. 24, in the current image Curr. of the enhancement layer, an inter-layer predicted vector MV_IL is found for an image rSpic. As described above with reference to FIG. 23, the image rSpic is an image obtained by up-sampling a low-resolution reference image rlpic of the base layer within the DPB 25 (DPB 226) according to a re-sample process.

Here, when the constraint of MV_IL=0 is present, a scalable video profile is defined as follows. Bitstreams conforming to the scalable video profile obey the following constraints. Inter-layer predicted vectors of both the horizontal component and the vertical component are equal to 0.

Because only pixels of the same position is referred to by the constraint of MV_IL=0 as described above, the implementation becomes easiest.

[In Terms of Constraint (MV_IL is One Pixel or Less)]

Figure 25:
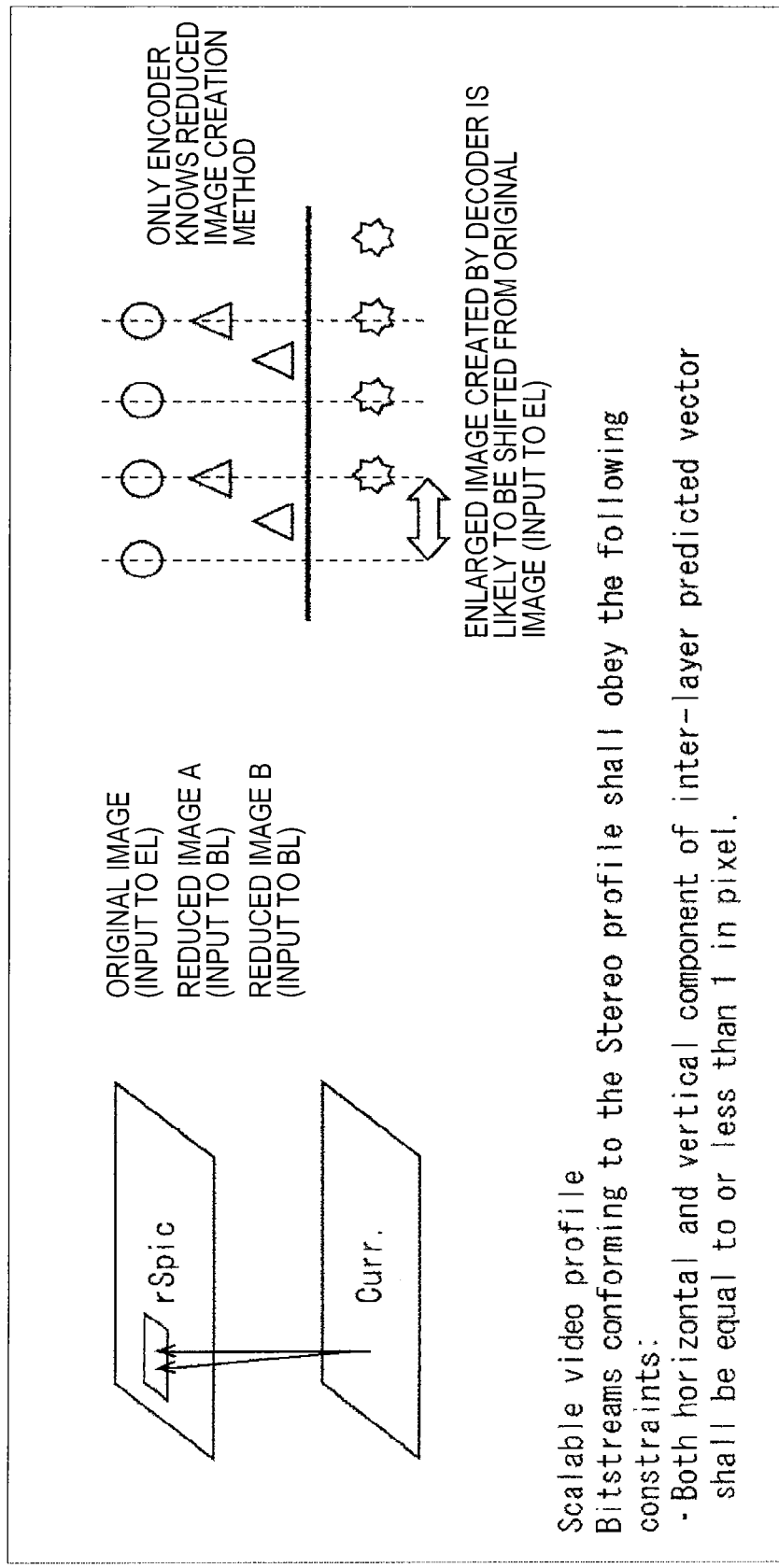
FIG. 25 is a diagram illustrating a constraint in which an inter-layer prediction vector is one pixel or less.

First, with reference to FIG. 25, the constraint that MV_IL is one pixel or less will be described. In the example of FIG. 25, in the current image Curr. of the enhancement layer, an inter-layer predicted vector MV_IL is found for an image rSpic. As described above with reference to FIG. 23, the image rSpic is an image obtained by up-sampling a low-resolution reference image rlpic of the base layer within the DPB 25 (DPB 226) according to a re-sample process.

Here, filters at a down-sampling time of a low-resolution image creation time of the original image in the base layer and an up-sampling time in the DPB 25 (DPB 226) are different, so that a phase shift may be caused.

For example, an original image of an input of the enhancement layer is configured to include first to fourth pixels from the left. Then, even when there are a reduced image A down-sampled at the timing of a second pixel and the timing of a fourth pixel from the left of the original image and a reduced image B down-sampled at the timing between first and second pixels and the timing between the third and fourth pixels from the left of the original image, only the encoding side knows a reduced image creation method.

That is, because the decoding side does not know the reduced image creation method, an enlarged image up-sampled by the decoding side has a shift from the original image when up-sampling is performed in second to fifth pixels from the left at the up-sampling time in the DPB 25 (DPB 226).

Therefore, according to the constraint that MV_IL is one pixel or less, it is possible to absorb a phase shift in MV_IL even when the phase shift is caused by a filter difference between the down-sampling time of the low-resolution image creation time of the original image in the base layer and the up-sampling time in the DPB 25 (DPB 226).

Here, when the constraint that MV_IL is one pixel or less is present, a scalable video profile is defined as follows. Bitstreams conforming to the scalable video profile obey the following constraints. Inter-layer predicted vectors of both the horizontal component and the vertical component are equal to 0 or are less than 1 in pixel.

[In Terms of Constraint (MV_IL is X Pixels or Less)]

First, with reference to FIG. 26, the constraint that MV_IL is X pixels or less will be described. In the example of FIG. 26, in the current image Curr. of the enhancement layer, an inter-layer predicted vector MV_IL is found for an image rSpic. As described above with reference to FIG. 23, the image rSpic is an image obtained by up-sampling a low-resolution reference image rlpic of the base layer within the DPB 25 (DPB 226) according to a re-sample process.

Here, for example, when image capturing is performed in different systems such as that a low-resolution image and a high-resolution image use different lens or when the low-resolution image is created by segmentation from the high-resolution image in the center of a region of interest (ROI), it is effective that there is no limit in MV_IL.

However, even in this case, it is preferable that a constraint considering parallel decoding be present. For example, if there is MV_IL within the constraint indicated by the following Formula (2), it is possible to decode the base layer and the enhancement in parallel.

[Math 2]

$$\text{constraint}=(\text{scale\_factor}*BL\_CTBsize-EL\_CTBsize)-8 \quad (2)$$

Here, scale_factor denotes an enlargement ratio. BL_CTBsize and EL_CTBsize denote a CTB size of the base layer and a CTB size of the enhancement layer, respectively.

As illustrated in the right of FIG. 26, specifically, when the CTB size of the base layer is 64 and the enlargement ratio is 2, decoding can start if one CTB of the base layer is decoded and an MV of a first CTB of the enhancement layer is 56 pixels or less.

Here, when the constraint that MV_IL is X pixels or less is present, a scalable video profile is defined as follows. Bitstreams conforming to the scalable video profile obey the following constraints. Inter-layer predicted vectors of both the horizontal component and the vertical component are equal to 0 or less than 1 in pixel. Various inter-layer constraint values are specified in the above-described Formula (2). For example, an inter-layer constraint value becomes (2×64−64)−8=56 [pixels].

As described above, in the case of the SHVC (that is, scalable video coding), it is possible to process pictures of a plurality of layers (views) in parallel even when a constraint of a range of an MV as described above is applied.

Also, although three examples in which a limit of the MV is defined in the profile have been described above, for example, a flag may be transmitted from the encoding side to the decoding side by setting ON/OFF of presence/absence of the limit as the flag.

In addition, although an example in which the flag related to the limit value of the range of the MV described above is written in SPS or SPS_EXT has been described, the flag can also be transmitted to the decoding side by setting the flag in VPS_EXT, VUI_EXT, or the like as will be described later. Also, hereinafter, inter_view_mv_vert_constraint_flag represents a flag related to a limit value of the range of the MV.

6. Sixth Embodiment

Other Example (VPS_EXT) of Syntax

FIG. 27 is a diagram illustrating an example of syntax of VPS_EXT and semantics about VPS_EXT.

As shown in the syntax of the example of FIG. 27, inter_view_mv_vert_constraint_flag is set for every one-to-(maximum number of layers—1) layers (that is, every layer). Also, because this is unnecessary in the base view, the number of layers is greater than 0.

The semantics are defined as follows.

inter_view_mv_vert_constraint_flag[i] specifies a value of inter_view_mv_vert_constraint_flag which is a syntax element in network abstraction layer (NAL) units of a video coding layer (VCL) of an $i^{th}$ layer. For i in a range from 1 to vps_max_layers_minus1, inclusive, when there is no flag, inter_view_mv_vert_constraint_flag[i] is inferred to be equal to 0.

interview_mv_vert_constraint_flag equal to 1 specifies that the vertical component of the MVs used for inter-layer prediction is constrained in the CVS. When inter_view_mv_vert_constraint_flag is equal to 1, the V component of the MVs used for inter-layer prediction shall be equal to or less than 56 in units of luma pixels.

When inter_view_mv_vert_constraint_flag is equal to 0, there is no constraint for the V component of the MVs used for inter-layer prediction indicated by this flag.

[Constraint in Stereo Profile]

FIG. 28 illustrates an example of a constraint in a stereo profile of each of the case (hereinafter referred to as the case of SPS_EXT) in which a flag related to a limit value of a range of the MV is written in SPS_EXT syntax and the case (hereinafter referred to as the case of VPS_EXT) in which a flag related to a limit value of a range of the MV is written in VPS_EXT syntax. In the stereo profile of the case of writing in the SPS_EXT syntax, only a part surrounded by a frame is changed if the flag is written in the VPS_EXT syntax.

That is, when the flag is written in the SPS_EXT, "When viewID[i] is greater than 0, inter_view_mv_vert_constraint_flag is equal to 1 in an SPS_EXT structure of the SPS of the active layer in an encoded image in which a layer id is i" is written.

On the other hand, when the flag is written in the VPS_EXT syntax, a change to "When viewID[i] is greater than 0, inter_view_mv_vert_constraint_flag of viewId[i] is equal to 1 in a VPS_EXT structure of the SPS of the active layer in an encoded image with a view id equal to i." is made.

[Difference Between Case of SPS_EXT and Case of VSP_EXT]

FIG. 29 is a diagram illustrating a technical difference between the case of SPS_EXT and the case of VSP_EXT.

Because encoding for every view is possible in the case of VSP_EXT as the same point as the case of SPS_EXT, transcoding of the bitstream level is given to be enabled.

On the other hand, as a first point of different points of the case of VSP_EXT from the case of SPS_EXT, VSP is positioned at the top of the sequence and is higher-level syntax than SPS, and summarized information for every SPS (view) is included. Therefore, when writing is made in VSP_EXT and the view is multi-view, a bitstream constraint is known in each view earlier before each SPS is processed. Thus, load dispersion of the decoder core is given to be easy.

Figure 30:
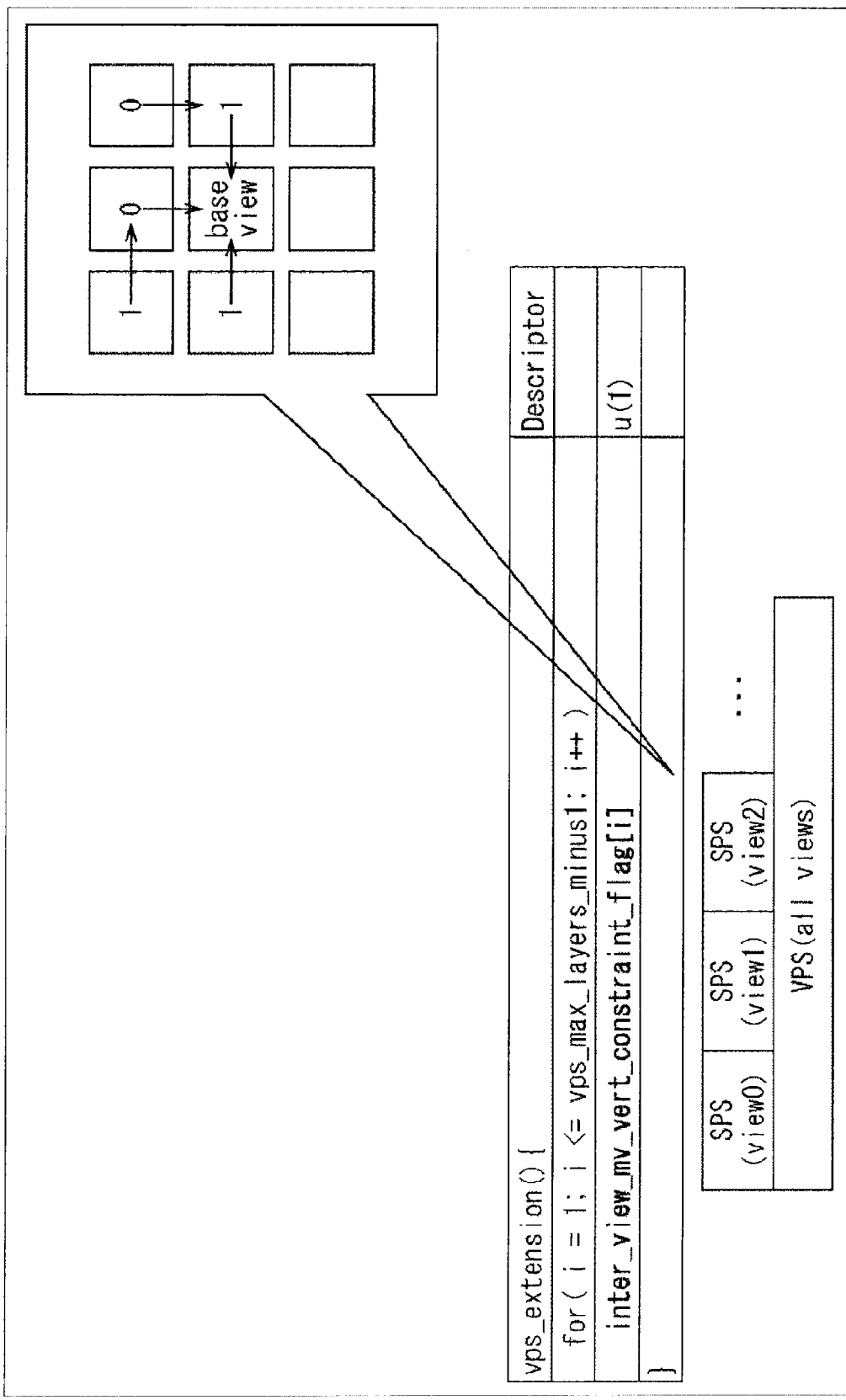
FIG. 30 is a diagram illustrating a technical difference from sequence parameter set (SPS)_EXT.

Specifically, as illustrated in FIG. 30, it is preferable to set a flag related to the limit value of the range of the MV to 0 because encoding efficiency is bad in a reference relationship of the vertical direction in FIG. 30, for example, in the case of nine views. On the other hand, in a reference relationship of the horizontal direction in FIG. 30, a constraint can be applied by setting the flag related to the limit value of the range of the MV to 1.

Because information of this constraint is known earlier in the case of VSP_EXT, two views which are horizontally positioned, for example, in FIG. 30, are known earlier to be based on a stereo profile in which the constraint of the range of the MV is set and the two views can be extracted as a stereo. Thereby, the load dispersion is facilitated.

In addition, returning to FIG. 29, as a second different point of the case of VSP_EXT from the case of SPS_EXT, when syntax indicating that a flag is transmitted only in the case of a 3D profile is set as a modified example, its determination is facilitated.

Also, in Ying Chen, Ye-Kui Wang, "AHG7: Comments on parameter sets for MV-HEVC," JCT3V-D0196, Apr. 13, 2013 (hereinafter referred to as Reference Literature 1), a process in which inter_view_mv_vert_constraint_flag is set in VPS_EXT is proposed.

Figure 31:
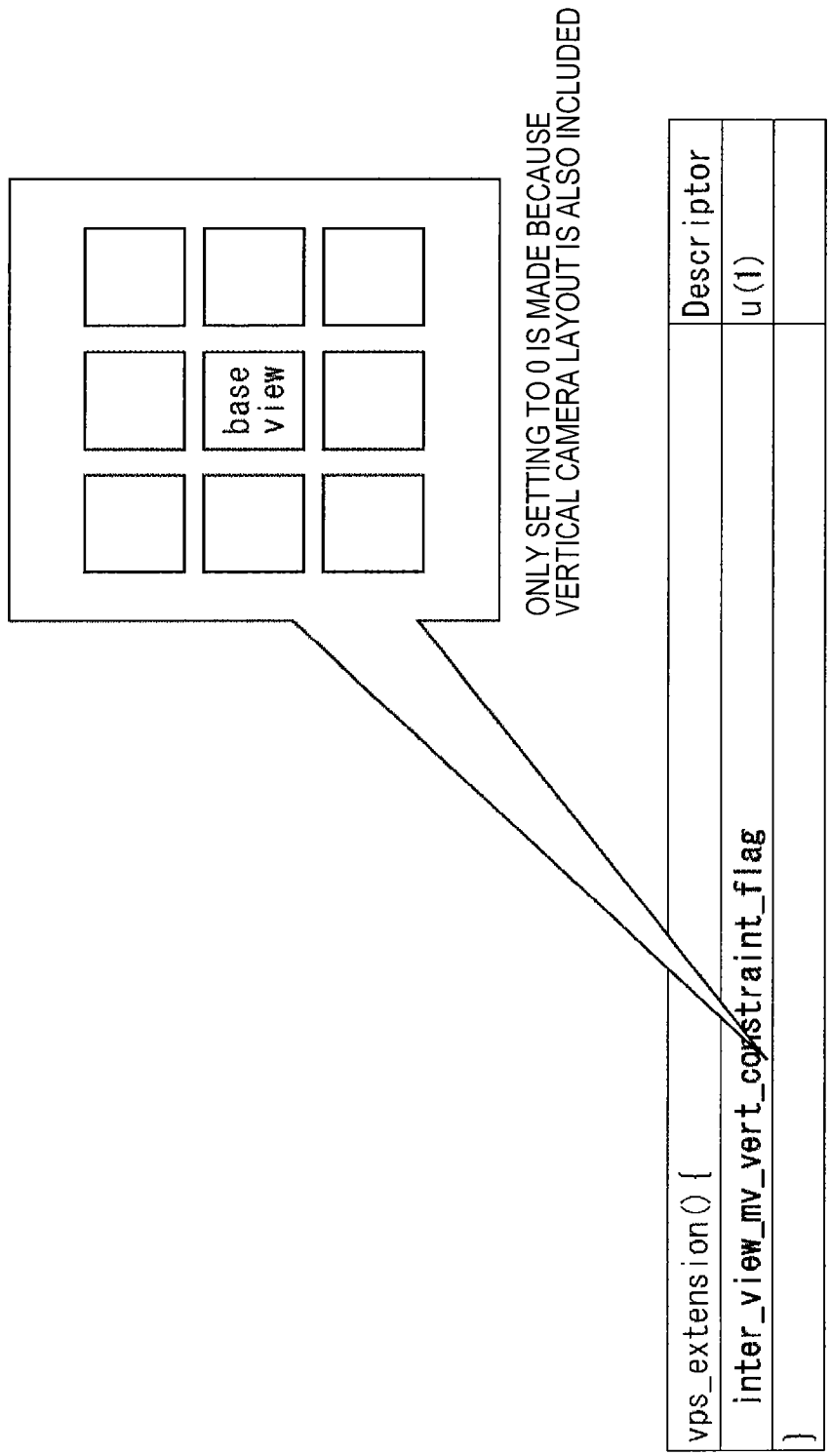
FIG. 31 is a diagram illustrating a technical difference from technology of reference literature.

However, as illustrated in FIG. 31, only 1 bit is set in the flag in the syntax. Thus, in the proposal of Reference Literature 1, it is difficult to write information for every view when the number of views is two or more.

Therefore, even in FIG. 31, a flag related to the limit value of the range of the MV is set to 0 because encoding efficiency is bad in a reference relationship of the vertical direction as in the case of FIG. 30, for example, in the case of nine views. However, in the case of the proposal of Reference Literature 1, different from the case of the present technology, it is difficult to individually apply the constraint of the range of the MV to the reference literature of the horizontal direction of FIG. 31.

[Other Example (VUI_EXT) of Syntax]

FIG. 32 is a diagram illustrating an example of syntax of VUI_EXT.

As illustrated in the syntax of the example of FIG. 32, inter_view_mv_vert_constraint_flag is included in bitstream_restriction_flag in VUI_EXT. A bitstream constraint is written in bitstream_restriction_flag.

Also, because VUI_EXT is one of SPS_EXT and is included in a second half part of the SPS as illustrated in the syntax of the example of FIG. 32, the semantics or stereo profile constraint is substantially the same as the case of SPS_EXT.

In addition, in terms of a technical difference, the case of VUI_EXT is substantially the same as the case of SPS_EXT. However, in the case of VUI_EXT, as a difference from the case of SPS_EXT, there is an advantage in that the decoding result (=decoded image) is obviously identical regardless of a flag value and easily known because the VUI is a place in which information that does not affect the decoding result is written. In addition, because this flag is a flag of an encoding constraint, it is appropriate that the flag be in the bitstream constraint.

Also, because only a flag setting place is different and a basically similar process is given compared to the case in which the flag is set in SPS(_EXT) even when the flag related to the limit value of the range of the MV described above is set in VPS_EXT or VUI_EXT, redundant description thereof is omitted.

That is, each process related to the flag to be set in VPS_EXT or VUI_EXT is a process to be performed by the multi-view image encoding device of FIG. 1 and the multi-view image decoding device 211 of FIG. 10 described above. Accordingly, the multi-view image encoding device of FIG. 1 and the multi-view image decoding device 211 of FIG. 10 described above perform processes basically similar to those (the multi-view image encoding process of FIG. 7, the dependent view image encoding process of FIG. 9, the multi-view image decoding process of FIG. 13, the syntax encoding process of FIG. 16, the dependent view image encoding process of FIG. 17, and the like) of the SPS case.

As described above, even when the flag related to the limit value of the range of the MV described above is set in VPS_EXT, VUI_EXT, or the like, it is possible to process pictures of a plurality of views in parallel as in the case in which the flag is set in SPS_EXT.

Also, an example in which the flag related to the limit value is transmitted as a method of limiting (constraining) the range of the MV has been described above. Here, a process in which inter-layer decoding delay information is written in VUI_EXT is proposed in Robert Skupin, Karsten Suhring, Yago Sanchez de la Fuente, Thomas Schierl, A. K. Ramasubramonian, Y. Chen, Y.-K. Wang, V. Seregin, L. Zhang, T. Ikai, and Y. Yamamoto, "Inter-layer delay indication in VUI (combining aspects of JCTVC-M0200, JCT3V-D0064 and JCT3V-D0199)," JCTVC-M0463, May 24, 2013 (hereinafter referred to as Reference Literature 2).

As described next, as a method other than that of the above-described flag, the range of the MV can also be limited (constrained) in a method (that is, setting by a CTU line) disclosed in the proposal of Reference Literature 2.

Also, here, in the present description, a CTU is set as a unit including a parameter when processing is performed in a coding tree block (CTB) of an LCU and its LCU size (level). In addition, a coding unit (CU) constituting the CTU is set as a unit including a parameter when processing is performed in a coding block (CB) and its CU base (level).

7. Seventh Embodiment

Other Example of Constraint of Range of MV

Figure 33:
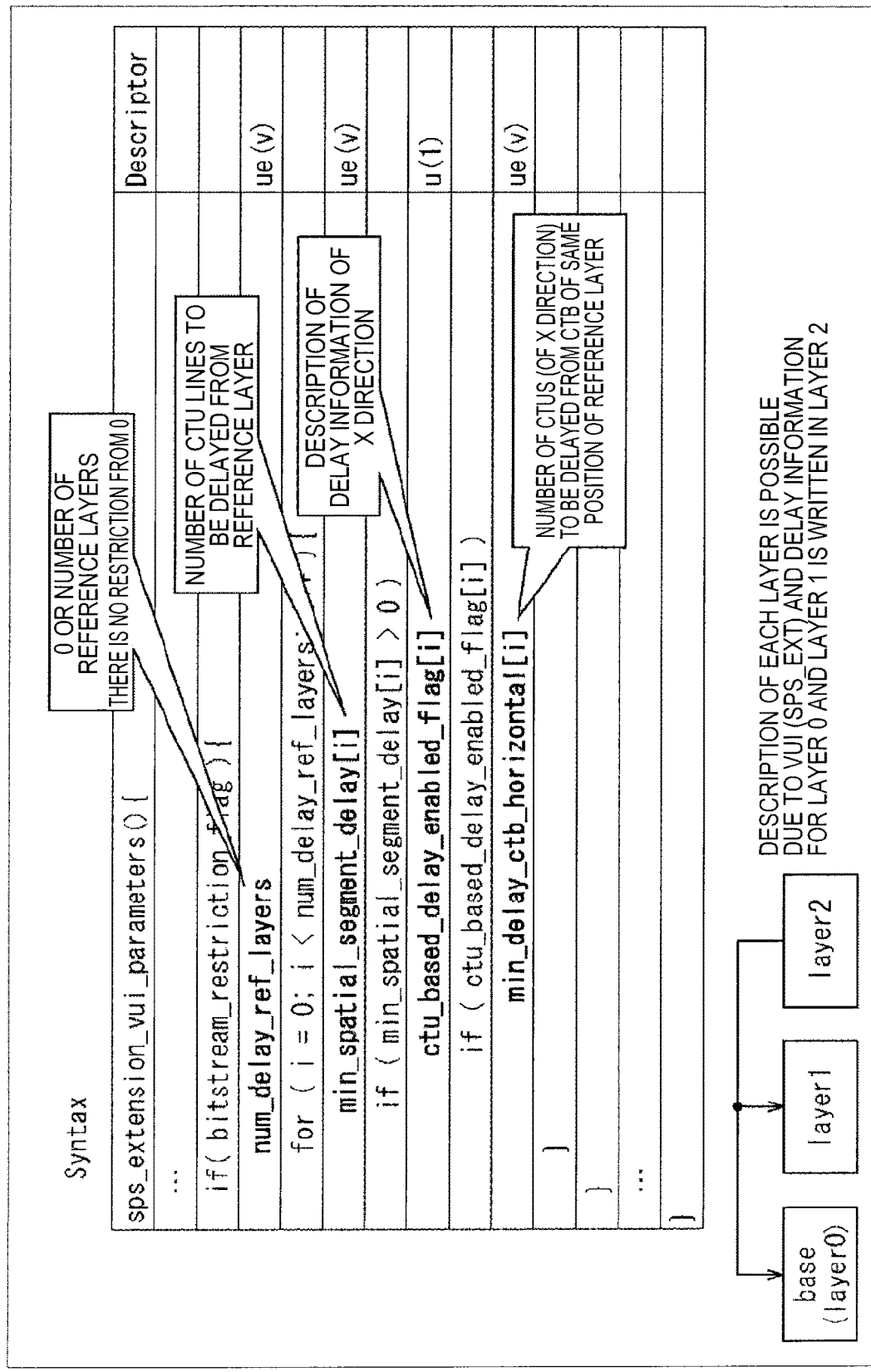
FIG. 33 is a diagram illustrating an example of the syntax in technology of another reference literature.

FIG. 33 is a diagram illustrating an example of syntax in the proposal of Reference Literature 2.

As illustrated in FIG. 33, in the proposal of Reference Literature 2, inter-layer decoding delay information (decoding delay information) is written in bitstream_restriction_flag in VUI_EXT of SPS_EXT.

The syntax of FIG. 33 will be described in order from the top. In the inter-layer decoding delay information, 0 or the number of reference layers is written in num_delay_ref_layers. If num_delay_ref_layers is 0, it is indicated that there is no constraint of the range of the MV. The following loop is iterated by the written number of reference layers here.

The number of CTU lines of the vertical direction to be delayed from the reference layer is written in min_spatial_segment_delay[i]. This CTU size depends upon a size of a CTU to be referred to. Delay information (presence/absence of the delay) of an x-direction is written in ctu_based_delay_enabled_flag[i]. The number of CTUs (of the X-direction) to be delayed from the CTB of the same position as that of the reference layer is written in min_delay_ctb_horizontal[i].

Also, because the inter-layer decoding delay information is present in VUI (SPS_EXT), the information can be written for each layer. For example, as illustrated in FIG. 33, the information may not be referred to in the case of layer 2 and it is possible to write delay information for both layer 0 and layer 1 or either one thereof.

[Setting Example of Syntax]

Figure 34:
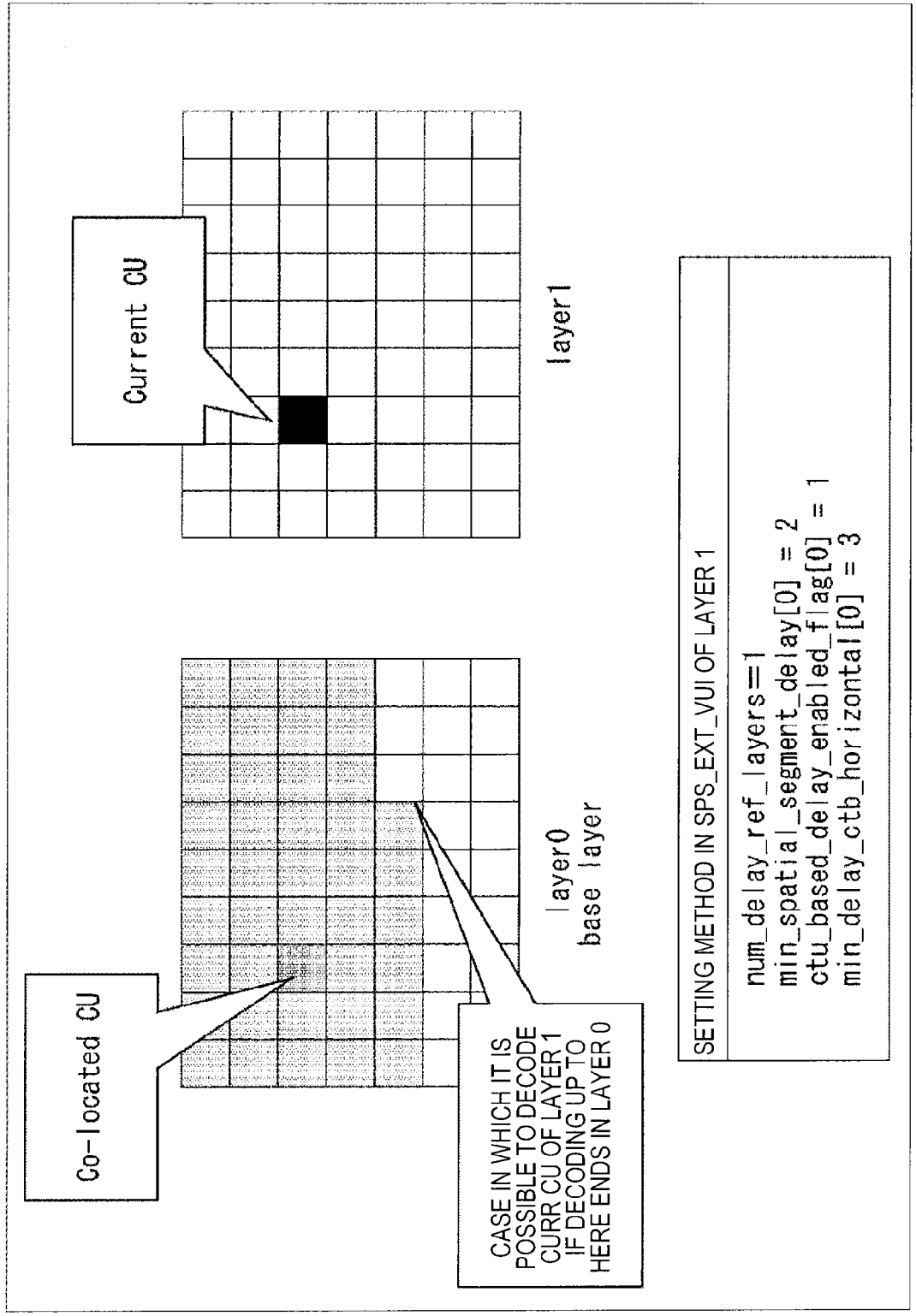
FIG. 34 is a diagram illustrating the technology of other reference literature.

Further, with reference to FIG. 34, the setting example of the syntax of FIG. 33 will be described. In the example of FIG. 34, layer 0 (base layer) and layer 1 are shown.

A current CU of layer 1 is shown. In layer 0, a co-located CU (hereinafter referred to as Col CU), which is a CU corresponding to the current CU (hereinafter referred to as Curr CU), is shown at the same position as that of the current CU of layer 1.

Here, for example, if decoding up to a hatched CU is completed in layer 0, SPS_EXT VUI of layer 1 is set as follows when the Curr CU of layer 1 can be decoded.

num_delay_ref_layers=1
min_spatial_segment_delay[0]=2
ctu_based_delay_enabled_flag[0]=1
min_delay_ctb_horizontal[0]=3

That is, the number of reference layers is 1 and the number of CTU lines to be delayed from the reference layer is 2. The delay of the x-direction is present and a delay value is set to be 3 CTUs from the Col CU.

Here, the constraint of the range of the MV by the present technology is MV_V≤56 pixels. This corresponds to one-line delay when CTUsize=64, corresponds to two-line delay when CTUsize=32, and corresponds to four-line delay when CTUsize=16.

That is, this corresponds to line delay indicated by the following Formula (3). Also, the base of Log in Formula (3) is 2.

[Math 3]

$$1<<(6-Log_2 CTUsize) \quad (3)$$

Therefore, the same writing method as the case of the flag as the delay information is possible by setting a delay value of the vertical direction by Formula (3) in a CTU line setting.

[Constraint of Stereo Profile]

FIG. 35 illustrates an example of the constraint of the stereo profile of each of the case in which the flag related to the limit value of the range of the MV is written in SPS_EXT syntax and the case in which the flag is set in the CTU line in the VUI. Also, in the stereo profile of the case in which the flag is written in the SPS_EXT syntax, only a part surrounded by a frame is changed if the flag is written in the CTU line in the VUI.

That is, when the flag is written in the SPS_EXT, "When viewID[i] is greater than 0, inter_view_mv_vert_constraint_flag is equal to 1 in an SPS_EXT structure of the SPS of the active layer in an encoded image in which a layer id is i" is written.

On the other hand, when the flag is set by the CTU line, a change to "When ViewID[i] is greater than 0, num_delay_ref_layers is equal to 1 and min_spatial_segment_delay [0] is equal to 1<<(6−refLog 2CtbSizeY) in the SPS_EXT structure of the SPS of the active layer in the encoded image with a layer id equal to i" is made.

That is, the case of the flag in SPS_EXT means that the vector is limited to its range, the case of setting by the CTU line means that decoding can start if it waits to that extent, and both are synonymous for the decoding side.

[Difference Between Case of SPS_EXT and Case of Constraint by CTU Line]

FIG. 36 is a diagram illustrating a technical difference between the case of SPS_EXT (that is, the case of the flag) and the constraint by the CTU line.

As delay information of the decoding side, the constraint by the CTU line is substantially the same as the case of SPS_EXT as described above.

On the other hand, in terms of the constraint by the CTU line, a difference from the case of SPS_EXT is that the constraint of MV_V≤56 pixels can be changed according to ON/OFF of a loop filter in a reference plane for the decoding side or whether a disparity vector of a Y-direction has integer precision.

Specifically, when the loop filter is turned off, it is possible to extend the MV range to MV_V≤60 (=64−4 which is an offset of a motion compensation (MC) filter) pixels. In addition, because the MC filter is unnecessary when an MV length is an integer, it is possible to extend the range of the MV to MV_V≤60 (=64−4 which is an offset of the loop filter) pixels. Further, when the loop filter is turned off and the MV length is an integer, it is possible to extend the range of the MV to MV_V≤64 pixels.

That is, it is possible to mitigate the constraint in the encoding side. In addition, conversely, it is difficult to perform a fine setting of 56 pixels in the constraint by the CTU line.

Also, in the case of the constraint by the CTU line and the flag setting case, there is only a difference of setting information of whether a flag is set or whether a delay value of the vertical direction in the constraint of the CTU line is set in the above-described Formula (3). That is, because there are only a difference in setting information and a difference of whether a branch in the process is determined by the flag or the delay value of the vertical direction in the setting of the CTU line, and others (for example, processing content, processing times, and the like) are basically similar in the process, redundant description thereof is omitted.

That is, each process related to the setting by the CTU is also performed by the multi-view image encoding device 11 of FIG. 1 and the multi-view image decoding device 211 of FIG. 10 described above. Except for the difference of the determination in the branch of the setting information, processes basically similar to the processes (the multi-view image encoding process of FIG. 7, the dependent view image encoding process of FIG. 9, the multi-view image decoding process of FIG. 13, the syntax encoding process of FIG. 16, the dependent view image encoding process of FIG. 17, and the like) of the SPS case by the multi-view image encoding device 11 of FIG. 1 and the multi-view image decoding device 211 of FIG. 10 described above are performed.

As described above, even in the setting by the CTU line, it is possible to process pictures of a plurality of views in parallel as in the constraint flag of the MV.

As described above, the HEVC scheme is configured to be used as the encoding scheme in the base. However, the present disclosure is not limited thereto. It is possible to apply other encoding/decoding schemes.

Also, the present disclosure, for example, is applicable to an image encoding device and an image decoding device to be used when image information (bitstream) compressed by an orthogonal transform such as a discrete cosine transform and motion compensation as in the HEVC scheme or the like is received via network media such as satellite broadcasting, a cable television, the Internet, and a mobile phone. In addition, the present disclosure is applicable to an image encoding device and an image decoding device to be used when processing is performed on storage media such as an optical disc, a magnetic disc and a flash memory.

8. Eighth Embodiment

Application for Multi-View Image Encoding and Decoding

Figure 37:
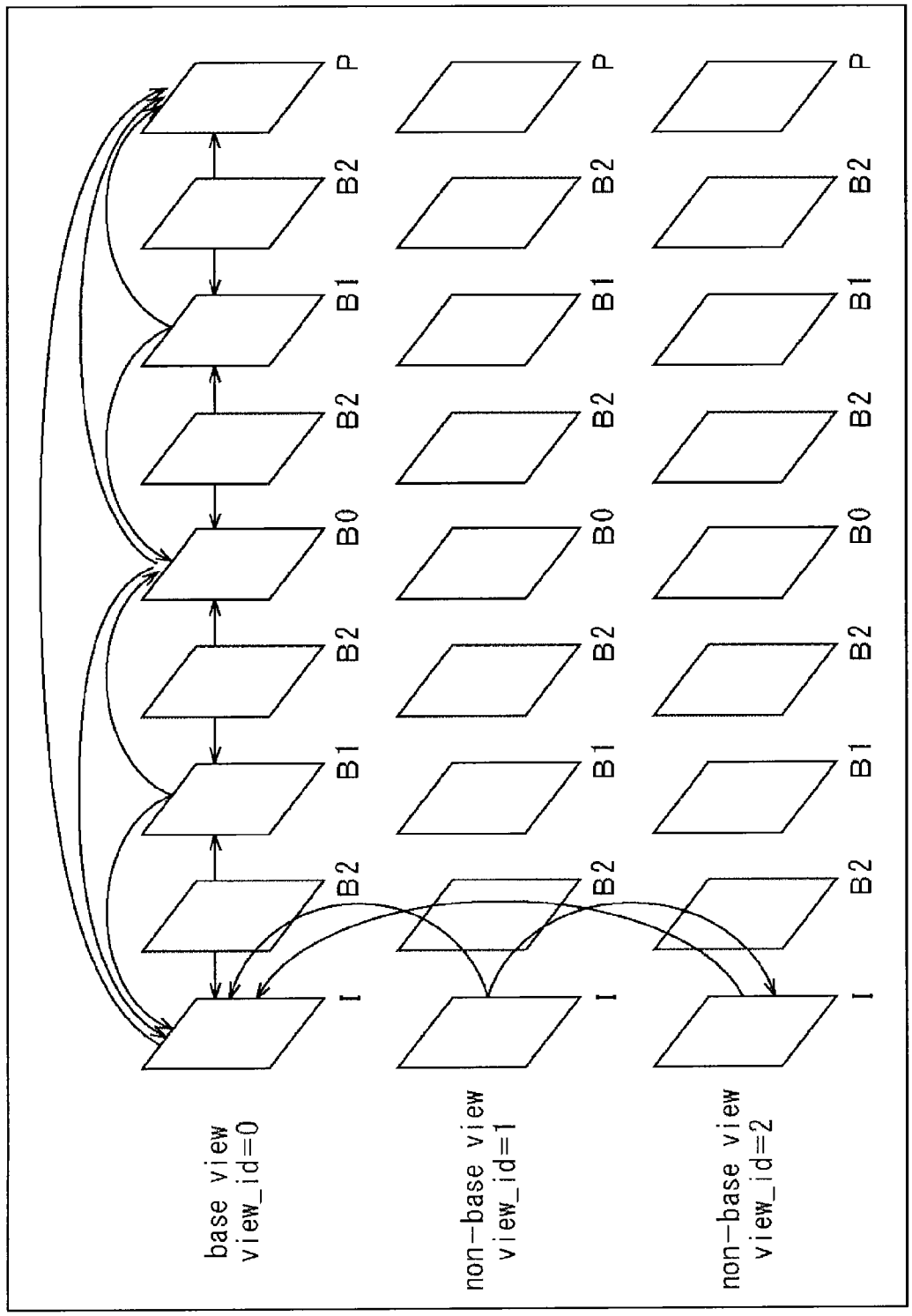
FIG. 37 is a diagram illustrating an example of a multi-view image encoding scheme.

The above-described series of processes can be applied to the multi-view image encoding and decoding. FIG. 37 illustrates an example of the multi-view image encoding scheme.

As illustrated in FIG. 37, the multi-view image includes images of a plurality of views, and an image of one predetermined view among the plurality of views is designated for an image of a base view. An image of each view other than the image of the base view is treated as an image of a non-base view.

When the multi-view image encoding as in FIG. 37 is performed, search range limit information of an inter-view MV which is information related to the limit of the V direction of the search range of the inter-view MV can be set in each view (same view). In addition, in each view (different view), the search range limit information of the inter-view MV set in another view can be shared.

In this case, the search range limit information of the inter-view MV set in the base view is used in at least one non-base view. Alternatively, for example, the search range limit information of the inter-view MV set in the non-base view (view_id=1) is used in at least one of the base view and the non-base view (view_id=j).

Thereby, it is possible to limit the V direction of the search range of the inter-view MV. Therefore, it is possible to process the pictures of the plurality of views in parallel.

[Multi-View Image Encoding Device]

Figure 38:
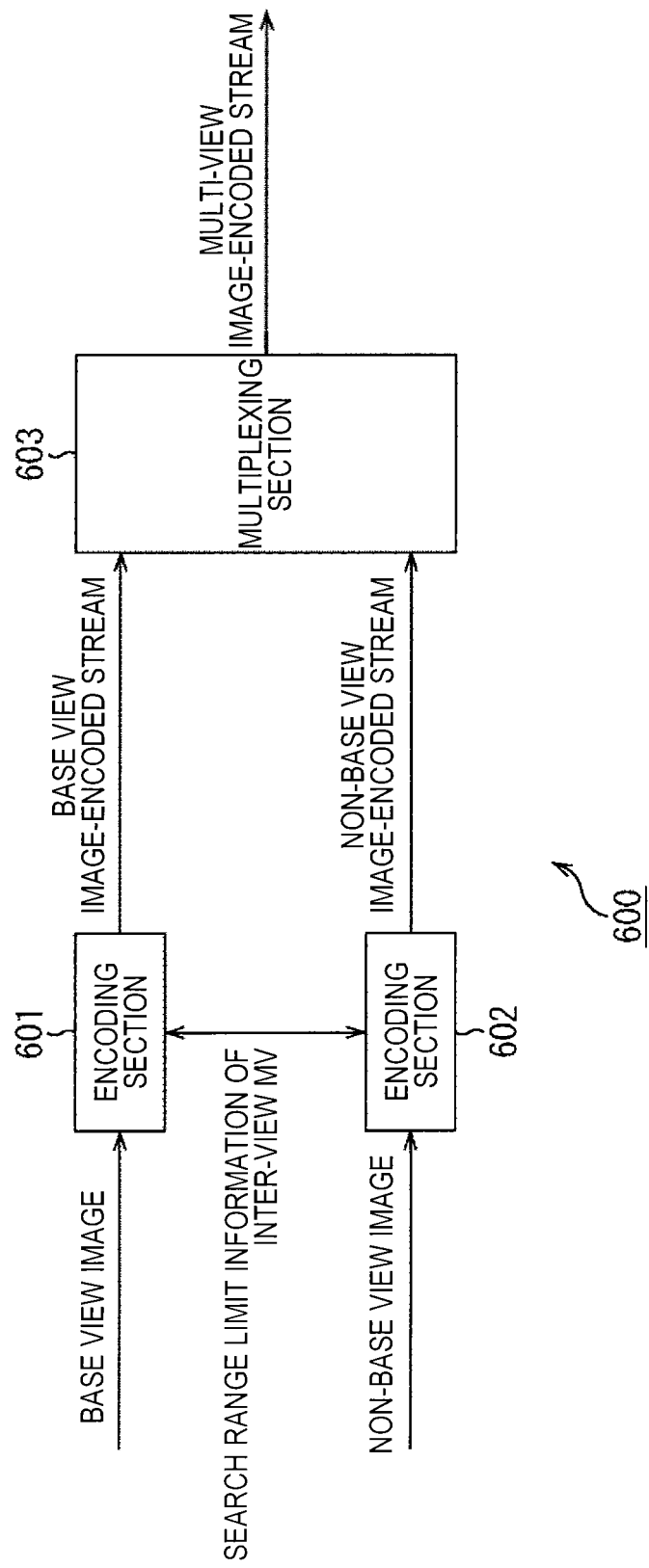
FIG. 38 is a diagram illustrating a main configuration example of a multi-view image encoding device to which the present disclosure is applied.

FIG. 38 is a diagram illustrating a multi-view image encoding device which performs the above-described multi-view image encoding. As illustrated in FIG. 38, the multi-view image encoding device 600 has an encoding section 601, an encoding section 602, and a multiplexing section 603.

The encoding section 601 encodes a base view image and generates a base view image encoded stream. The encoding section 602 encodes a non-base view image and generates a non-base view image encoded stream. The multiplexing section 603 multiplexes the base view image encoded stream generated in the encoding section 601 and the non-base view image encoded stream generated in the encoding section 602, and generates a multi-view image encoded stream.

The multi-view image encoding device 11 (FIG. 1) can be applied to the encoding section 601 and the encoding section 602 of the multi-view image encoding device 600. In this case, the multi-view image encoding device 600 sets and transmits search range limit information of an inter-view MV set by the encoding section 601 and search range limit information of an inter-view MV set by the encoding section 602.

Also, the search range limit information of the inter-view MV set by the encoding section 601 as described above may be configured to be set and transmitted so that the search range limit information is shared and used by the encoding sections 601 and 602. In contrast, the search range limit information of the inter-view MV collectively set by the encoding section 602 may be set and transmitted so that the search range limit information is shared and used by the encoding sections 601 and 602.

[Multi-View Image Decoding Device]

Figure 39:
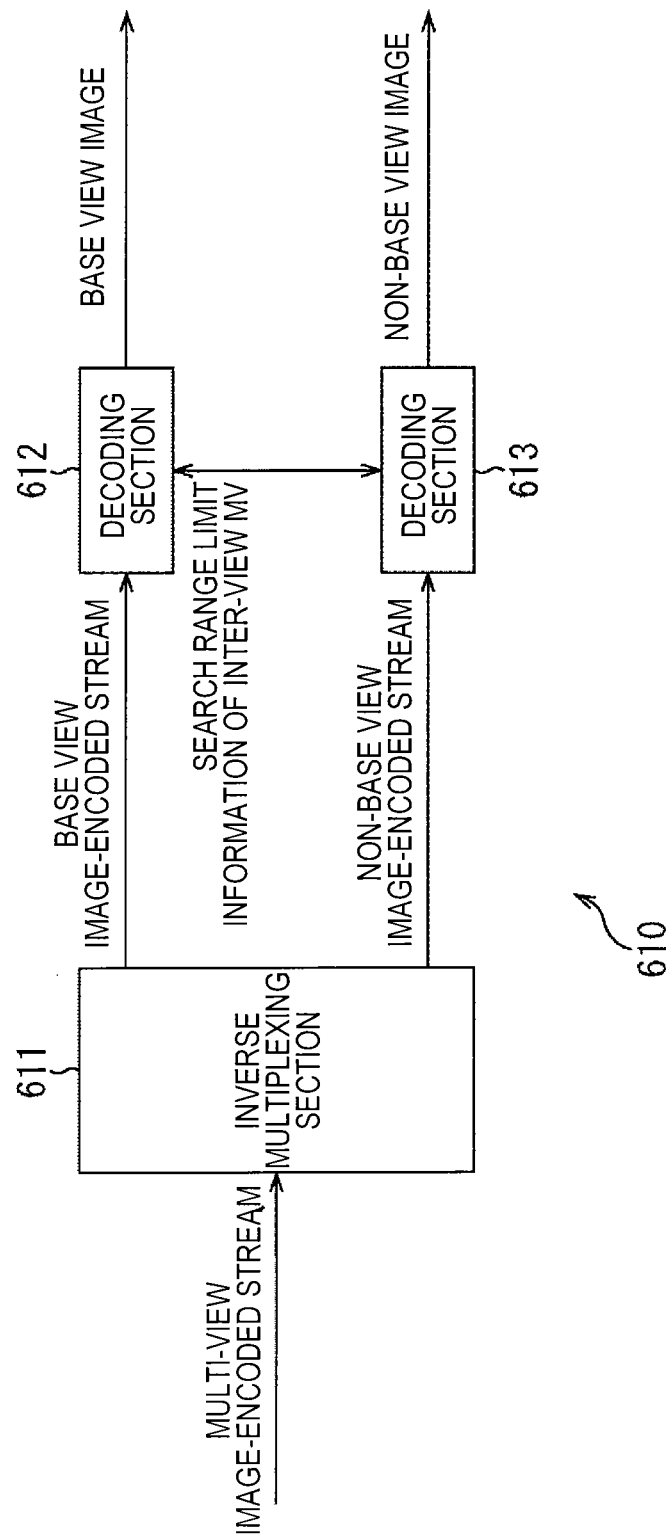
FIG. 39 is a diagram illustrating a main configuration example of a multi-view image decoding device to which the present disclosure is applied.

FIG. 39 is a diagram illustrating the multi-view image decoding device for performing the above-described multi-view image decoding. As illustrated in FIG. 39, the multi-view image decoding device 610 has an inverse multiplexing section 611, a decoding section 612, and a decoding section 613.

The inverse multiplexing section 611 inversely multiplexes a multi-view image encoded stream in which a base view image encoded stream and a non-base view image encoded stream are multiplexed, and extracts the base view image encoded stream and the non-base view image encoded stream. The decoding section 612 decodes the base view image encoded stream extracted by the inverse multiplexing section 611 and obtains a base view image. The decoding section 613 decodes the non-base view image encoded stream extracted by the inverse multiplexing section 611 and obtains a non-base view image.

It is possible to apply the multi-view image decoding device 211 (FIG. 10) to the decoding section 612 and the decoding section 613 of the multi-view image decoding device 610. In this case, the multi-view image decoding device 610 performs a process using the search range limit information of the inter-view MV set by the encoding section 601 and decoded by the decoding section 612 and the search range limit information of the inter-view MV set by the encoding section 602 and decoded by the decoding section 613.

Also, the search range limit information of the inter-view MV set by the encoding section 601 (or the encoding section 602) as described above may be set and transmitted to be shared and used by the encoding sections 601 and 602. In this case, in the multi-view image decoding device 610, a process is performed using the search range limit information of the inter-view MV set by the encoding section 601 (or the encoding section 602) and decoded by the decoding section 612 (or the decoding section 613).

9. Ninth Embodiment

Application for Hierarchical Image Encoding and Decoding

Figure 40:
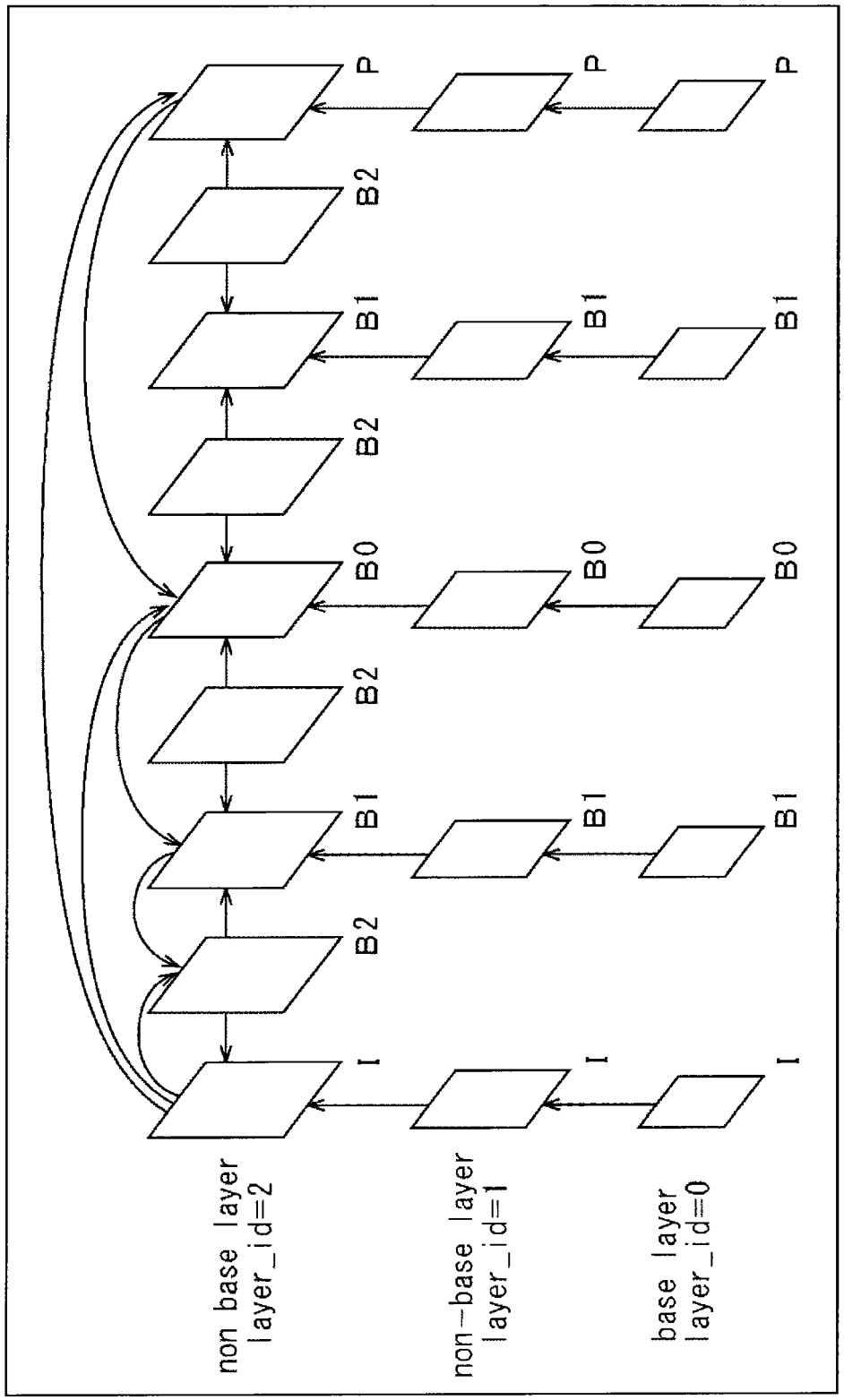
FIG. 40 is a diagram illustrating an example of a hierarchical image encoding scheme.

The above-described series of processes can be applied to the hierarchical image encoding and decoding. FIG. 40 illustrates an example of a multi-view image encoding scheme.

As illustrated in FIG. 40, a hierarchical image includes images of a plurality of layers (resolutions), and an image of a layer of a predetermined one of the plurality of resolutions is designated in the base layer or image. An image of each layer other than the image of the base layer is handled as the image of the non-base layer.

When hierarchical image encoding (spatial scalability) as in FIG. 40 is performed, it is possible to set the search range limit information of the inter-view MV in each layer (same layer). Also, in the case of the hierarchical image, the inter-view MV is shown to be the same as the inter-layer MV. In addition, it is possible to share search range limit information of the inter-view MV set by another layer in each layer (different layer).

In this case, the search range limit information of the inter-view MV set in the base layer is used in at least one non-base layer. Alternatively, for example, the search range limit information of the inter-view MV set in the non-base layer (layer_id=1) is used in at least one of the base layer and the non-base layer (layer_id=j).

Thereby, it is possible to limit the V direction of the search range of the inter-view MV. Therefore, it is possible to process the pictures of the plurality of views in parallel.

[Hierarchical Image Encoding Device]

Figure 41:
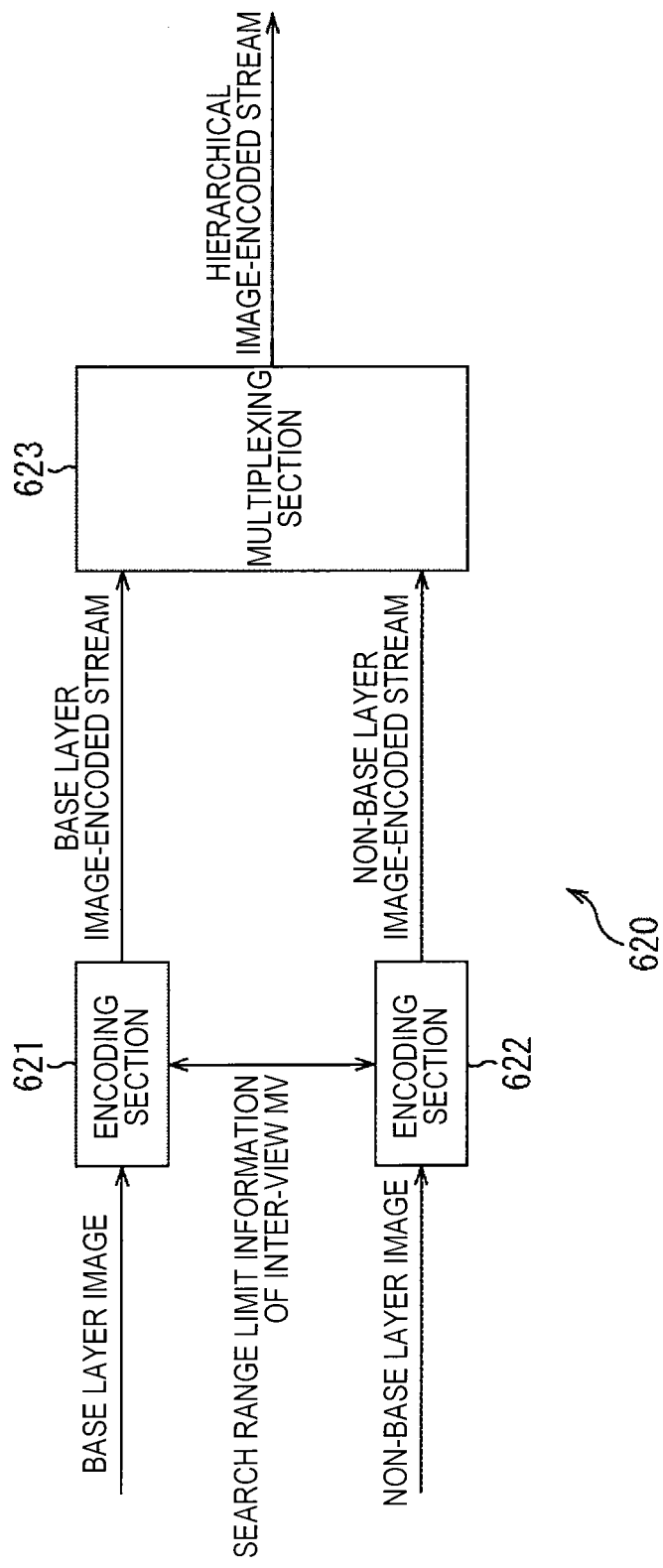
FIG. 41 is a diagram illustrating a main configuration example of a hierarchical image encoding device to which the present disclosure is applied.

FIG. 41 is a diagram illustrating a hierarchical image encoding device for performing the above-described hierarchical image encoding. As illustrated in FIG. 41, the hierarchical image encoding device 620 has an encoding section 621, an encoding section 622, and a multiplexing section 623.

The encoding section 621 encodes a base layer image and generates a base layer image encoded stream. The encoding section 622 encodes a non-base layer image and generates a non-base layer image encoded stream. The multiplexing section 623 multiplexes the base layer image encoded stream generated in the encoding section 621 and the non-base layer image encoded stream generated in the encoding section 622, and generates a hierarchical image encoded stream.

The multi-view image encoding device 11 (FIG. 1) can be applied to the encoding section 621 and the encoding section 622 of the hierarchical image encoding device 620. In this case, the hierarchical image encoding device 620 sets and transmits search range limit information of an inter-view MV set by the encoding section 621 and search range limit information of an inter-view MV set by the encoding section 602.

Also, the search range limit information of the inter-view MV set by the encoding section 621 as described above may be configured to be set and transmitted so that the search range limit information is shared and used by the encoding sections 621 and 622. In contrast, the search range limit information of the inter-view MV set by the encoding section 622 may be set and transmitted so that the search range limit information is shared and used by the encoding sections 621 and 622.

[Hierarchical Image Decoding Device]

Figure 42:
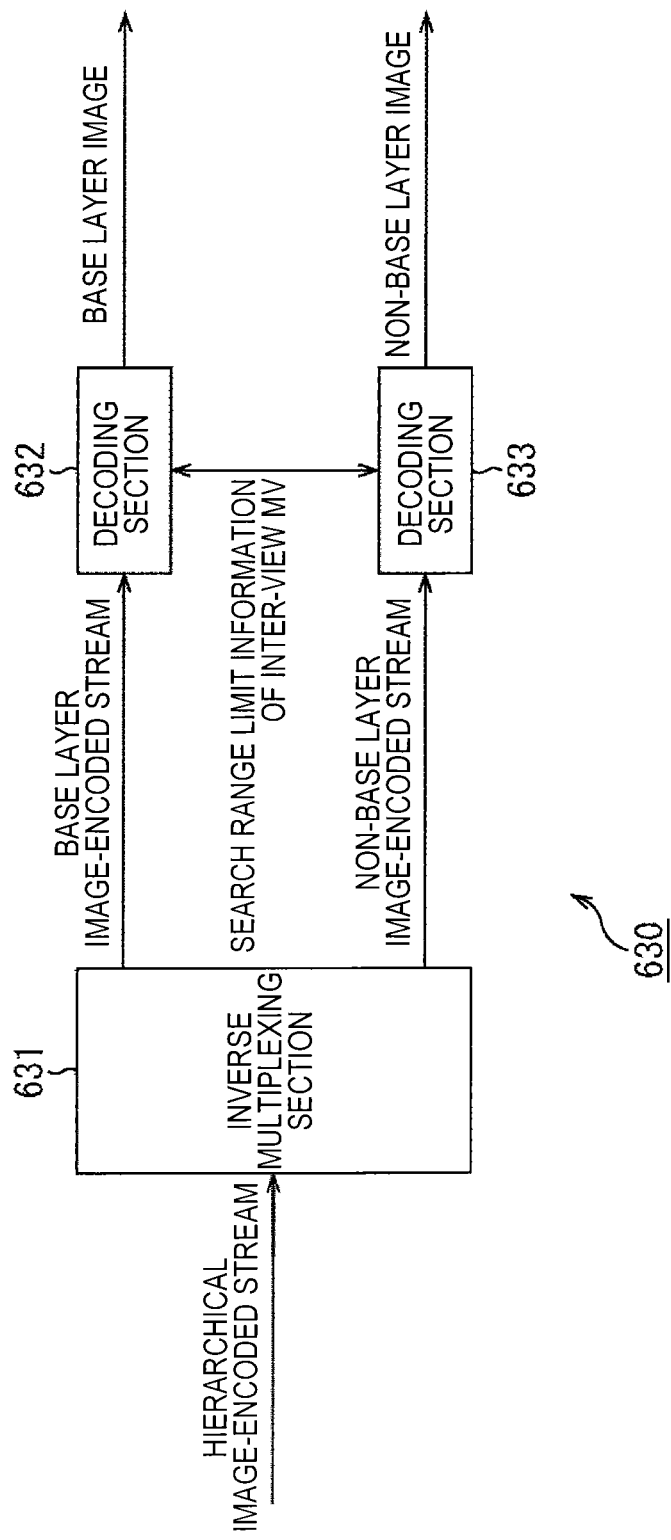
FIG. 42 is a diagram illustrating a main configuration example of a hierarchical image decoding device to which the present disclosure is applied.

FIG. 42 is a diagram illustrating a hierarchical image decoding device for performing the above-described hierarchical image decoding. As illustrated in FIG. 42, the hierarchical image decoding device 630 has an inverse multiplexing section 631, a decoding section 632, and a decoding section 633.

The inverse multiplexing section 631 inversely multiplexes a hierarchical image encoded stream in which a base layer image encoded stream and a non-base layer image encoded stream are multiplexed, and extracts the base layer image encoded stream and the non-base layer image encoded stream. The decoding section 632 decodes the base layer image encoded stream extracted by the inverse multiplexing section 631 and obtains a base layer image. The decoding section 633 decodes the non-base layer image encoded stream extracted by the inverse multiplexing section 631 and obtains a non-base layer image.

It is possible to apply the multi-view image decoding device 211 (FIG. 10) to the decoding section 632 and the decoding section 633 of the hierarchical image decoding device 630. In this case, the hierarchical image decoding device 630 performs a process using the search range limit information of the inter-view MV set by the encoding section 621 and decoded by the decoding section 632 and the search range limit information of the inter-view MV set by the encoding section 622 and decoded by the decoding section 633.

Also, the search range limit information of the inter-view MV set by the encoding section 621 (or the encoding section 622) as described above may be set and transmitted to be shared and used by the encoding sections 621 and 622. In this case, in the hierarchical image decoding device 630, a process is performed using the search range limit information of the inter-view MV set by the encoding section 621 (or the encoding section 622) and decoded by the decoding section 632 (or the decoding section 633).

10. Tenth Embodiment

Configuration Example of Computer

The above described series of processes can be executed by hardware or can be executed by software. When the series of processes are to be performed by software, the programs forming the software are installed into a computer. Here, a computer includes a computer which is incorporated in dedicated hardware or a general-purpose personal computer (PC) which can execute various functions by installing various programs into the computer, for example.

Figure 43:
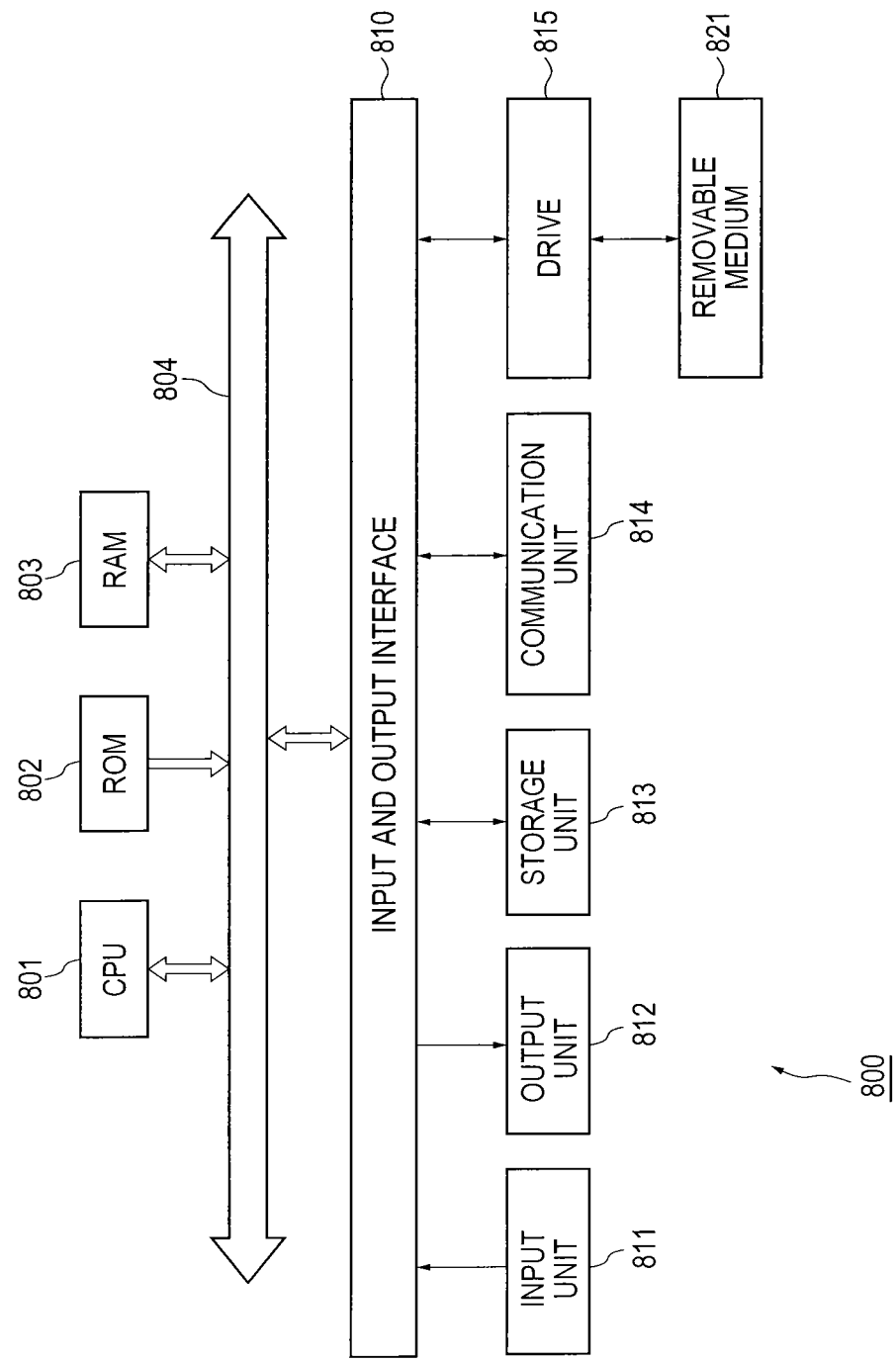
FIG. 43 is a block diagram illustrating a main configuration example of a computer.

FIG. 43 is a block diagram illustrating a configuration example of hardware of a computer for executing the above-described series of processes through a program.

In a computer 800, a central processing unit (CPU) 801, a read only memory (ROM) 802, and a random access memory (RAM) 803 are connected to one another by a bus 804.

An input and output interface (I/F) 810 is further connected to the bus 804. An input section 811, an output section 812, a storage section 813, a communication section 814, and a drive 815 are connected to the input and output I/F 810.

The input section 811 is formed with a keyboard, a mouse, a microphone, and the like. The output section 812 is formed with a display, a speaker, and the like. The storage section 813 is formed with a hard disk, a nonvolatile memory, or the like. The communication section 814 is formed with a network interface or the like. The drive 815 drives a removable medium 821 such as a magnetic disk, an optical disk, a magneto-optical disk, or a semiconductor memory.

In the computer configured as described above, the CPU 801 loads the programs stored in the storage section 813 into the RAM 803 via the input and output I/F 810 and the bus 804, and executes the programs, so that the above described series of processes are performed.

The program executed by the computer 800 (the CPU 801) may be provided by being recorded on the removable medium 821 as a packaged medium or the like. The program can also be provided via a wired or wireless transfer medium, such as a local area network, the Internet, or a digital satellite broadcast.

In the computer, by loading the removable medium 821 into the drive 815, the program can be installed into the storage section 813 via the input and output I/F 810. It is also possible to receive the program from a wired or wireless transfer medium using the communication section 814 and install the program into the storage section 813. As another alternative, the program can be installed in advance into the ROM 802 or the storage section 813.

It should be noted that the program executed by a computer may be a program that is processed in time series according to the sequence described in this specification or a program that is processed in parallel or at necessary timing such as upon calling.

In the present disclosure, steps of describing the program to be recorded on the recording medium may include processing performed in time-series according to the description order and processing not processed in time-series but performed in parallel or individually.

In the specification, the system refers to the entire apparatus including a plurality of devices (apparatuses).

Further, an element described as a single device (or processing unit) above may be divided and configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same. In other words, an embodiment of the disclosure is not limited to the embodiments described above, and various changes and modifications may be made without departing from the scope of the disclosure.

The image encoding device and the image decoding device according to the embodiment may be applied to various electronic devices such as transmitters and receivers for satellite broadcasting, cable broadcasting such as cable TV, distribution on the Internet, distribution to terminals via cellular communication and the like, recording devices that record images in a medium such as optical discs, magnetic disks and flash memory, and reproduction devices that reproduce images from such storage medium. Four applications will be described below.

11. Applications

First Application

Television Receivers

Figure 44:
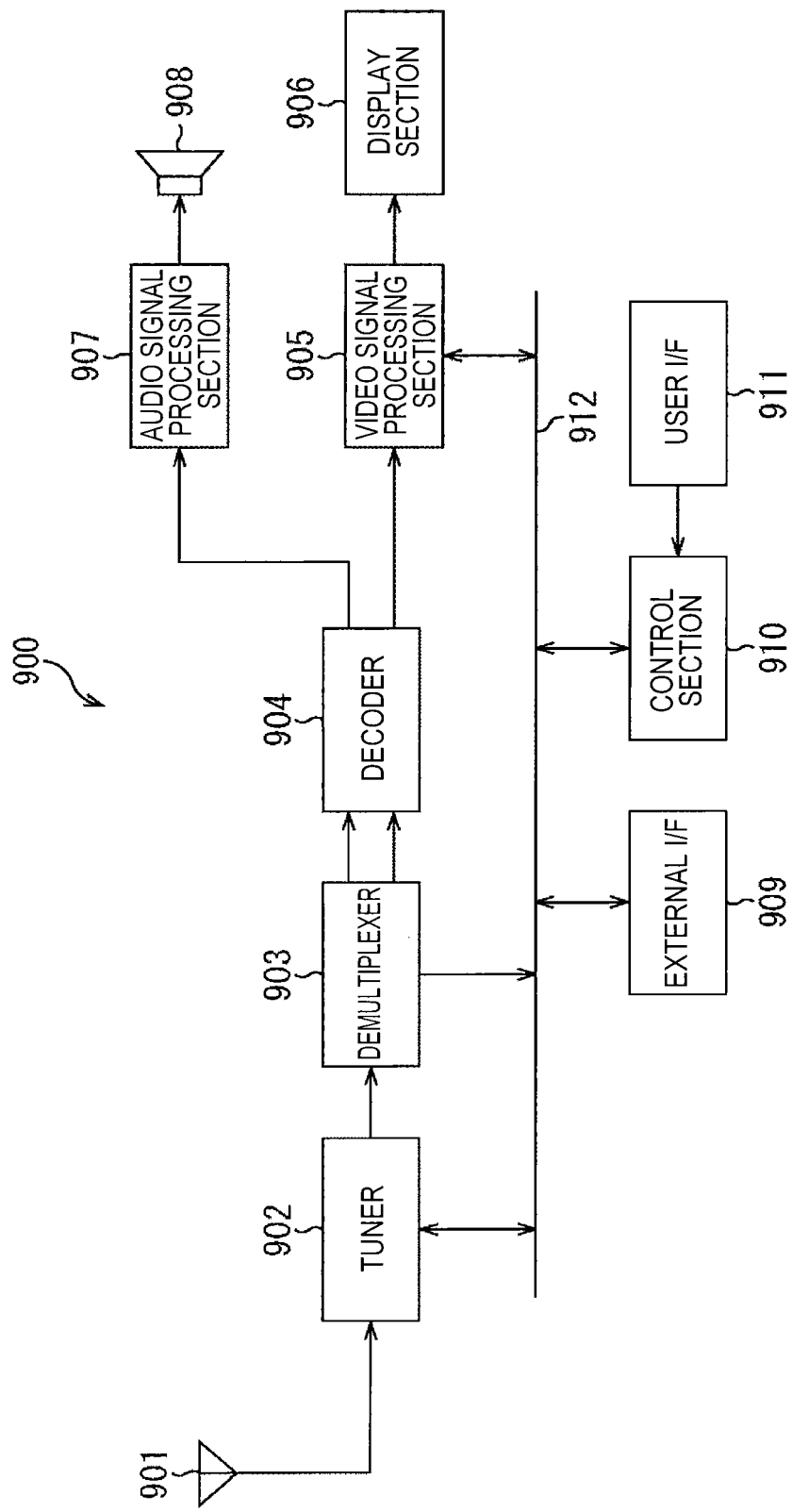
FIG. 44 is a block diagram illustrating an example of a schematic configuration of a television device.

FIG. 44 illustrates an example of a schematic configuration of a television device to which the embodiment is applied. A television device 900 includes an antenna 901, a tuner 902, a demultiplexer 903, a decoder 904, an video signal processing section 905, a display section 906, an audio signal processing section 907, a speaker 908, an external I/F 909, a control section 910, a user I/F 911, and a bus 912.

The tuner 902 extracts a signal of a desired channel from broadcast signals received via the antenna 901, and demodulates the extracted signal. The tuner 902 then outputs an encoded bit stream obtained through the demodulation to the demultiplexer 903. That is, the tuner 902 serves as a transmission means of the television device 900 for receiving an encoded stream in which an image is encoded.

The demultiplexer 903 demultiplexes the encoded bit stream to obtain a video stream and an audio stream of a program to be viewed, and outputs each stream obtained through the demultiplexing to the decoder 904. The demultiplexer 903 also extracts auxiliary data such as electronic program guides (EPGs) from the encoded bit stream, and supplies the extracted data to the control section 910. Additionally, the demultiplexer 903 may perform descrambling when the encoded bit stream has been scrambled.

The decoder 904 decodes the video stream and the audio stream input from the demultiplexer 903. The decoder 904 then outputs video data generated in the decoding process to the video signal processing section 905. The decoder 904 also outputs the audio data generated in the decoding process to the audio signal processing section 907.

The video signal processing section 905 reproduces the video data input from the decoder 904, and causes the display section 906 to display the video. The video signal processing section 905 may also cause the display section 906 to display an application screen supplied via a network. Further, the video signal processing section 905 may perform an additional process such as noise removal (suppression), for example, on the video data in accordance with the setting. Furthermore, the video signal processing section 905 may generate an image of a graphical user I/F (GUI) such as a menu, a button and a cursor, and superimpose the generated image on an output image.

The display section 906 is driven by a drive signal supplied from the video signal processing section 905, and displays a video or an image on a video screen of a display device (e.g. liquid crystal display, plasma display, organic electroluminescence display (OLED), etc.).

The audio signal processing section 907 performs a reproduction process such as D/A conversion and amplification on the audio data input from the decoder 904, and outputs a sound from the speaker 908. The audio signal processing section 907 may also perform an additional process such as noise removal (suppression) on the audio data.

The external I/F 909 is an I/F for connecting the television device 900 to an external device or a network. For example, a video stream or an audio stream received via the external I/F 909 may be decoded by the decoder 904. That is, the external I/F 909 also serves as a transmission means of the television device 900 for receiving an encoded stream in which an image is encoded.

The control section 910 includes a processor such as a central processing unit (CPU), and a memory such as random access memory (RAM) and read only memory (ROM). The memory stores a program to be executed by the CPU, program data, EPG data, data acquired via a network, and the like. The program stored in the memory is read out and executed by the CPU at the time of activation of the television device 900, for example. The CPU controls the operation of the television device 900, for example, in accordance with an operation signal input from the user I/F 911 by executing the program.

The user I/F 911 is connected to the control section 910. The user I/F 911 includes, for example, a button and a switch used for a user to operate the television device 900, and a receiving section for a remote control signal. The user I/F 911 detects an operation of a user via these structural elements, generates an operation signal, and outputs the generated operation signal to the control section 910.

The bus 912 connects the tuner 902, the demultiplexer 903, the decoder 904, the video signal processing section 905, the audio signal processing section 907, the external I/F 909, and the control section 910 to each other.

The decoder 904 has a function of the image decoding device 60 according to the embodiment in the television device 900 configured in this manner. It is possible to process pictures of a plurality of views in parallel during video decoding of an image on the television device 900.

Second Application

Mobile Phones

Figure 45:
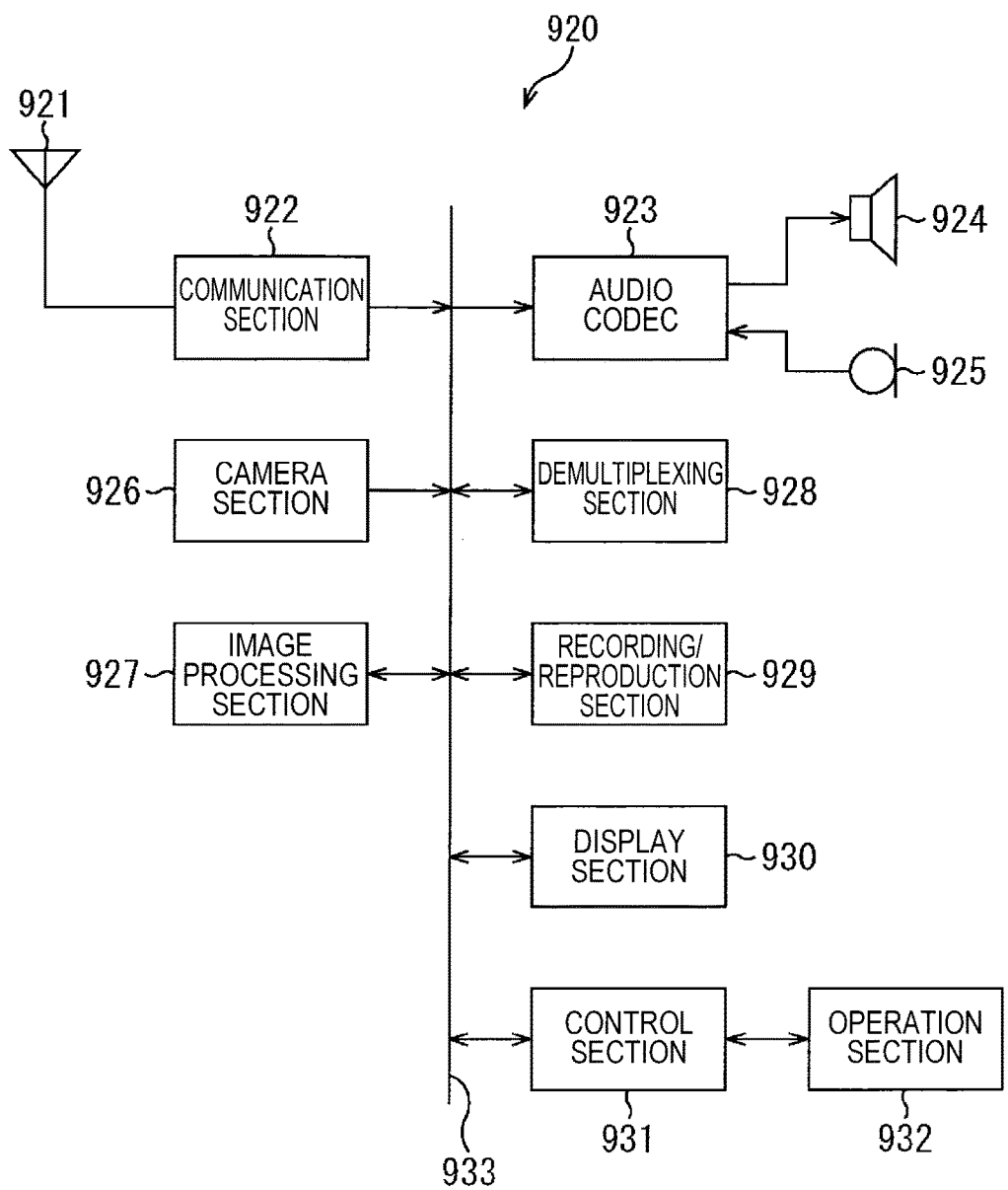
FIG. 45 is a block diagram illustrating an example of a schematic configuration of a mobile phone.

FIG. 45 illustrates an example of a schematic configuration of a mobile phone to which the embodiment is applied. A mobile phone 920 includes an antenna 921, a communication section 922, an audio codec 923, a speaker 924, a microphone 925, a camera section 926, an image processing section 927, a demultiplexing section 928, a recording/reproduction section 929, a display section 930, a control section 931, an operation section 932, and a bus 933.

The antenna 921 is connected to the communication section 922. The speaker 924 and the microphone 925 are connected to the audio codec 923. The operation section 932 is connected to the control section 931. The bus 933 connects the communication section 922, the audio codec 923, the camera section 926, the image processing section 927, the demultiplexing section 928, the recording/reproduction section 929, the display section 930, and the control section 931 to each other.

The mobile phone 920 performs an operation such as transmission and reception of an audio signal, transmission and reception of email or image data, image capturing, and recording of data in various operation modes including an audio call mode, a data communication mode, an image capturing mode, and a videophone mode.

An analogue audio signal generated by the microphone 925 is supplied to the audio codec 923 in the audio call mode. The audio codec 923 converts the analogue audio signal into audio data, has the converted audio data subjected to the A/D conversion, and compresses the converted data. The audio codec 923 then outputs the compressed audio data to the communication section 922. The communication section 922 encodes and modulates the audio data, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. The communication section 922 then demodulates and decodes the received signal, generates audio data, and outputs the generated audio data to the audio codec 923. The audio codec 923 extends the audio data, has the audio data subjected to the D/A conversion, and generates an analogue audio signal. The audio codec 923 then supplies the generated audio signal to the speaker 924 to output a sound.

The control section 931 also generates text data in accordance with an operation made by a user via the operation section 932, the text data, for example, composing email. Moreover, the control section 931 causes the display section 930 to display the text. Furthermore, the control section 931 generates email data in accordance with a transmission instruction from a user via the operation section 932, and outputs the generated email data to the communication section 922. The communication section 922 encodes and modulates the email data, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. The communication section 922 then demodulates and decodes the received signal to restore the email data, and outputs the restored email data to the control section 931. The control section 931 causes the display section 930 to display the content of the email, and also causes the storage medium of the recording/reproduction section 929 to store the email data.

The recording/reproduction section 929 includes a readable and writable storage medium. For example, the storage medium may be a built-in storage medium such as RAM and flash memory, or an externally mounted storage medium such as hard disks, magnetic disks, magneto-optical disks, optical discs, universal serial bus (USB) memory, and memory cards.

Furthermore, the camera section 926, for example, captures an image of a subject to generate image data, and outputs the generated image data to the image processing section 927 in the image capturing mode. The image processing section 927 encodes the image data input from the camera section 926, and causes the storage medium of the storage/reproduction section 929 to store the encoded stream.

Furthermore, the demultiplexing section 928, for example, multiplexes a video stream encoded by the image processing section 927 and an audio stream input from the audio codec 923, and outputs the multiplexed stream to the communication section 922 in the videophone mode. The communication section 922 encodes and modulates the stream, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. These transmission signal and received signal may include an encoded bit stream. The communication section 922 then demodulates and decodes the received signal to restore the stream, and outputs the restored stream to the demultiplexing section 928. The demultiplexing section 928 demultiplexes the input stream to obtain a video stream and an audio stream, and outputs the video stream to the image processing section 927 and the audio stream to the audio codec 923. The image processing section 927 decodes the video stream, and generates video data. The video data is supplied to the display section 930, and a series of images is displayed by the display section 930. The audio codec 923 extends the audio stream, has the audio stream subjected to the D/A conversion, and generates an analogue audio signal. The audio codec 923 then supplies the generated audio signal to the speaker 924, and causes a sound to be output.

The image processing section 927 has a function of the image encoding device and the image decoding device according to the embodiment in the mobile phone 920 configured in this manner. It is possible to process pictures of a plurality of views in parallel during scalable video coding and decoding of an image on the mobile phone 920.

Third Application

Recording/Reproduction Device

Figure 46:
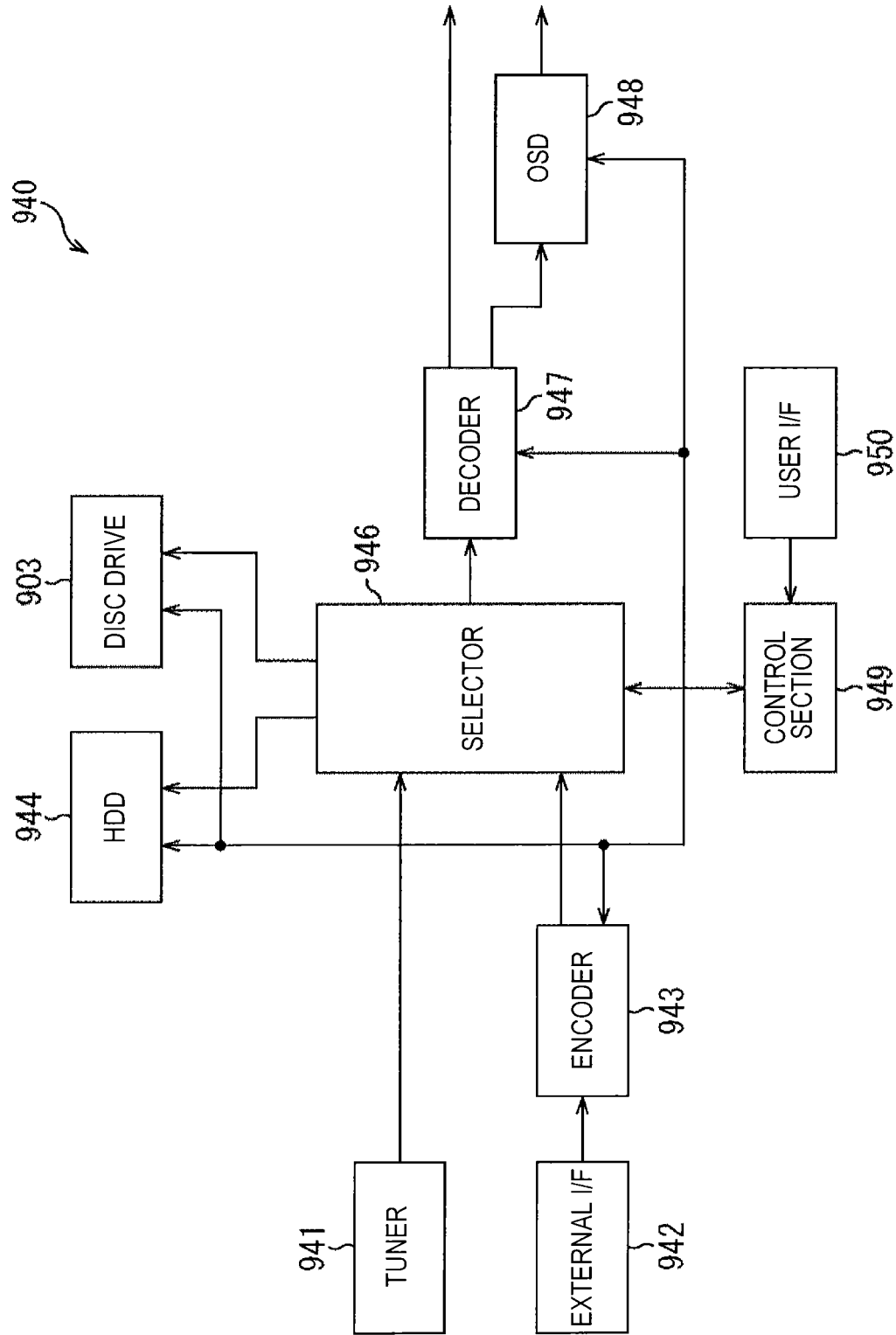
FIG. 46 is a block diagram illustrating an example of a schematic configuration of a recording/reproduction device.

FIG. 46 illustrates an example of a schematic configuration of a recording/reproduction device to which the embodiment is applied. A recording/reproduction device 940, for example, encodes audio data and video data of a received broadcast program and records the encoded audio data and the encoded video data in a recording medium. For example, the recording/reproduction device 940 may also encode audio data and video data acquired from another device and record the encoded audio data and the encoded video data in a recording medium. Furthermore, the recording/reproduction device 940, for example, uses a monitor or a speaker to reproduce the data recorded in the recording medium in accordance with an instruction of a user. At this time, the recording/reproduction device 940 decodes the audio data and the video data.

The recording/reproduction device 940 includes a tuner 941, an external I/F 942, an encoder 943, a hard disk drive (HDD) 944, a disc drive 945, a selector 946, a decoder 947, an on-screen display (OSD) 948, a control section 949, and a user I/F 950.

The tuner 941 extracts a signal of a desired channel from broadcast signals received via an antenna (not shown), and demodulates the extracted signal. The tuner 941 then outputs an encoded bit stream obtained through the demodulation to the selector 946. That is, the tuner 941 serves as a transmission means of the recording/reproduction device 940.

The external I/F 942 is an OF for connecting the recording/reproduction device 940 to an external device or a network. For example, the external I/F 942 may be an Institute of Electrical and Electronics Engineers (IEEE) 1394 I/F, a network I/F, an USB I/F, a flash memory I/F, or the like. For example, video data and audio data received via the external I/F 942 are input to the encoder 943. That is, the external I/F 942 serves as a transmission means of the recording/reproduction device 940.

When the video data and the audio data input from the external I/F 942 have not been encoded, the encoder 943 encodes the video data and the audio data. The encoder 943 then outputs an encoded bit stream to the selector 946.

The HDD 944 records, in an internal hard disk, the encoded bit stream in which content data of a video and a sound is compressed, various programs, and other pieces of data. The HDD 944 also reads out these pieces of data from the hard disk at the time of reproducing a video or a sound.

The disc drive 945 records and reads out data in a recording medium that is mounted. The recording medium that is mounted on the disc drive 945 may be, for example, a DVD disc (DVD-Video, DVD-RAM, DVD-R, DVD-RW, a DVD+R, DVD+RW, etc.), a Blu-ray (registered trademark) disc, or the like.

The selector 946 selects, at the time of recording a video or a sound, an encoded bit stream input from the tuner 941 or the encoder 943, and outputs the selected encoded bit stream to the HDD 944 or the disc drive 945. The selector 946 also outputs, at the time of reproducing a video or a sound, an encoded bit stream input from the HDD 944 or the disc drive 945 to the decoder 947.

The decoder 947 decodes the encoded bit stream, and generates video data and audio data. The decoder 947 then outputs the generated video data to the OSD 948. The decoder 904 also outputs the generated audio data to an external speaker.

The OSD 948 reproduces the video data input from the decoder 947, and displays a video. The OSD 948 may also superimpose an image of a GUI such as a menu, a button, and a cursor on a displayed video.

The control section 949 includes a processor such as a CPU, and a memory such as RAM and ROM. The memory stores a program to be executed by the CPU, program data, and the like. For example, a program stored in the memory is read out and executed by the CPU at the time of activation of the recording/reproduction device 940. The CPU controls the operation of the recording/reproduction device 940, for example, in accordance with an operation signal input from the user I/F 950 by executing the program.

The user I/F 950 is connected to the control section 949. The user I/F 950 includes, for example, a button and a switch used for a user to operate the recording/reproduction device 940, and a receiving section for a remote control signal. The user I/F 950 detects an operation made by a user via these structural elements, generates an operation signal, and outputs the generated operation signal to the control section 949.

The encoder 943 has a function of the image encoding device according to the embodiment in the recording/reproduction device 940 configured in this manner. The decoder 947 also has a function of the image decoding device according to the embodiment. It is possible to process pictures of a plurality of views in parallel during video coding and decoding of an image on the recording/reproduction device 940.

Fourth Application

Image Capturing Device

Figure 47:
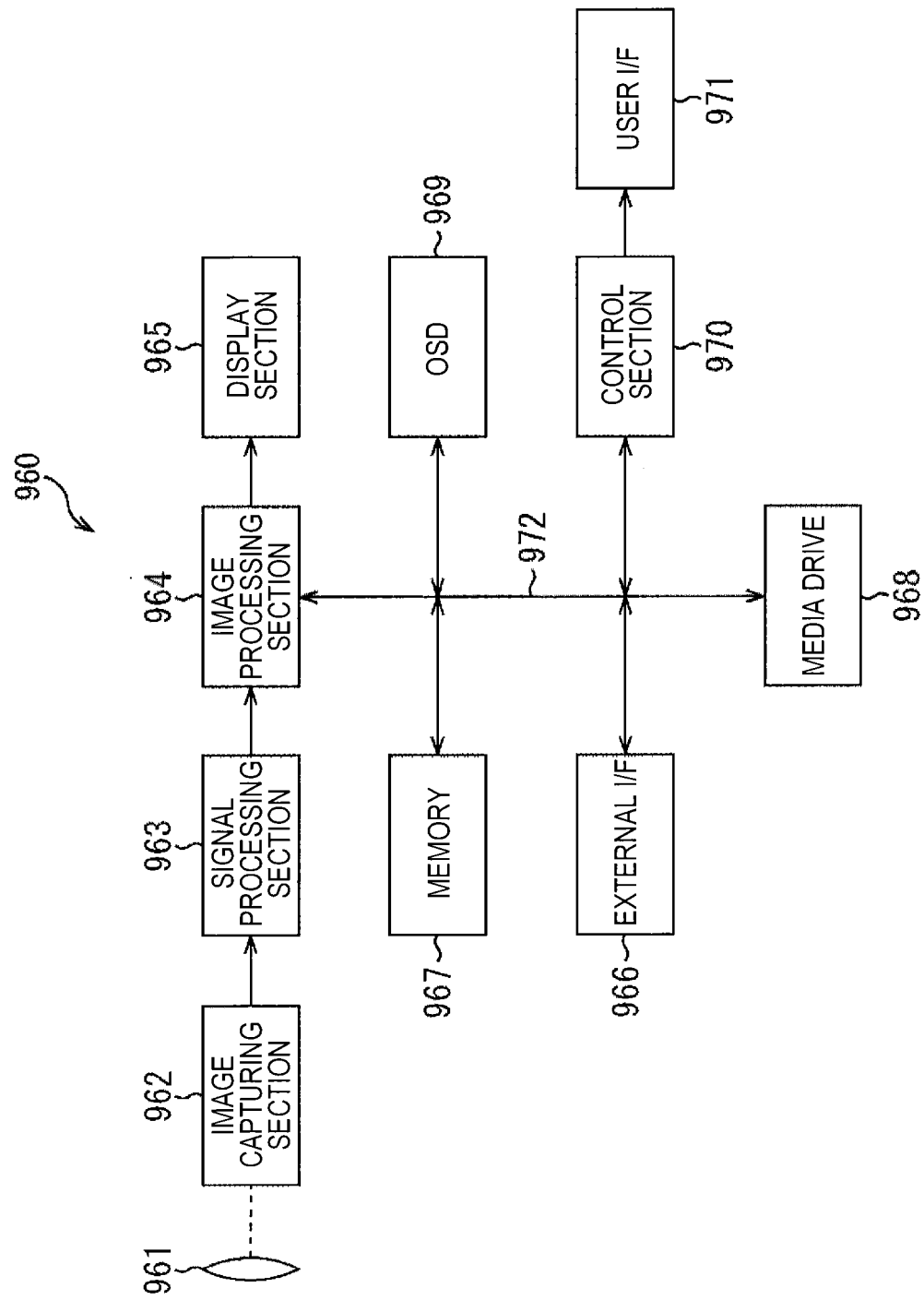
FIG. 47 is a block diagram illustrating an example of a schematic configuration of an image capturing device.

FIG. 47 illustrates an example of a schematic configuration of an image capturing device to which the embodiment is applied. An image capturing device 960 captures an image of a subject to generate an image, encodes the image data, and records the image data in a recording medium.

The image capturing device 960 includes an optical block 961, an image capturing section 962, a signal processing section 963, an image processing section 964, a display section 965, an external I/F 966, a memory 967, a media drive 968, an OSD 969, a control section 970, a user I/F 971, and a bus 972.

The optical block 961 is connected to the image capturing section 962. The image capturing section 962 is connected to the signal processing section 963. The display section 965 is connected to the image processing section 964. The user I/F 971 is connected to the control section 970. The bus 972 connects the image processing section 964, the external I/F 966, the memory 967, the media drive 968, the OSD 969, and the control section 970 to each other.

The optical block 961 includes a focus lens, an aperture stop mechanism, and the like. The optical block 961 forms an optical image of a subject on an image capturing surface of the image capturing section 962. The image capturing section 962 includes an image sensor such as a charge coupled device (CCD) and a complementary metal oxide semiconductor (CMOS), and converts the optical image formed on the image capturing surface into an image signal which is an electrical signal through photoelectric conversion. The image capturing section 962 then outputs the image signal to the signal processing section 963.

The signal processing section 963 performs various camera signal processes such as knee correction, gamma correction, and color correction on the image signal input from the image capturing section 962. The signal processing section 963 outputs the image data subjected to the camera signal process to the image processing section 964.

The image processing section 964 encodes the image data input from the signal processing section 963, and generates encoded data. The image processing section 964 then outputs the generated encoded data to the external I/F 966 or the media drive 968. The image processing section 964 also decodes encoded data input from the external I/F 966 or the media drive 968, and generates image data. The image processing section 964 then outputs the generated image data to the display section 965. The image processing section 964 may also output the image data input from the signal processing section 963 to the display section 965, and cause the image to be displayed. Furthermore, the image processing section 964 may superimpose data for display acquired from the OSD 969 on an image to be output to the display section 965.

The OSD 969 generates an image of a GUI such as a menu, a button, and a cursor, and outputs the generated image to the image processing section 964.

The external I/F 966 is configured, for example, as an USB input and output terminal. The external I/F 966 connects the image capturing device 960 and a printer, for example, at the time of printing an image. A drive is further connected to the external I/F 966 as needed. A removable medium such as magnetic disks and optical discs is mounted on the drive, and a program read out from the removable medium may be installed in the image capturing device 960. Furthermore, the external I/F 966 may be configured as a network I/F to be connected to a network such as a LAN and the Internet. That is, the external I/F 966 serves as a transmission means of the image capturing device 960.

A recording medium to be mounted on the media drive 968 may be a readable and writable removable medium such as magnetic disks, magneto-optical disks, optical discs, and semiconductor memory. The recording medium may also be fixedly mounted on the media drive 968, configuring a non-transportable storage section such as built-in hard disk drives or a solid state drives (SSDs).

The control section 970 includes a processor such as a CPU, and a memory such as RAM and ROM. The memory stores a program to be executed by the CPU, program data, and the like. A program stored in the memory is read out and executed by the CPU, for example, at the time of activation of the image capturing device 960. The CPU controls the operation of the image capturing device 960, for example, in accordance with an operation signal input from the user I/F 971 by executing the program.

The user I/F 971 is connected to the control section 970. The user I/F 971 includes, for example, a button, a switch, and the like used for a user to operate the image capturing device 960. The user I/F 971 detects an operation made by a user via these structural elements, generates an operation signal, and outputs the generated operation signal to the control section 970.

The image processing section 964 has a function of the image encoding device and the image decoding device according to the embodiment in the image capturing device 960 configured in this manner. It is possible to process pictures of a plurality of views in parallel during video coding and decoding of an image on the image capturing device 960.

12. Application Example of Scalable Video Coding

First System

Next, a specific example of using scalable coded data, in which a scalable video coding (hierarchical coding) is performed, will be described. The scalable video coding, for example, is used for selection of data to be transmitted as examples illustrated in FIG. 48.

Figure 48:
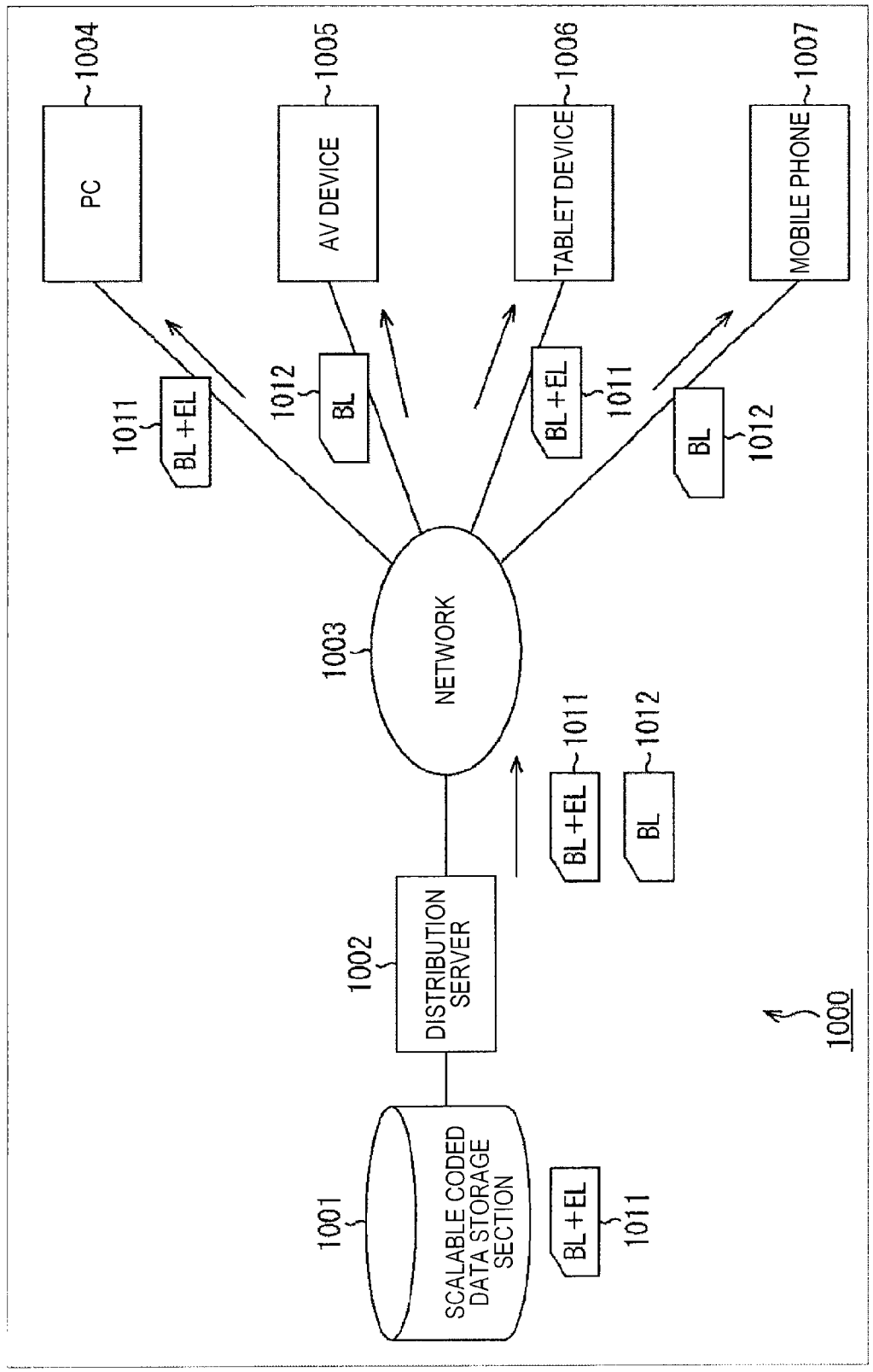
FIG. 48 is a block diagram illustrating an example of scalable video coding use.

In a data transmission system 1000 illustrated in FIG. 48, a distribution server 1002 reads scalable coded data stored in a scalable coded data storage section 1001, and distributes the scalable coded data to a terminal device such as a PC 1004, an AV device 1005, a tablet device 1006, or a mobile phone 1007 via a network 1003.

At this time, the distribution server 1002 selects and transmits coded data having proper quality according to capability of the terminal device, communication environment, or the like. Even when the distribution server 1002 transmits unnecessarily high-quality data, a high-quality image is not necessarily obtainable in the terminal device and it may be a cause of occurrence of a delay or an overflow. In addition, a communication band may be unnecessarily occupied or a load of the terminal device may be unnecessarily increased. In contrast, even when the distribution server 1002 transmits unnecessarily low quality data, an image with a sufficient quality may not be obtained. Thus, the distribution server 1002 appropriately reads and transmits the scalable coded data stored in the scalable coded data storage section 1001 as the coded data having a proper quality according to the capability of the terminal device, the communication environment, or the like.

For example, the scalable coded data storage section 1001 is configured to store scalable coded data (BL+EL) 1011 in which the scalable video coding is performed. The scalable coded data (BL+EL) 1011 is coded data including both a base layer and an enhancement layer, and is data from which a base layer image and an enhancement layer image can be obtained by performing decoding.

The distribution server 1002 selects an appropriate layer according to the capability of the terminal device for transmitting data, the communication environment, or the like, and reads the data of the selected layer. For example, with respect to the PC 1004 or the tablet device 1006 having high processing capability, the distribution server 1002 reads the scalable coded data (BL+EL) 1011 from the scalable coded data storage section 1001, and transmits the scalable coded data (BL+EL) 1011 without change. On the other hand, for example, with respect to the AV device 1005 or the mobile phone 1007 having low processing capability, the distribution server 1002 extracts the data of the base layer from the scalable coded data (BL+EL) 1011, and transmits the extracted data of the base layer as low quality scalable coded data (BL) 1012 that is data having the same content as the scalable coded data (BL+EL) 1011 but has lower quality than the scalable coded data (BL+EL) 1011.

Because an amount of data can easily be adjusted by employing the scalable coded data, the occurrence of the delay or the overflow can be suppressed or the unnecessary increase of the load of the terminal device or the communication media can be suppressed. In addition, because a redundancy between the layers is reduced in the scalable coded data (BL+EL) 1011, it is possible to further reduce the amount of data than when the coded data of each layer is treated as the individual data. Therefore, it is possible to more efficiently use the storage region of the scalable coded data storage section 1001.

Because various devices such as the PC 1004 to the mobile phone 1007 are applicable as the terminal device, the hardware performance of the terminal devices differs according to the device. In addition, because there are various applications which are executed by the terminal device, the software performance thereof also varies. Further, because all the communication networks including a wired, wireless, or both such as the Internet and the local area network (LAN) are applicable as the network 1003 serving as a communication medium, the data transmission performance thereof varies. Further, the data transmission performance may vary by other communications, or the like.

Therefore, the distribution server 1002 may perform communication with the terminal device which is the data transmission destination before starting the data transmission, and then obtain information related to the terminal device performance such as hardware performance of the terminal device, or the application (software) performance which is executed by the terminal device, and information related to the communication environment such as an available bandwidth of the network 1003. Then, distribution server 1002 may select an appropriate layer based on the obtained information.

Also, the extraction of the layer may be performed in the terminal device. For example, the PC 1004 may decode the transmitted scalable coded data (BL+EL) 1011 and display the image of the base layer or display the image of the enhancement layer. In addition, for example, the PC 1004 may be configured to extract the scalable coded data (BL) 1012 of the base layer from the transmitted scalable coded data (BL+EL) 1011, store the extracted scalable coded data (BL) 1012 of the base layer, transmit to another device, or decode and display the image of the base layer.

Of course, the number of the scalable coded data storage sections 1001, the distribution servers 1002, the networks 1003, and the terminal devices are optional. In addition, although the example of the distribution server 1002 transmitting the data to the terminal device is described above, the example of use is not limited thereto. The data transmission system 1000 is applicable to any system which selects and transmits an appropriate layer according to the capability of the terminal device, the communication environment, or the like when the scalable coded data is transmitted to the terminal device.

Even in the data transmission system 1000 as in FIG. 48, it is possible to obtain effects similar to those described above with reference to FIGS. 1 to 36 by applying the present technology similar to the applications for the multi-view image encoding device and the multi-view decoding device described above with reference to FIGS. 1 to 36.

Second System

Figure 49:
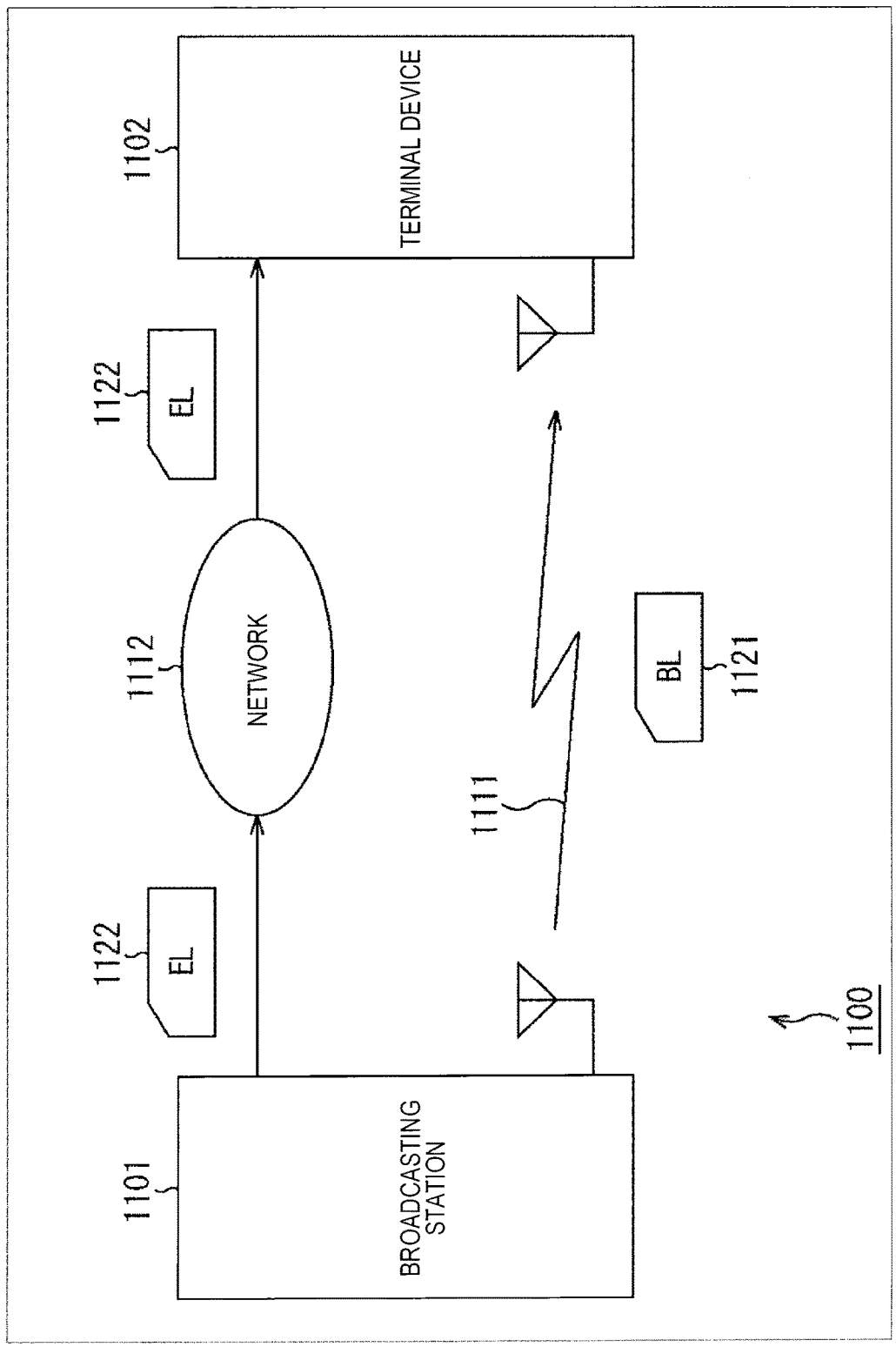
FIG. 49 is a block diagram illustrating another example of scalable video coding use.

In addition, the scalable video coding, for example, is used for transmission via a plurality of communication media as in an example illustrated in FIG. 49.

In a data transmission system 1100 illustrated in FIG. 49, a broadcasting station 1101 transmits scalable coded data (BL) 1121 of the base layer by terrestrial broadcasting 1111. In addition, the broadcasting station 1101 transmits scalable coded data (EL) 1122 of the enhancement layer via any arbitrary network 1112 made of a communication network that is wired, wireless, or both (for example, the data is packetized and transmitted).

A terminal device 1102 has a function of receiving the terrestrial broadcasting 1111 that is broadcast by the broadcasting station 1101 and receives the scalable coded data (BL) 1121 of the base layer transmitted via the terrestrial broadcasting 1111. In addition, the terminal device 1102 further has a communication function by which the communication is performed via the network 1112, and receives the scalable coded data (EL) 1122 of the enhancement layer transmitted via the network 1112.

For example, according to a user's instruction or the like, the terminal device 1102 decodes the scalable coded data (BL) 1121 of the base layer acquired via the terrestrial broadcasting 1111, thereby obtaining or storing the image of the base layer or transmitting the image of the base layer to other devices.

In addition, for example, according to the user's instruction, the terminal device 1102 combines the scalable coded data (BL) 1121 of the base layer acquired via the terrestrial broadcasting 1111 and the scalable coded data (EL) 1122 of the enhancement layer acquired via the network 1112, thereby obtaining the scalable coded data (BL+EL), obtaining or storing the image of the enhancement layer by decoding the scalable coded data (BL+EL), or transmitting the image of the enhancement layer to other devices.

As described above, the scalable coded data, for example, can be transmitted via the different communication medium for each layer. Therefore, it is possible to disperse the load and suppress the occurrence of the delay or the overflow.

In addition, according to the situation, the communication medium used for the transmission for each layer may be configured to be selected. For example, the scalable coded data (BL) 1121 of the base layer in which the amount of data is comparatively large may be transmitted via the communication medium having a wide bandwidth, and the scalable coded data (EL) 1122 of the enhancement layer in which the amount of data is comparatively small may be transmitted via the communication media having a narrow bandwidth. In addition, for example, whether the communication medium that transmits the scalable coded data (EL) 1122 of the enhancement layer is the network 1112 or the terrestrial broadcasting 1111 may be switched according to the available bandwidth of the network 1112. Of course, the same is true for data of an arbitrary layer.

By controlling in this way, it is possible to further suppress the increase of the load in the data transmission.

Of course, the number of the layers is optional, and the number of communication media used in the transmission is also optional. In addition, the number of terminal devices 1102 which are the destination of the data distribution is also optional. Further, although the example of the broadcasting from the broadcasting station 1101 has been described above, the use example is not limited thereto. The data transmission system 1100 can be applied to any system which divides the scalable coded data using a layer as a unit and transmits the scalable coded data via a plurality of links.

Even in the data transmission system 1100 as in FIG. 49, it is possible to obtain effects similar to those described above with reference to FIGS. 1 to 36 by applying the present technology similar to the applications for the multi-view image encoding device and the multi-view decoding device described above with reference to FIGS. 1 to 36.

Third System

Figure 50:
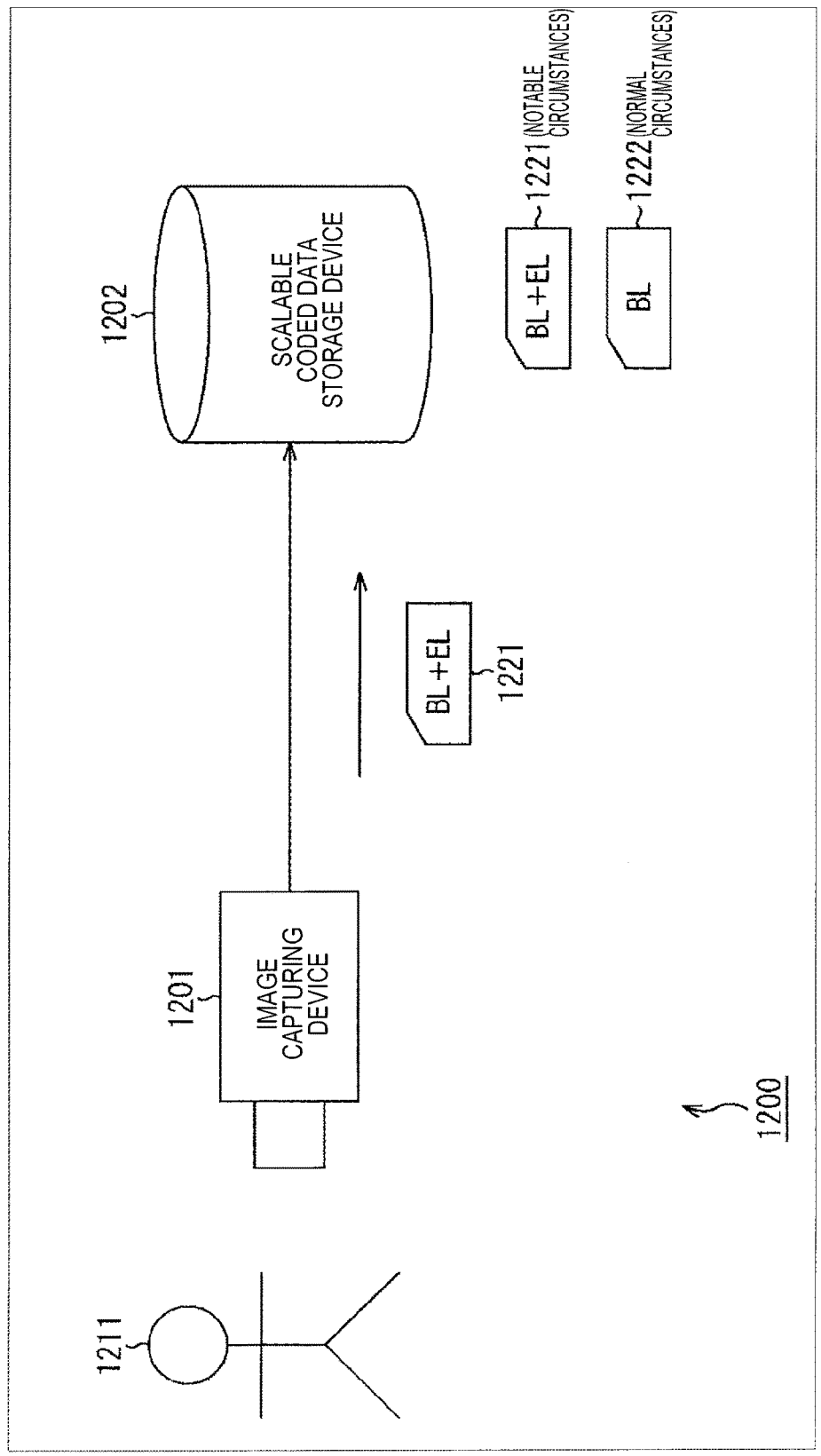
FIG. 50 is a block diagram illustrating still another example of scalable video coding use.

In addition, the scalable video coding is used in the storage of the coded data as an example illustrated in FIG. 50.

In an image capturing system 1200 illustrated in FIG. 50, an image capturing device 1201 performs scalable video coding on image data obtained by capturing an image of a subject 1211, and supplies a scalable video result as the scalable coded data (BL+EL) 1221 to a scalable coded data storage device 1202.

The scalable coded data storage device 1202 stores the scalable coded data (BL+EL) 1221 supplied from the image capturing device 1201 in quality according to the situation. For example, in the case of normal circumstances, the scalable coded data storage device 1202 extracts data of the base layer from the scalable coded data (BL+EL) 1221, and stores the extracted data as scalable coded data (BL) 1222 of the base layer having a small amount of data at low quality. On the other hand, for example, in the case of notable circumstances, the scalable coded data storage device 1202 stores the scalable coded data (BL+EL) 1221 having a large amount of data at high quality without change.

In this way, because the scalable coded data storage device 1202 can save the image at high quality only in a necessary case, it is possible to suppress the decrease of the value of the image due to the deterioration of the image quality and suppress the increase of the amount of data, and it is possible to improve the use efficiency of the storage region.

For example, the image capturing device 1201 is assumed to be a motoring camera. Because content of the captured image is unlikely to be important when a monitoring subject (for example, an invader) is not shown in the imaged image (in the case of the normal circumstances), the priority is on the reduction of the amount of data, and the image data (scalable coded data) is stored at low quality. On the other hand, because the content of the imaged image is likely to be important when a monitoring target is shown as the subject 1211 in the imaged image (in the case of the notable circumstances), the priority is on the image quality, and the image data (scalable coded data) is stored at high quality.

For example, whether the case is the case of the normal circumstances or the notable circumstances may be determined by the scalable coded data storage device 1202 by analyzing the image. In addition, the image capturing device 1201 may be configured to make the determination and transmit the determination result to the scalable coded data storage device 1202.

A determination criterion of whether the case is the case of the normal circumstances or the notable circumstances is optional and the content of the image which is the determination criterion is optional. Of course, a condition other than the content of the image can be designated as the determination criterion. For example, switching may be configured to be performed according to the magnitude or waveform of recorded sound, by a predetermined time interval, or by an external instruction such as the user's instruction.

In addition, although the two states of the normal circumstances and the notable circumstances have been described above, the number of the states is optional, and for example, switching may be configured to be performed among three or more states such as normal circumstances, slightly notable circumstances, notable circumstances, and highly notable circumstances. However, the upper limit number of states to be switched depends upon the number of layers of the scalable coded data.

In addition, the image capturing device 1201 may determine the number of layers of the scalable video coding according to the state. For example, in the case of the normal circumstances, the image capturing device 1201 may generate the scalable coded data (BL) 1222 of the base layer having a small amount of data at low quality and supply the data to the scalable coded data storage device 1202. In addition, for example, in the case of the notable circumstances, the image capturing device 1201 may generate the scalable coded data (BL+EL) 1221 of the base layer having a large amount of data at high quality and supply the data to the scalable coded data storage device 1202.

Although the monitoring camera has been described above as the example, the usage of the image capturing system 1200 is optional and is not limited to the monitoring camera.

Even in the image capturing system 1200 as in FIG. 50, it is possible to obtain effects similar to those described above with reference to FIGS. 1 to 36 by applying the present technology similar to the applications for the multi-view image encoding device and the multi-view decoding device described above with reference to FIGS. 1 to 36.

13. Eleventh Embodiment

Other Examples of Implementation

Although the examples of the devices and the system to which the present technology is applied have been described above, the present technology is not limited thereto. For example, the present technology can also be implemented as a processor serving as system large scale integration (LSI) or the like, a module using a plurality of processors or the like, a unit using a plurality of modules or the like, a set in which other functions are further added to the unit, or the like (that is, a configuration of part of the device).

[Video Set]

Figure 51:
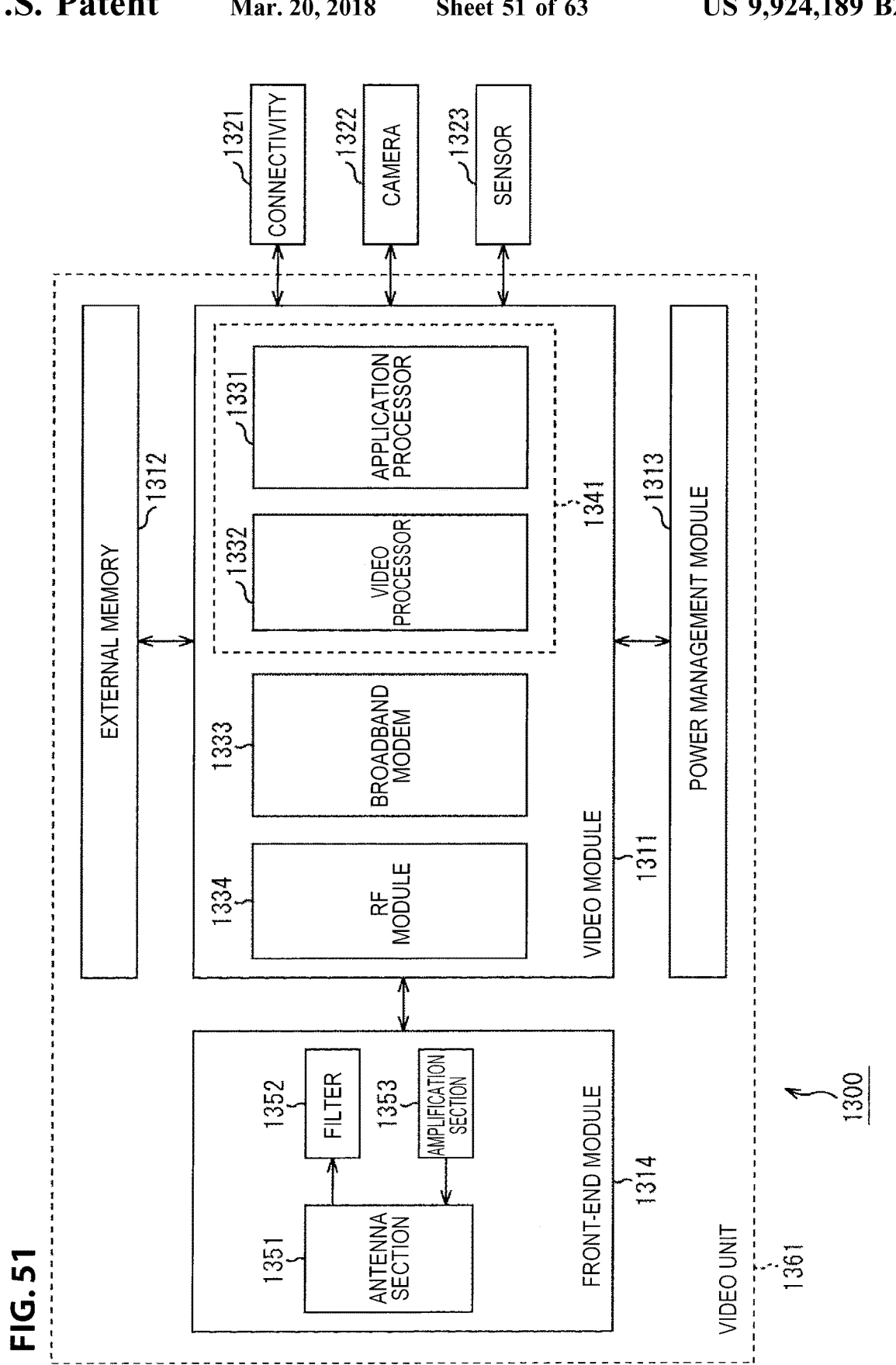
FIG. 51 is a block diagram illustrating an example of a schematic configuration of a video set.

An example in which the present technology is implemented as the set will be described with reference to FIG. 51. FIG. 51 illustrates an example of a schematic configuration of the video set to which the present technology is applied.

Recently, the multi-functionality of electronic devices has advanced, and the case in which one set having a plurality of functions is implemented by combining a plurality of configurations having associated functions as well as the case in which a partial configuration of the multi-functionality is implemented with the development and manufacturing thereof and the case in which the configuration is implemented to have one function could be seen.

A video set 1300 illustrated in FIG. 51 is a multi-functional configuration and serves as a video set obtained by combining a device having a function related to image encoding and decoding (either one or both of which may be given) with a device having other functions associated with the function.

As illustrated in FIG. 51, the video set 1300 has a module group of a video module 1311, an external memory 1312, a power management module 1313, a front-end module 1314, and the like and a device having related functions of connectivity 1321, a camera 1322, a sensor 1323, and the like.

The module serves as a component with a certain integrated function by integrating some component functions associated with each other. Although a specific physical configuration is optional, for example, the configuration integrated by arranging a plurality of processors having functions, electronic circuit elements such as a resistor and a capacitor, other devices, and the like on a circuit board is possible. In addition, a new module in which the module is combined with other modules or processors is also possible.

In the case of the example of FIG. 51, the video module 1311 is a module in which configurations having functions related to image processing are combined, and has an application processor, a video processor, a broadband modem 1333, and a radio frequency (RF) module 1334.

The processor is a process in which a configuration having a predetermined function is integrated on a semiconductor chip by a system on a chip (SoC), and is also referred to as, for example, system large scale integration (LSI) and the like. The configuration having the predetermined function may be a logic circuit (hardware configuration) or a CPU, a ROM, a RAM, and the like and a program (software configuration) to be executed using the CPU, the ROM, the RAM, and the like. For example, the processor may have the logic circuit, the CPU, the ROM, the RAM, and the like, part of the function may be implemented by the logic circuit (hardware configuration), and the other functions may be implemented by the program (software configuration) to be executed in the CPU.

An application processor 1331 of FIG. 51 is a processor for executing an application related to image processing. The application to be executed in the application processor 1331 can not only perform a calculation process so as to implement a predetermined function, but also control configurations inside and outside the video module 1311, for example, such as a video processor 1332, if necessary.

The video processor 1332 is a processor having a function related to (one or both of) image encoding and decoding.

The broadband modem 1333 is a processor (or module) for performing a process related to wireless or wired (or wired and wireless) broadband communication to be performed via a link of a broadband such as the Internet, a public telephone network, or the like. For example, the broadband modem 1333 converts data (digital signal) to be transmitted into an analog signal by performing digital modulation and the like or converts a received analog signal into data (a digital signal by demodulating the received analog signal. For example, the broadband modem 1333 can perform digital modulation/demodulation on arbitrary information such as image data to be processed by the video processor 1332 or an image data encoded stream, an application program, setting data, and the like.

The RF module 1334 is a module for performing frequency conversion, modulation/demodulation, amplification, and filtering processes and the like on an RF signal to be transmitted and received via an antenna. For example, the RF module 1334 generates an RF signal by performing frequency conversion and the like on a baseband signal generated by the broadband modem 1333. In addition, for example, the RF module 1334 generates a baseband signal by performing frequency conversion and the like on an RF signal received via the front-end module 1314.

Also, as indicated by a dotted line 1341 in FIG. 51, one processor may be configured by integrating the application processor 1331 and the video processor 1332.

The external memory 1312 is a module provided outside the video module 1311 and having a storage device to be used by the video module 1311. Although the storage device of the external memory 1312 may be configured to be implemented by any physical configuration, for example, it is desirable to implement the storage device using a relatively cheap and large-capacity semiconductor memory, for example, such as a dynamic random access memory (DRAM), because the storage device is generally used to store a large volume of data such as image data of frame units in many cases.

The power management module 1313 manages and controls power supply to the video module 1311 (each configuration within the video module 1311).

The front-end module 1314 is a module for providing a front-end function (a circuit of a transmission/reception end of an antenna side) to the RF module 1334. As illustrated in FIG. 51, the front-end module 1314, for example, has an antenna section 1351, a filter 1352, and an amplification section 1353.

The antenna section 1351 has an antenna for transmitting and receiving a radio signal and its peripheral configuration. The antenna section 1351 transmits a signal supplied from the amplification section 1353 as the radio signal and supplies the received radio signal as an electrical signal (RF signal) to the filter 1352. The filter 1352 performs a filtering process and the like on the RF signal received via the antenna section 1351 and supplies the processed RF signal to the RF module 1334. The amplification section 1353 amplifies the RF signal supplied from the RF module 1334 and supplies the amplified RF signal to the antenna section 1351.

The connectivity 1321 is a module having a function related to a connection to the outside. A physical configuration of the connectivity 1321 is optional. For example, the connectivity 1321 has a configuration having a communication function other than a communication standard corresponding to the broadband modem 1333, external input and output ports, and the like.

For example, the connectivity 1321 may be configured to have a module having a communication function based on a wireless communication standard such as Bluetooth (registered trademark), IEEE 802.11 (for example, Wi-Fi (registered trademark)), near field communication (NFC), or infrared data association (IrDA), an antenna for transmitting and receiving a signal based on the standard. In addition, the connectivity 1321 may be configured to have a module with a communication function based on a wired communication standard such as a universal serial bus (USB) or a high-definition multimedia I/F (HDMI) (registered trademark) and a port based on the standard. Further, for example, the connectivity 1321 may be configured to have other data (signal) transmission functions of antenna input and output ports and the like.

Also, the connectivity 1321 may be configured to include a device of a transmission destination of data (signals). For example, the connectivity 1321 may be configured to have a drive (including a hard disk, a solid state drive (SSD), a network attached storage (NAS), and the like as well as a drive of removable media) for reading and writing data from and to a recording medium such as a magnetic disc, an optical disc, an magneto-optical disc, or a semiconductor memory. In addition, the connectivity 1321 may be configured to have an image and sound output device (a monitor, a speaker, and the like).

The camera 1322 is a module having a function of capturing of an image of a subject and obtaining image data of the subject. The image data obtained by the image capturing of the camera 1322, for example, is supplied to the video processor 1332 and encoded.

The sensor 1323, for example, is a module having an arbitrary sensor function such as a sound sensor, an ultrasonic sensor, an optical sensor, an illuminance sensor, an infrared sensor, an image sensor, a rotation sensor, an angle sensor, an angular velocity sensor, a velocity sensor, an acceleration sensor, an inclination sensor, a magnetic identification sensor, an impact sensor, or a temperature sensor. Data detected by the sensor 1323, for example, is supplied to the application processor 1331 and used by an application or the like.

The configuration described above as the module may be implemented as a processor and conversely the configuration described as the processor may be implemented as a module.

In the video set 1300 of the configured as described above, it is possible to apply the present technology to the video processor 1332 as will be described later. Therefore, the video set 1300 can be executed as a set to which the present technology is applied.

[Configuration Example of Video Processor]

Figure 52:
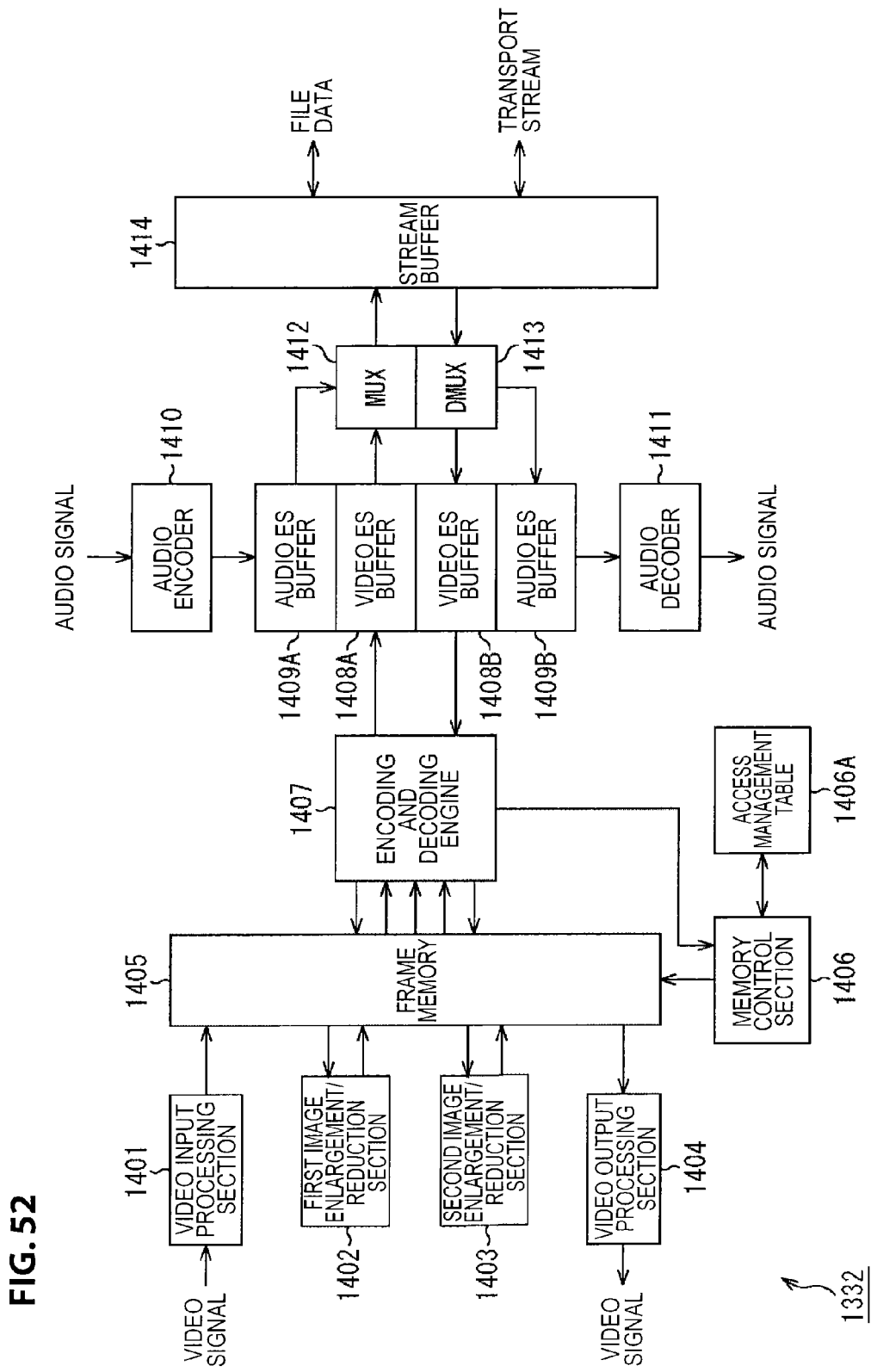
FIG. 52 is a block diagram illustrating an example of a schematic configuration of a video processor.

FIG. 52 illustrates an example of a schematic configuration of the video processor 1332 (FIG. 51) to which the present technology is applied.

In the case of the example of FIG. 52, the video processor 1332 has a function of receiving inputs of a video signal and an audio signal and encoding the inputs of the video signal and the audio signal in a predetermined scheme and a function of decoding encoded audio and video data and reproducing and outputting a video signal and an audio signal.

As illustrated in FIG. 52, the video processor 1332 has a video input processing section 1401, a first image enlargement/reduction section 1402, a second image enlargement/ reduction section 1403, a video output processing section 1404, a frame memory 1405, and a memory control section 1406. In addition, the video processor 1332 has an encoding and decoding engine 1407, video elementary stream (ES) buffers 1408A and 1408B, and audio elementary stream (ES) buffers 1409A and 1409B. Further, the video processor 1332 has an audio encoder 1410, an audio decoder 1411, a multiplexer (MUX) 1412, an inverse multiplexing section (demultiplexer (DMUX)) 1413, and a stream buffer 1414.

The video input processing section 1401, for example, acquires a video signal input from the connectivity 1321 (FIG. 51) and converts the video signal into digital image data. The first image enlargement/reduction section 1402 performs a format conversion process, an image enlargement/reduction process, or the like on image data. The second image enlargement/reduction section 1403 performs the image enlargement/reduction process on the image data according to a format in a destination to which the image data is output via the video output processing section 1404 or perform format conversion, an image enlargement/reduction process or the like, and the like as in the first image enlargement/reduction section 1420. The video output processing section 1404 performs the format conversion, the conversion into an analog signal, or the like on the image data and outputs a conversion result as a reproduced video signal, for example, to the connectivity 1321 (FIG. 51) and the like.

The frame memory 1405 is a memory for image data to be shared by the video input processing section 1401, the first image enlargement/reduction section 1402, the second image enlargement/reduction section 1403, a video output processing section 1404, and an encoding and decoding engine 1407. The frame memory 1405, for example, is implemented as a semiconductor memory such as a DRAM.

The memory control section 1406 receives a synchronization signal from the encoding and decoding engine 1407 and controls access of writing/reading to/from the frame memory 1405 according to an access schedule for the frame memory written to an access management table 1406A. The access management table 1406A is updated by the memory control section 1406 according to a process to be executed by the encoding and decoding engine 1407, the first image enlargement/reduction section 1402, the second image enlargement/reduction section 1403, or the like.

The encoding and decoding engine 1407 performs an image data encoding process and a process of decoding a video stream which is data in which image data is encoded. For example, the encoding and decoding engine 1407 encodes image data read from the frame memory 1405 and sequentially writes the encoded image data as a video stream to the video ES buffer 1408. In addition, for example, a video stream from the video ES buffer 1408B is sequentially read and decoded and the decoded video stream is sequentially written as image data to the frame memory 1405. The encoding and decoding engine 1407 uses the frame memory 1405 as a work area in the encoding or decoding of the image data. In addition, the encoding and decoding engine 1407, for example, outputs a synchronization signal to the memory control section 1406 at the timing at which processing for every macro block starts.

The video ES buffer 1408A buffers a video stream generated by the encoding and decoding engine 1407 and supplies the video stream to the multiplexing section (MUX) 1412. The video ES buffer 1408B buffers a video stream supplied from the inverse multiplexing section (DMUX) 1413 and supplies the video stream to the encoding and decoding engine 1407.

The audio ES buffer 1409A buffers an audio stream generated by an audio encoder 1410 and supplies the audio stream to the multiplexing section (MUX) 1412. The audio ES buffer 1409B buffers an audio stream supplied from the inverse multiplexing section (DMUX) 1413 and supplies the audio stream to the audio decoder 1411.

The audio encoder 1410, for example, digitally converts an audio signal input from the connectivity 1321 (FIG. 51) or the like, and for example, encodes the digitally converted audio signal in a predetermined scheme such as an MPEG audio scheme or an audio code number 3 (AC3) scheme. The audio encoder 1410 sequentially writes an audio data stream which is data in which an audio signal is encoded to the audio ES buffer 1409A. The audio decoder 1411 decodes an audio stream supplied from the audio ES buffer 1409B and supplies the decoded audio stream as a reproduced audio signal, for example, to the connectivity 1321 (FIG. 51) or the like, for example, by performing the conversion into the analog signal or the like.

The multiplexing section (MUX) 1412 multiplexes a video stream and an audio stream. This multiplexing method (that is, a format of the bitstream generated by multiplexing) is optional. In addition, at the time of multiplexing, the multiplexing section (MUX) 1412 can add predetermined header information or the like to the bitstream. That is, the multiplexing section (MUX) 1412 can convert a format of the stream by the multiplexing. For example, the multiplexing section (MUX) 1412 performs conversion into a transport stream which is a bitstream of a transmission format by multiplexing the video stream and the audio stream. In addition, the multiplexing (MUX) 1412 performs conversion into data (file data) of a recording file format by multiplexing the video stream and the audio stream.

The inverse multiplexing section (DMUX) 1413 demultiplexes the bitstream in which the video stream and the audio stream are multiplexed in a method corresponding to multiplexing by the multiplexing section (MUX) 1412. That is, the inverse multiplexing section (DMUX) 1413 extracts the video stream and the audio stream from the bitstream read from the stream buffer 1414 (demultiplexes the video stream and the audio stream). That is, the inverse multiplexing section (DMUX) 1413 can convert the format of the inversely multiplexed stream (inverse conversion to the conversion by the multiplexing section (MUX) 1412). For example, the inverse multiplexing section (DMUX) 1413, for example, acquires a transport stream supplied from the connectivity 1321, the broadband modem 1333, or the like (all in FIG. 51) via the stream buffer 1414 and demultiplexes the acquired transport stream, thereby converting the transport stream into the video stream and the audio stream. In addition, for example, the inverse multiplexing section (DMUX) 1413 can acquire file data read from various types of recording media, for example, by the connectivity 1321 (FIG. 51) via the stream buffer 1414 and inversely multiplex the acquired file data to perform conversion into a video stream and an audio stream.

The stream buffer 1414 buffers the bitstream. For example, the stream buffer 1414 buffers the transport stream supplied from the multiplexing section (MUX) 1412 and supplies the transport stream, for example, to the connectivity 1321, the broadband modem 1333, or the like (all in FIG. 51) at a predetermined timing or based on an external request or the like.

In addition, for example, the stream buffer 1414 buffers file data supplied from the multiplexing section (MUX) 1412 and supplies the buffer file data, for example, to the connectivity 1321 (FIG. 51) or the like, at a predetermined timing or based on an external request or the like to cause various types of recording media to record the file data.

Further, the stream buffer 1414, for example, buffers the transport stream acquired via the connectivity 1321, the broadband modem 1333, or the like (all in FIG. 51) and supplies the transport stream to the inverse multiplexing section (DMUX) 1413 at a predetermined timing or based on an external request or the like.

In addition, the stream buffer 1414, for example, buffers file data read from various types of recording media in the connectivity 1321 (FIG. 51) and the like and supplies the file data to the inverse multiplexing section (DMUX) 1413 at a predetermined timing or based on an external request or the like.

Next, an example of an operation of the video processor 1332 of this configuration will be described. For example, a video signal input to the video processor 1332 from the connectivity 1321 (FIG. 51) or the like is converted into digital image data of a predetermined scheme such as a 4:2:2Y/Cb/Cr scheme in the video input processing section 1401 and the digital image data is sequentially written to the frame memory 1405. This digital image data is read to the first image enlargement/reduction section 1402 or the second image enlargement/reduction section 1403, the format conversion into a predetermined scheme such as a 4:2:0Y/Cb/Cr scheme and the enlargement/reduction process are performed and the image data is written to the frame memory 1405 again. The image data is encoded by the encoding and decoding engine 1407 and the encoded image data is written as a video stream to the video ES buffer 1408A.

In addition, an audio signal input from the connectivity 1321 (FIG. 51) or the like to the video processor 1332 is encoded by the audio encoder 1410 and the encoded audio signal is written as an audio stream to the audio ES buffer 1409A.

The video stream of the video ES buffer 1408A and the audio stream of the audio ES buffer 1409A are read to the multiplexing section (MUX) 1412 and multiplexed to be converted into a transport stream, file data, or the like. After the transport stream generated by the multiplexing section (MUX) 1412 is buffered in the stream buffer 1414, for example, the transport stream is output to an external network via (any one (FIG. 51) of) the connectivity 1321, the broadband modem 1333, and the like. In addition, after the file data generated by the multiplexing section (MUX) 1412 is buffered in the stream buffer 1414, for example, the file data is output to the connectivity 1321 (FIG. 51) and the like and recorded to various types of recording media.

In addition, for example, after the transport stream input from the external network to the video processor 1332 via (any one (FIG. 51) of) the connectivity 1321, the broadband modem 1333, and the like is buffered in the stream buffer 1414, the transport stream is inversely multiplexed by the inverse multiplexing section (DMUX) 1413. In addition, for example, after file data read from various types of recording media in the connectivity 1321 (FIG. 51) and the like and input to the video processor 1332 is buffered in the stream buffer 1414, the file data is inversely multiplexed by the inverse multiplexing section (DMUX) 1413. That is, the transport stream or the file data input to the video processor 1332 is demultiplexed into a video stream and an audio stream by the inverse multiplexing section (DMUX) 1413.

An audio signal is reproduced by supplying the audio stream to the audio decoder 1411 via the audio ES buffer 1409B and decoding the audio stream. In addition, after the video stream is written to the video ES buffer 1408B, the video stream is sequentially read and decoded by the encoding and decoding engine 1407 and written to the frame memory 1405. The second image enlargement/reduction section 1403 performs the decoded image data on the enlargement/reduction process and the processed data is written to the frame memory 1405. Then, a video signal is reproduced and output by reading the decoded image data to the video output processing section 1404, converting the format of the decoded image data in a predetermined scheme such as 4:2:2Y/Cb/Cr scheme, and further converting the decoded image data into an analog signal.

When the present technology is applied to the video processor 1332 configured as described above, it is only necessary to apply the present technology according to each embodiment described above to the encoding and decoding engine 1407. That is, for example, it is only necessary to configure the encoding and decoding engine 1407 having functions of the multi-view image encoding device 11 (FIG. 1) according to the first embodiment and the multi-view image decoding device 211 (FIG. 10) according to the second embodiment. As described above, the video processor 1332 can obtain effects similar to those described above with reference to FIGS. 1 to 36.

Also, in the encoding and decoding engine 1407, the present technology (that is, the functions of the image encoding device and the image decoding device according to the embodiments described above) may be implemented by hardware such as a logic circuit, implemented by software such as an embedded program, or implemented by both thereof.

[Other Configuration Example of Video Processor]

Figure 53:
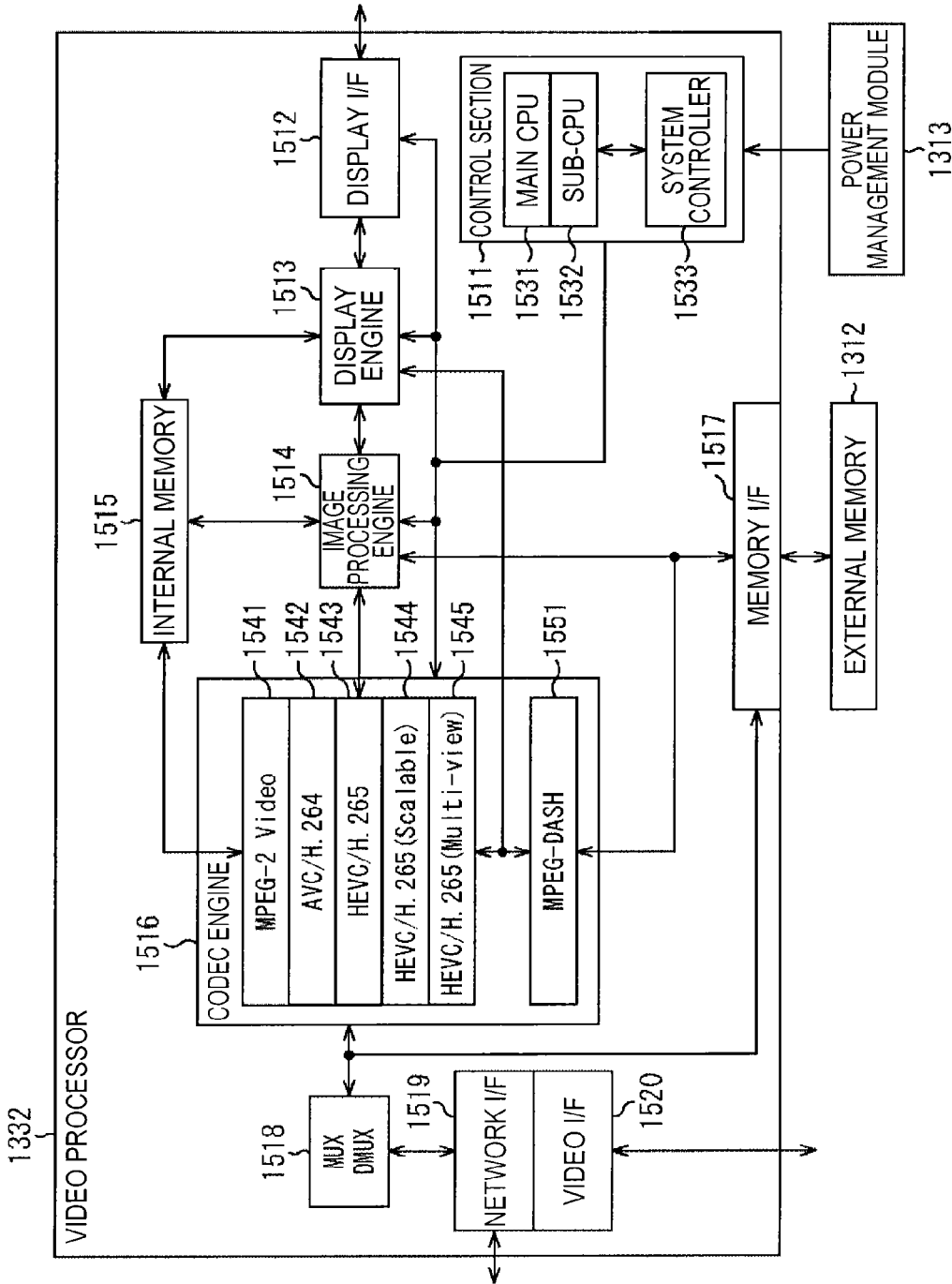
FIG. 53 is a block diagram illustrating another example of the schematic configuration of the video processor.

FIG. 53 illustrates another example of a schematic configuration of the video processor 1332 (FIG. 51) to which the present technology is applied. In the case of the example of FIG. 53, the video processor 1332 has a function of encoding and decoding video data in a predetermined scheme.

More specifically, as illustrated in FIG. 53, the video processor 1332 has a control section 1511, a display I/F 1512, a display engine 1513, an image processing engine 1514, and an internal memory 1515. In addition, the video processor 1332 has a codec engine 1516, a memory I/F 1517, a multiplexing/inverse multiplexing section (MUX/DMUX) 1518, a network I/F 1519, and a video I/F 1520.

The control section 1511 controls operations of processing sections within the video processor 1332 such as the display I/F 1512, the display engine 1513, the image processing engine 1514, the codec engine 1516, and the like.

As illustrated in FIG. 53, the control section 1511, for example, has a main CPU 1531, a sub-CPU 1532, and a system controller 1533. The main CPU 1531 executes a program for controlling the operations of the processing sections within the video processor 1332. The main CPU 1531 generates a control signal according to the program or the like and supplies the control signal to each processing section (that is, controls the operation of each processing section). The sub-CPU 1532 plays an auxiliary role of the main CPU 1531. For example, the sub-CPU 1532 executes a child process, a sub-routine, or the like of a program or the like to be executed by the main CPU 1531. The system controller 1533 controls operations of the main CPU 1531 and the sub-CPU 1532 such as designations of programs to be executed by the main CPU 153 and the sub CPU 1532.

The display I/F 1512 outputs image data, for example, to the connectivity 1321 (FIG. 51) and the like, under control of the control section 1511. For example, the display I/F 1512 converts image data of digital data into an analog signal and outputs the analog signal as the reproduced video signal, or the image data of the digital data without change, to the monitor device or the like of the connectivity 1321 (FIG. 51).

The display engine 1513 performs various types of conversion processes such as format conversion, size conversion, and color gamut conversion so that image data is suitable for hardware specs of a monitor device and the like for displaying its image under control of the control section 1511.

The image processing engine 1514 performs predetermined image processing, for example, such as filtering processing for improving image quality, on the image data under control of the control section 1511.

The internal memory 1515 is shared by the display engine 1513, the image processing engine 1514, and the codec engine 1516, and is a memory provided inside the video processor 1332. The internal memory 1515, for example, is used for data exchange to be performed among the display engine 1513, the image processing engine 1514, and the codec engine 1516. For example, the internal memory 1515 stores data to be supplied from the display engine 1513, the image processing engine 1514, or the codec engine 1516 and supplies the data to the display engine 1513, the image processing engine 1514, or the codec engine 1516, if necessary (for example, according to a request). Although the internal memory 1515 may be implemented by any storage device, it is desirable to implement the internal memory 1515 by a semiconductor memory having a relatively small capacity and high response speed (as compared to those of the external memory 1312), for example, such as a static random access memory (SRAM), because a small volume of data such as image data of a block unit or parameters are generally used in many cases.

The codec engine 1516 performs a process related to encoding and decoding of image data. An encoding and decoding scheme corresponding to this codec engine 1516 is optional and the number of encoding and decoding schemes may be one or more. For example, the codec engine 1516 may have a codec function of a plurality of encoding and decoding schemes, and the encoding of image data or the decoding of encoded data may be performed in one selected from among the encoding and decoding schemes.

In the example illustrated in FIG. 53, the codec engine 1516, for example, has an MPEG-2 video 1541, an AVC/H.264 1542, an HEVC/H.265 1543, an HEVC/H.265 (scalable) 1544, an HEVC/H.265 (multi-view) 1545, and an MPEG-DASH 1551 as functional blocks for processing related to a codec.

The MPEG-2 video 1541 is a functional block for encoding or decoding image data in an MPEG-2 scheme. The AVC/H.264 1542 is a functional block for encoding or decoding image data in an AVC scheme. The HEVC/H.265 1543 is a functional block for encoding or decoding image data in an HEVC scheme. The HEVC/H.265 (scalable) 1544 is a functional block for performing scalable video coding or scalable video decoding on image data in the HEVC scheme. The HEVC/H.265 (multi-view) 1545 is a functional block for performing multi-view encoding or multi-view decoding on image data in the HEVC scheme.

The MPEG-DASH 1551 is a functional block for transmitting and receiving image data in an MPEG-DASH scheme. The MPEG-DASH is technology for performing video streaming using an HTTP and has one feature that appropriate encoded data is selected from a plurality of pieces of encoded data in which prepared resolutions and the like are different from each other in units of segments and the selected encoded data is transmitted. The MPEG-DASH 1551 performs generation of a stream based on a standard, transmission control of the stream, and the like and uses the MPEG-2 video 1541 to the HEVC/H.265 (multi-view) 1545 described above for encoding and decoding of the image data.

The memory I/F 1517 is an I/F for the external memory 1312. Data supplied from the image processing engine 1514 or the codec engine 1516 is supplied to the external memory 1312 via the memory I/F 1517. In addition, data read from the external memory 1312 is supplied to the video processor 1332 (the image processing engine 1514 or the codec engine 1516) via the memory I/F 1517.

The multiplexing/inverse multiplexing section (MUX/DMUX) 1518 performs multiplexing or demultiplexing of various types of data related to an image such as an encoded data bitstream, image data, and a video signal. A method of this multiplexing/demultiplexing is optional. For example, at the time of multiplexing, the multiplexing/inverse multiplexing section (MUX/DMUX) 1518 can not only integrate a plurality of piece data into one piece, but also add predetermined header information or the like to the data. In addition, at the time of inverse multiplexing, the multiplexing/inverse multiplexing section (MUX/DMUX) 1518 can not only divide one piece of data into a plurality of pieces of data, but also add predetermined header information or the like to each data division. That is, the multiplexing/inverse multiplexing section (MUX/DMUX) 1518 can convert a format of data by the multiplexing/demultiplexing. The multiplexing/inverse multiplexing section (MUX/DMUX) 1518 can perform conversion into a transport stream, which is a bitstream of a transmission format, or data (file data) of a recording file format by multiplexing the bitstream. Of course, inverse conversion thereof by the demultiplexing is also possible The network I/F 1519, for example, is an I/F for the broadband modem 1333 or the connectivity 1321 (both in FIG. 51) or the like. The video I/F 1520, for example, is an I/F for the connectivity 1321 or the camera 1322 (both in FIG. 51) or the like.

Next, an example of an operation of this video processor 1332 will be described. For example, when a transport stream is received from the external network via the connectivity 1321 or the broadband modem 1333 (both in FIG. 51) or the like, the transport stream is supplied to the multiplexing/inverse multiplexing section (MUX/DMUX) 1518 via the network I/F 1519 and inversely multiplexed, and the transport stream is decoded by the codec engine 1516. For example, the image processing engine 1514 performs predetermined image processing on image data obtained by the decoding of the codec engine 1516, the display engine 1513 performs predetermined conversion on the processed image data, the converted image data, for example, is supplied to the connectivity 1321 (FIG. 51) or the like via the display I/F 1512, and its image is displayed on a monitor. In addition, for example, the codec engine 1516 re-encodes image data obtained by the decoding of the codec engine 1516, the multiplexing/inverse multiplexing section (MUX/DMUX) 1518 multiplexes the re-encoded image data to perform conversion into file data, the file data is output, for example, to the connectivity 1321 (FIG. 51) or the like, via the video I/F 1520, and the output file data is recorded to various types of recording media.

Further, for example, the file data of the encoded data in which image data is encoded read by the connectivity 1321 (FIG. 51) or the like from a recording medium (not illustrated) is supplied to the multiplexing/inverse multiplexing section (MUX/DMUX) 1518 via the video I/F 1520 and inversely multiplexed, and decoded by the codec engine 1516. The image processing engine 1514 performs predetermined image processing on image data obtained by the decoding of the codec engine 1516, the display engine 1513 performs predetermined conversion on the processed image data, the converted image data, for example, is supplied to the connectivity 1321 (FIG. 51) or the like via the display I/F 1512, and its image is displayed on a monitor. In addition, for example, the codec engine 1516 re-encodes image data obtained by the decoding of the codec engine 1516, the multiplexing/inverse multiplexing section (MUX/DMUX) 1518 multiplexes the re-encoded image data to perform conversion into a transport stream, the transport stream is supplied, for example, to the connectivity 1321 or the broadband modem 1333 (both in FIG. 51) or the like, via the network I/F 1519 and transmitted to another device (not illustrated).

Also, the exchange of image data between processing sections within the video processor 1332 or other data, for example, is performed using the internal memory 1515 or the external memory 1312. In addition, the power management module 1313, for example, controls power supply to the control section 1511.

When the present technology is applied to the video processor 1332 configured as described above, it is only necessary to apply the present technology according to each embodiment described above to the codec engine 1516. That is, for example, it is only necessary to configure the codec engine 1516 having functional blocks that achieve the multi-view image encoding device 11 (FIG. 1) according to the first embodiment and the multi-view image decoding device 211 (FIG. 10) according to the second embodiment. As described above, the video processor 1332 can obtain effects similar to those described above with reference to FIGS. 1 to 36.

Also, in the codec engine 1516, the present technology (that is, the functions of the image encoding device and the image decoding device according to the embodiments described above) may be implemented by hardware such as a logic circuit, implemented by software such as an embedded program, or implemented by both thereof.

Although two examples of the configuration of the video processor 1332 have been shown above, the configuration of the video processor 1332 is optional and may be different from the above-described two examples. In addition, although the video processor 1332 is configured as one semiconductor chip, the video processor 1332 may be configured as a plurality of semiconductor chips. For example, the video processor 1332 may be configured to be three-dimensional stacked LSI in which a plurality of semiconductors are stacked. In addition, the video processor 1332 may be configured to be implemented by a plurality of pieces of LSI.

[Application Example for Device]

The video set 1300 can be embedded in various types of devices for processing image data. For example, the video set 1300 can be embedded in the television device 900 (FIG. 44), the mobile phone 920 (FIG. 45), the recording/reproduction device 940 (FIG. 46), the image capturing device 960 (FIG. 47), or the like. By embedding the video set 1300, its device can obtain effects similar to those described above with reference to FIGS. 1 to 36.

In addition, the video set 1300, for example, can also be embedded in a terminal device such as the PC 1004, the AV device 1005, the tablet device 1006, or the mobile phone 1007 in the data transmission system 1000 of FIG. 48, the broadcasting station 1101 and the terminal device 1102 in the data transmission system 1100 of FIG. 49, the image capturing device 1201 and the scalable coded data storage device 1202 in the image capturing system 1200 of FIG. 50, and the like. By embedding the video set 1300, the device can obtain effects similar to those described above with reference to FIGS. 1 to 36. Further, the video set 1300 can be embedded in each device of the content reproduction system of FIG. 54 or the wireless communication system of FIG. 60.

Also, if part of each configuration of the above-described video set 1300 includes the video processor 1332, the part may be executed as a configuration to which the present technology is applied. For example, only the video processor 1332 can be executed as the video processor to which the present technology is applied. In addition, for example, the processor indicated by the dotted line 1341 as described above, the video module 1311, and the like can be executed as the processor, the module, or the like to which the present technology is applied. Further, for example, the video module 1311, the external memory 1312, the power management module 1313, and the front-end module 1314 can be combined and executed as a video unit 1361 to which the present technology is applied. Any configuration can obtain effects similar to those described above with reference to FIGS. 1 to 36.

That is, any configuration including the video processor 1332 can be embedded in various types of devices for processing image data as in the video set 1300. For example, the video processor 1332, the processor indicated by the dotted line 1341, the video module 1311, or the video unit 1361 can be embedded in the television device 900 (FIG. 44), the mobile phone 920 (FIG. 45), the recording/reproduction device 940 (FIG. 46), the image capturing device 960 (FIG. 47), the terminal device such as the PC 1004, the AV device 1005, the tablet device 1006, or the mobile phone 1007 in the data transmission system 1000 of FIG. 48, the broadcasting station 1101 and the terminal device 1102 in the data transmission system 1100 of FIG. 49, the image capturing device 1201 and the scalable coded data storage device 1202 in the image capturing system 1200 of FIG. 50, and the like. Further, the video processor 1332 can be embedded in each device of the content reproduction system of FIG. 54 or the wireless communication system of FIG. 60. By embedding any configuration to which the present technology is applied, its device can obtain effects similar to those described above with reference to FIGS. 1 to 36 as in the case of the video set 1300.

Also, the present technology is applicable, for example, to a content reproduction system of HTTP streaming or a wireless communication system of a Wi-Fi standard such as MPEG DASH to be described later for selecting and using appropriate encoded data from a plurality of pieces of encoded data in which prepared resolutions and the like are different from each other in units of segments.

14. Application Example of MPEG-DASH

Outline of Content Reproduction System

Figure 54:
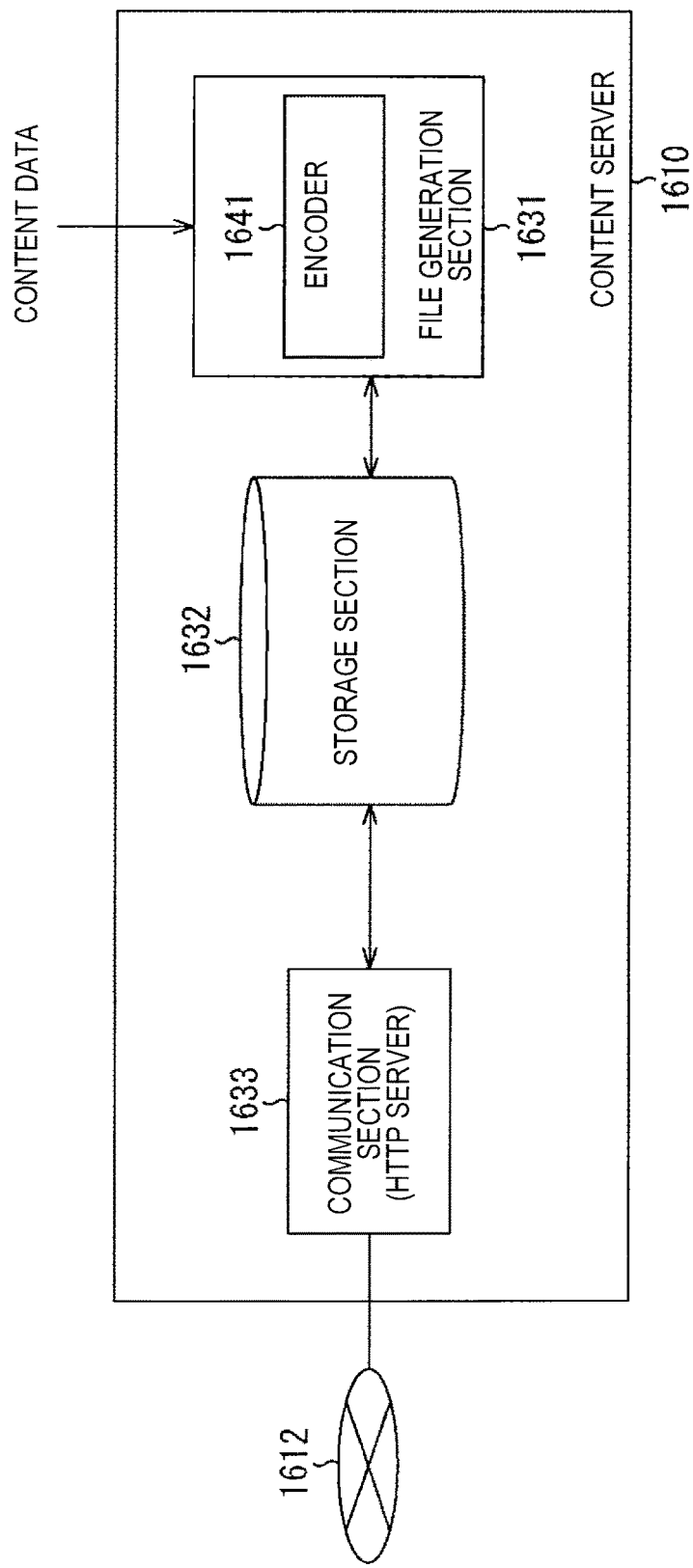
FIG. 54 is an explanatory diagram illustrating a configuration of a content reproduction system.
Figure 55:
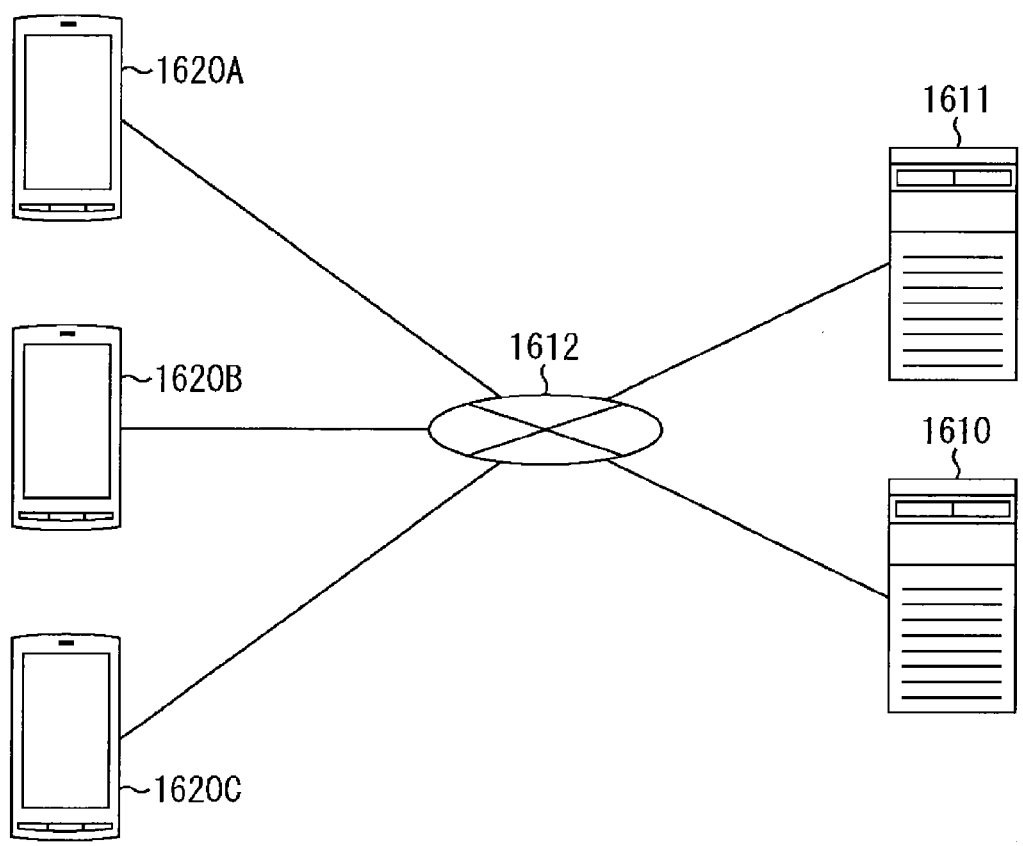
FIG. 55 is an explanatory diagram illustrating a flow of data in the content reproduction system.
Figure 56:
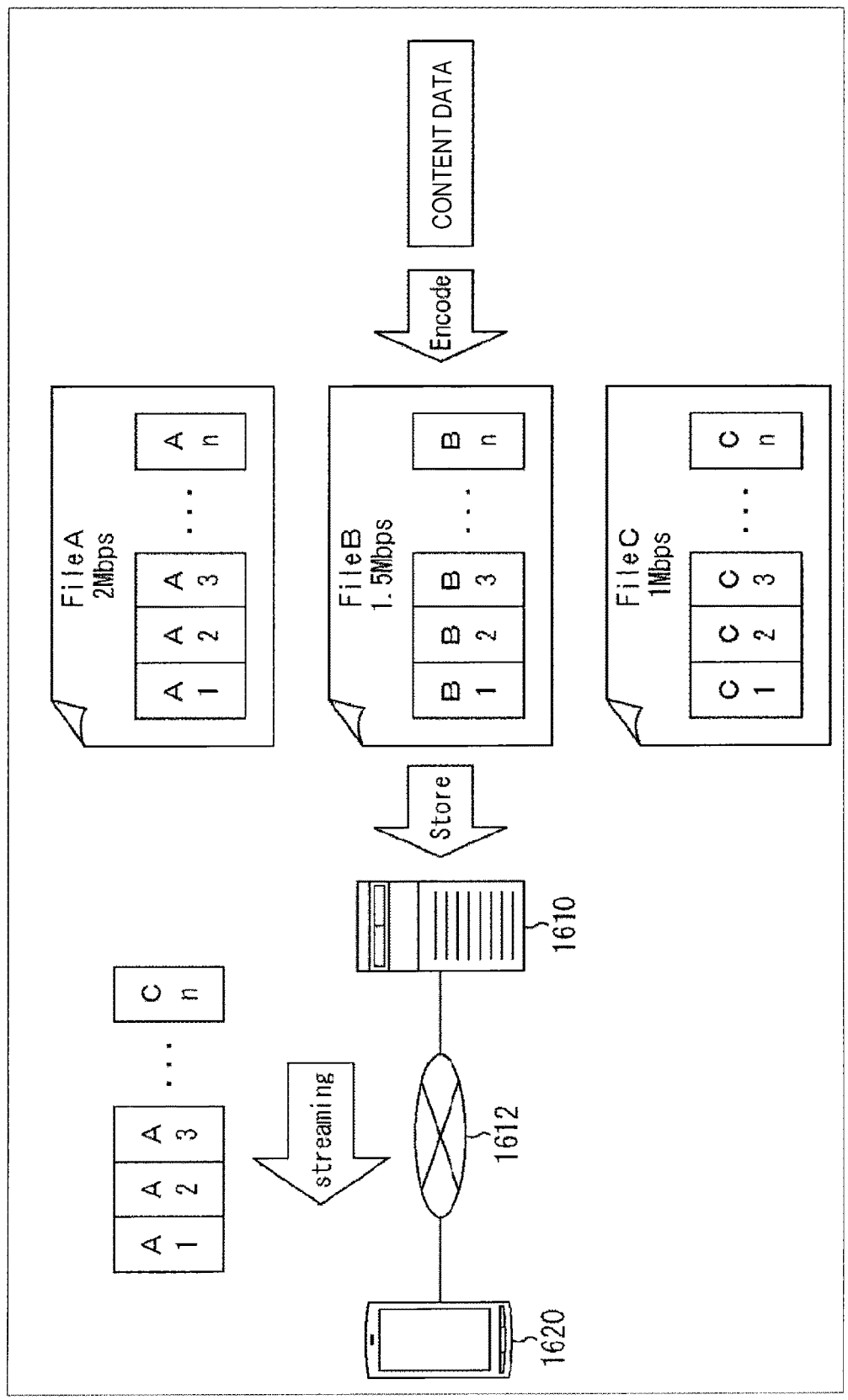
FIG. 56 is an explanatory diagram illustrating a specific example of media presentation description (MPD).

First, with reference to FIGS. 54 to 56, the content reproduction system to which the present technology is applicable will be schematically described.

Hereinafter, first, a basic configuration common in these embodiments will be described with reference to FIGS. 54 and 55.

FIG. 54 is an explanatory diagram illustrating a configuration of a content reproduction system. As illustrated in FIG. 54, the content reproduction system includes content servers 1610 and 1611, a network 1612, and a content reproduction device 1620 (client device).

The content servers 1610 and 1611 and the content reproduction device 1620 are connected via the network 1612. The network 1612 is a wired or wireless transmission path of information to be transmitted from a device connected to the network 1612.

For example, the network 1612 may include public line networks such as the Internet, a telephone line network, and a satellite communication network or various types of local area networks (LANs), wide area networks (WANs), and the like including Ethernet (registered trademark). In addition, the network 1612 may include a dedicated line network such as an Internet protocol-virtual private network (IP-VPN).

The content server 1610 encodes content data and generates and stores a data file including the encoded data and meta information of the encoded data. Also, when the content server 1610 generates a data file of an MP4 format, the encoded data corresponds to "mdat" and the meta information corresponds to "moov."

In addition, the content data may music data such as music, lectures, and a radio programs, video data such as movies, television programs, video programs, photographs, documents, paintings, and charts, games, software, and the like.

Here, for a reproduction request of content from the content reproduction device 1620, the content server 1610 generates a plurality of data files at different bit rates in relation to the same content. In addition, for a reproduction request of content from the content reproduction device 1620, the content server 1611 transmits information of a uniform resource locator (URL) of the content server 1610 to the content reproduction device 1620 by including parameter information added to the URL in the content reproduction device 1620 in the URL information of the content server 1610. Hereinafter, with reference to FIG. 55, relevant items will be specifically described.

FIG. 55 is an explanatory diagram illustrating a flow of data in the content reproduction system of FIG. 54. The content server 1610 encodes the same content data at different bit rates and generates, for example, a file A of 2 Mbps, a file B of 1.5 Mbps, and a file C of 1 Mbps as illustrated in FIG. 55. Relatively, the file A has a high bit rate, the file B has a standard bit rate, and the file C has a low bit rate.

In addition, as illustrated in FIG. 55, encoded data of each file is divided into a plurality of segments. For example, the encoded data of the file A is divided into segments "A1," "A2," "A3," . . . "An," the encoded data of the file B is divided into segments "B1," "B2," "B3," . . . "Bn," and the encoded data of the file C is divided into segments "C1," "C2," "C3," . . . "Cn."

Also, each segment may include a configuration sample from one or more pieces of independently reproducible video encoded data and audio encoded data which begins with a sync sample of MP4 (for example, an instantaneous decoder refresh (IDR)-picture in video encoding of AVC/H.264). For example, when video data of 30 frames per sec is encoded in a GOP of a fixed length of 15 frames, each segment may be video and audio encoded data of 2 sec corresponding to 4 GOPs or video and audio encoded data of 10 sec corresponding to 20 GOPs.

In addition, reproduction ranges (ranges of time positions from the beginning of content) by segments having the same placement order in each file are the same. For example, when reproduction ranges of the segment "A2," the segment "B2," and the segment "C2" are the same and each segment is encoded data of 2 sec, all reproduction ranges of the segment "A2," the segment "B2," and the segment "C2" are 2 to 4 sec of content.

When the files A to C configured from the above-described plurality of segments are generated, the content server 1610 stores the files A to C. Then, as illustrated in FIG. 55, the content server 1610 sequentially transmits segments constituting different files to the content reproduction device 1620, and the content reproduction device 1620 reproduces the received segments according to streaming reproduction.

Here, the content server 1610 according to this embodiment transmits a play list file (hereinafter referred to as MPD) including bit rate information and access information of encoded data to the content reproduction device 1620, and the content reproduction device 1620 selects any one bit rate of a plurality of bit rates based on the MPD and requests the content server 1610 to transmit segments corresponding to the selected bit rate.

Although only one content server 161 is illustrated in FIG. 54, it is needless to say that the present disclosure is not limited to the relevant example.

FIG. 56 is an explanatory diagram illustrating a specific example of the MPD. As illustrated in FIG. 56, the MPD includes access information related to a plurality of pieces of encoded having different bit rates (bandwidths). For example, the MPD illustrated in FIG. 56 indicates that there are encoded data of 256 Kbps, 1.024 Mbps, 1.384 Mbps, 1.536 Mbps, and 2.048 Mbps, and includes access information related to encoded data. The content reproduction device 1620 can dynamically change the bit rate of encoded data to be reproduced according to streaming reproduction based on this MPD.

Also, although a portable terminal is illustrated as an example of the content reproduction device 1620 in FIG. 54, the content reproduction device 1620 is not limited to this example. For example, the content reproduction device 1620 may be an information processing device such as a PC, a home video processing device (a digital versatile disc (DVD) recorder, a video cassette recorder, or the like), personal digital assistants (PDA), a home game device, or a home appliance device. In addition, the content reproduction device 1620 may be an information processing device such as a mobile phone, a personal handy-phone system (PHS), a portable music reproduction device, a portable video processing device, or a portable game device.

[Configuration of Content Server]

With reference to FIGS. 54 to 56, the outline of the content reproduction system has been described. Next, with reference to FIG. 57, the configuration of the content server 1610 will be described.

FIG. 57 is a functional block diagram illustrating the configuration of the content server 1610. As illustrated in FIG. 57, the content server 1610 includes a file generation section 1631, a storage section 1632, and a communication section 1633.

The file generation section 1631 includes an encoder 1641 for encoding content data, and generates a plurality of pieces of encoded having different bit rates in the same content and the above-described MPD. For example, the file generation section 1631 generates the MPD as illustrated in FIG. 56 when encoded data of 256 Kbps, 1.024 Mbps, 1.384 Mbps, 1.536 Mbps, and 2.048 Mbps is generated.

The storage section 1632 stores a plurality of pieces of encoded data having different bit rates and the MPD generated by the file generation section 1631. The storage section 1632 may be a storage medium such as a non-volatile memory, a magnetic disk, an optical disk, an magneto optical (MO) disk, or the like. As the non-volatile memory, for example, an electrically erasable programmable read-only memory (EEPROM) and an erasable programmable ROM (EPROM) may be cited. Also, as the magnetic disk, a hard disk, a discoid magnetic disk, and the like may be cited. Further, as the optical disk, a compact disc (CD), a DVD-recordable (DVD-R), a Blu-ray disc (BD) (registered trademark)), and the like may be cited.

The communication section 1633 is an I/F with the content reproduction device 1620, and communicates with the content reproduction device 1620 via the network 1612. In further detail, the communication section 1633 has a function serving as an HTTP server which communicates with the content reproduction device 1620 according to an HTTP. For example, the communication section 1633 transmits an MPD to the content reproduction device 1620, extracts encoded data requested based on the MPD from the content reproduction device 1620 according to the HTTP, and transmits the encoded data to the content reproduction device 1620 as an HTTP response.

[Configuration of Content Reproduction Device]

The configuration of the content server 1610 according to this embodiment has been described above. Next, with reference to FIG. 58, the configuration of the content reproduction device 1620 will be described.

Figure 58:
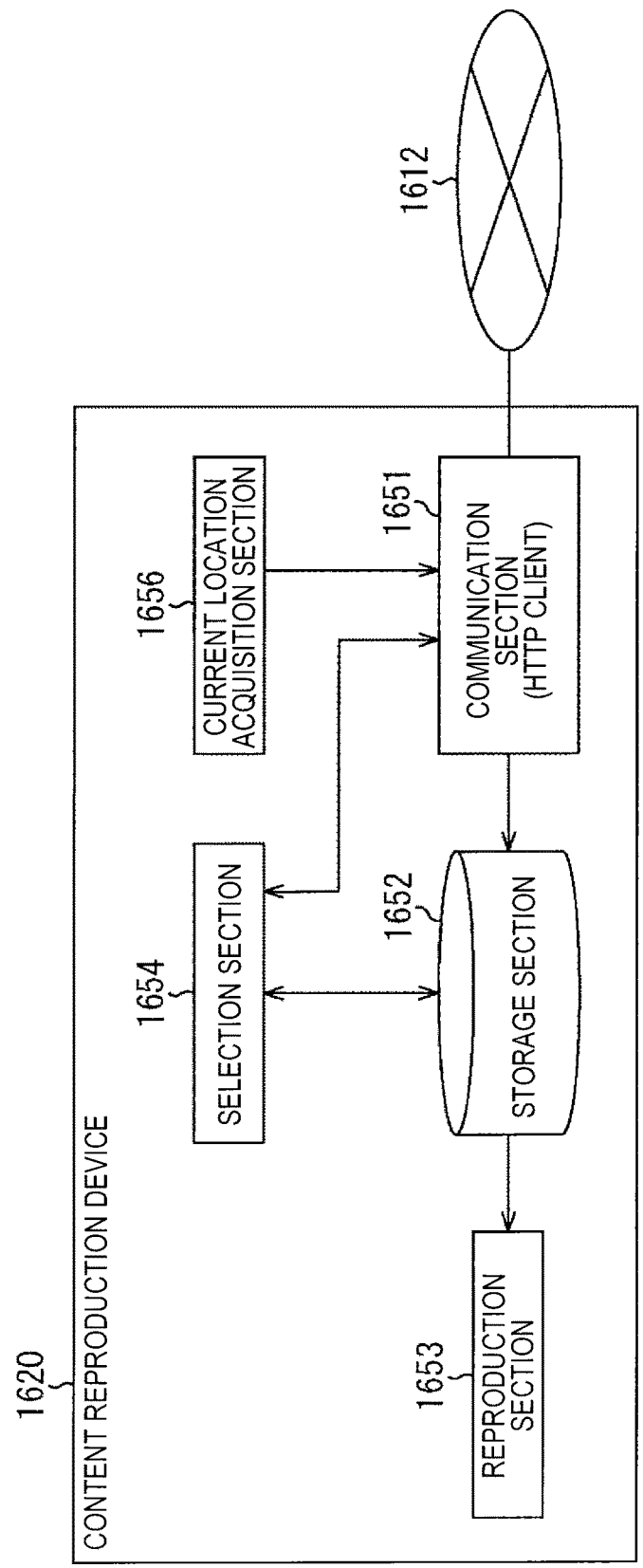
FIG. 58 is a functional block diagram illustrating a configuration of a content reproduction device of the content reproduction system.

FIG. 58 is a functional block diagram illustrating the configuration of the content reproduction device 1620. As illustrated in FIG. 58, the content reproduction device 1620 includes a communication section 1651, a storage section 1652, a reproduction section 1653, a selection section 1654, and a current location acquisition section 1656.

The communication section 1651 is an I/F with the content server 1610, requests the content server 1610 to provide data, and acquires data from the content server 1610. In further detail, the communication section 1651 has a function serving as an HTTP client for communicating with the content reproduction device 1620 according to the HTTP. For example, the communication section 1651 can selectively acquire an MPD or segments of encoded data from the content server 1610 by employing an HTTP range.

The storage section 1652 stores various types of information related to reproduction of content. For example, the storage section 1652 sequentially buffers segments acquired by the communication section 1651 from the content server 1610. The segments of the encoded data buffered in the storage section 1652 are sequentially supplied to the reproduction section 1653 in first in first output (FIFO).

In addition, the storage section 1652 stores a definition for accessing a URL to which the communication section 1651 adds a parameter based on an addition instruction of the parameter for the URL of the content described in the MPD requested from the content sever 1611 to be described later.

The reproduction section 1653 sequentially reproduces segments supplied from the storage section 1652. Specifically, the reproduction section 1653 performs decoding, D/A conversion, and rendering on the segments.

The selection section 1654 sequentially selects whether to sequentially acquire segments of the encoded data corresponding to a bit rate included in the MPD to be acquired within the same content. For example, when the selection section 1654 sequentially selects segments "A1," "B2," and "A3" according to a band of the network 1612, the communication section 1651 sequentially acquires the segments "A1," "B2," and "A3" from the content server 1610 as illustrated in FIG. 55.

The current location acquisition section 1656 may be a section for acquiring a current location of the content reproduction device 1620, and, for example, may be constituted of a module for acquiring a current location of a global positioning system (GPS) receiver or the like. In addition, the current location acquisition section 1656 may be a section for acquiring a current location of the content reproduction device 1620 using a wireless network.

[Configuration of Content Server]

Figure 59:
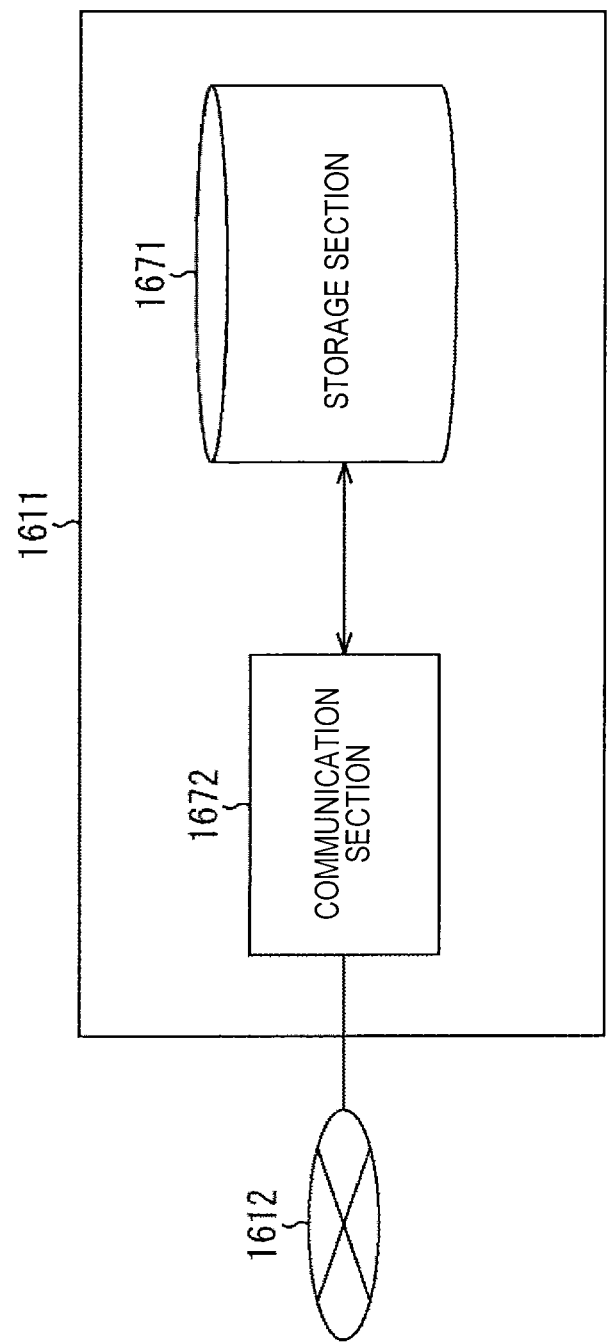
FIG. 59 is a functional block diagram illustrating the configuration of the content server of the content reproduction system.

FIG. 59 is an explanatory diagram illustrating a configuration example of the content server 1611. As illustrated in FIG. 59, the content server 1611 includes a storage section 1671 and a communication section 1672.

The storage section 1671 stores information of a URL of an MPD. The information of the URL of the MPD is transmitted from the content server 1611 to the content reproduction device 1620 according to a request from the content reproduction device 1620 for requesting reproduction of content. In addition, when the information of the URL of the MPD for the content reproduction device 1620 is provided, the storage section 1671 stores definition information when the content reproduction device 1620 adds a parameter to the URL written in the MPD.

The communication section 1672 is an I/F with the content reproduction device 1620, and communicates with the content reproduction device 1620 via the network 1612. That is, the communication section 1672 receives a request of information of a URL of the MPD from the content reproduction device 1620 for requesting the reproduction of the content and transmits the information of the URL of the MPD to the content reproduction device 1620. The URL of the MPD to be transmitted from the communication section 1672 includes information for adding a parameter in the content reproduction device 1620.

For the parameter to be added to the URL of the MPD in the content reproduction device 1620, it is possible to set various parameters in definition information to be shared by the content server 1611 and the content reproduction device 1620. For example, information of a current location of the content reproduction device 1620, a user ID of a user using the content reproduction device 1620, a memory size of the content reproduction device 1620, a capacity of a storage of the content reproduction device 1620, and the like can be added to the URL of the MPD in the content reproduction device 1620.

In the content reproduction system of the above-described configuration, it is possible to obtain effects similar to those described above with reference to FIGS. 1 to 36 by applying the present technology as described above with reference to FIGS. 1 to 36.

That is, the encoder 1641 of the content server 1610 has a function of the image encoding device 11 (FIG. 1) according to the above-described embodiment. In addition, the reproduction section 1653 of the content reproduction device 1620 has a function of the image decoding device 211 (FIG. 10) according to the above-described embodiment. Thereby, it is possible to perform parallel processing of a base view image and a dependent image on the encoding side or the decoding side.

In addition, because it is possible to limit the V direction of the inter-view MV by transmitting and receiving encoded data according to the present technology in the content reproduction system, it is possible to perform parallel processing of a base view image and a dependent image on the encoding side or the decoding side.

15. Application Example of Wireless Communication System of Wi-Fi Standard

Basic Operation Example of Wireless Communication Device

A basic operation example of a wireless communication device in the wireless communication system to which the present technology is applicable will be described.

Initially, radio packet transmission and reception until a specific application is operated by setting up a peer to peer (P2P) connection are done.

Next, before a connection in a second layer is made, radio packet transmission and reception until the P2P connection is set up and the specific application is operated after the specific application is designated are done. Thereafter, after the connection in the second layer, radio packet transmission and reception when the specific application is activated are done.

[Communication Example when Specific Application Operation Starts]

Figure 60:
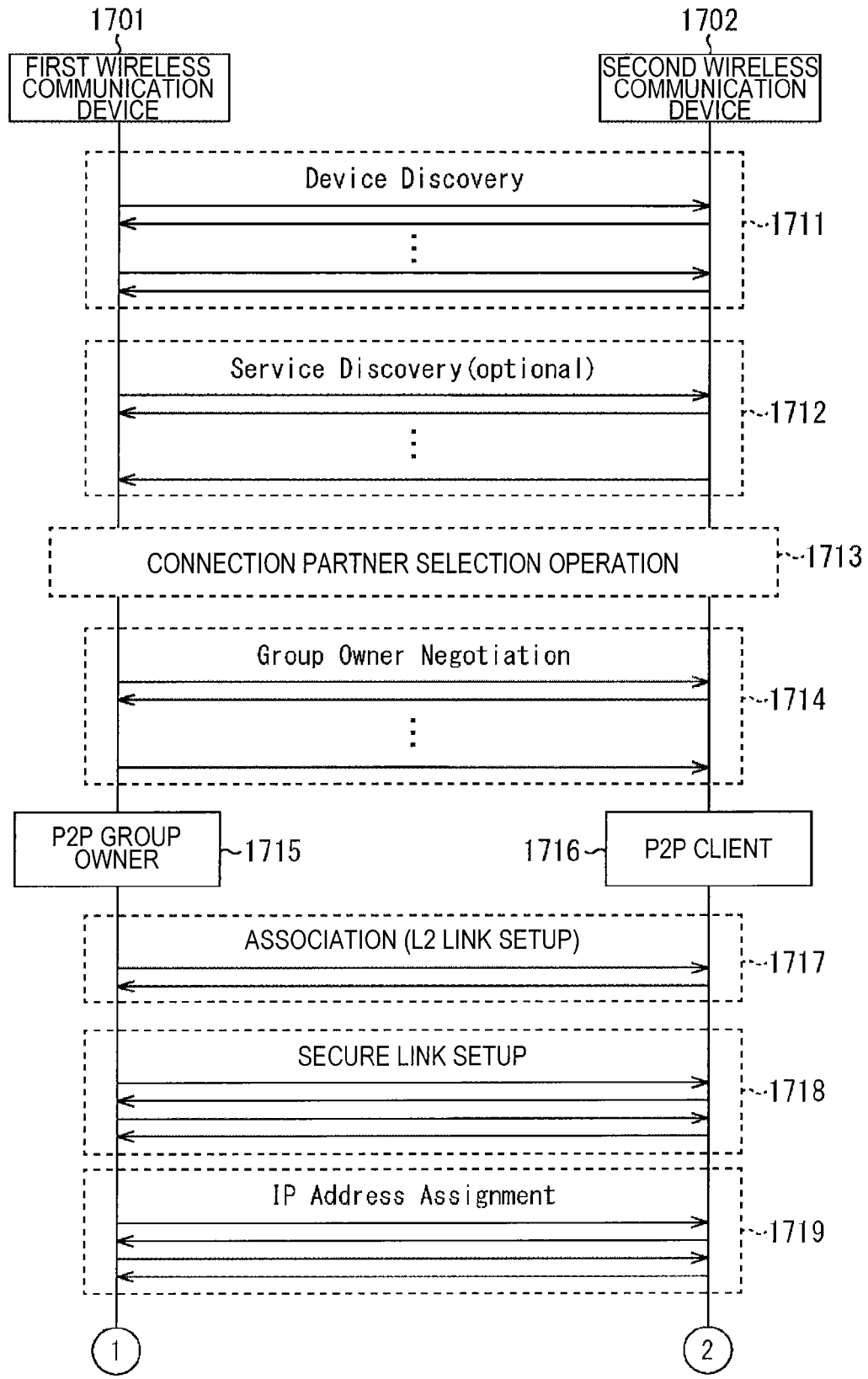
FIG. 60 is a sequence chart illustrating a communication process example by each device of a wireless communication system.
Figure 61:
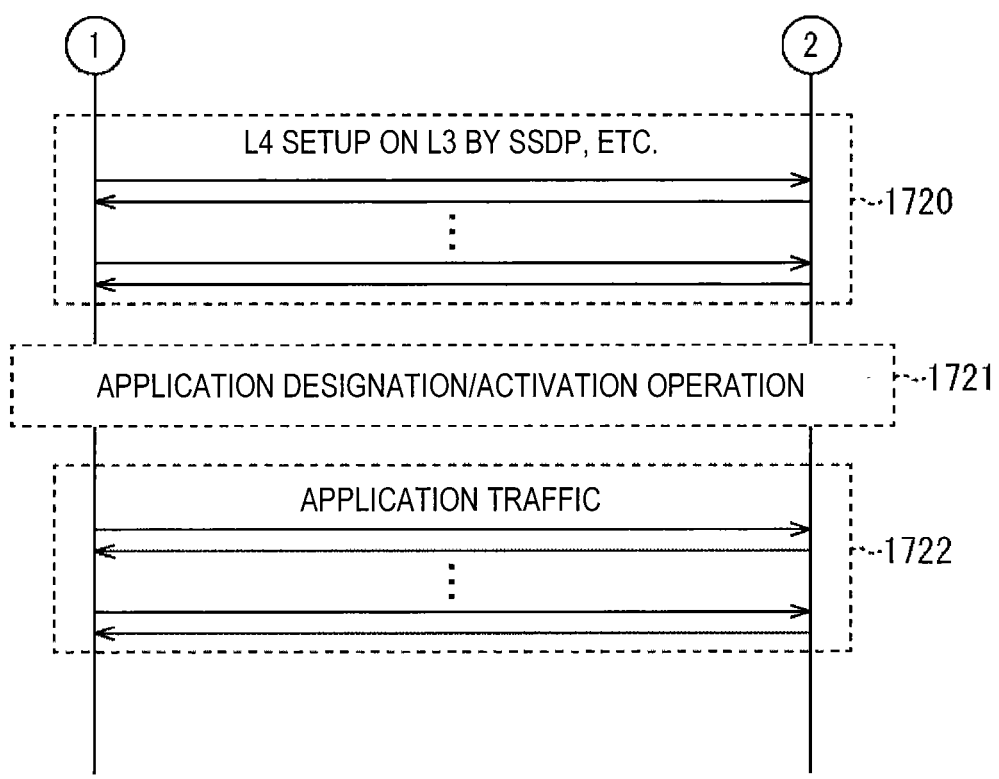
FIG. 61 is a sequence chart illustrating a communication process example by each device of a wireless communication system.

FIGS. 60 and 61 are examples of radio packet transmission and reception until a specific application is operated by setting up the above-described P2P connection and are sequence charts illustrating a communication processing example by each device based on wireless communication. Specifically, an example of a setup procedure of a direct connection leading to a connection in a Wi-Fi direct standard (also referred to as Wi-Fi P2P) standardized in Wi-Fi alliance is shown.

Here, in the Wi-Fi direct, a plurality of wireless communication devices detects the existence of one another (device discovery and service discovery). Then, a direct connection is set up by performing device authentication in Wi-Fi protected setup (WPS) with a selected device when connection device selection is performed. In addition, in the Wi-Fi direct, a communication group is formed by determining a role of each of the plurality of wireless communication devices as a parent device (group owner) or a child device (client).

However, in this communication process example, some packet transmission and reception are omitted. For example, at the time of an initial connection, as described above, packet exchange for using the WPS is necessary, and packet exchange is necessary even in exchange of Authentication Request/Response or the like. However, in FIGS. 60 and 61, the illustration of these packet exchanges is omitted and only a connection from the second time is shown.

Also, although a communication process example between a first wireless communication device 1701 and a second wireless communication device 1702 is illustrated in FIGS. 60 and 61, the same is true for communication processes with other wireless communication devices.

Initially, the device discovery is performed between the first wireless communication device 1701 and the second wireless communication device 1702 (1711). For example, the first wireless communication device 1701 transmits a probe request (response request signal), and receives a probe response (response signal) for the probe request from the second wireless communication device 1702. Thereby, the first wireless communication device 1701 and the second wireless communication device 1702 can discover the location of each other. In addition, it is possible to acquire a device name or type (TV, PC, smartphone, or the like) of a partner by the device discovery.

Subsequently, the service discovery is performed between the first wireless communication device 1701 and the second wireless communication device 1702 (1712). For example, the first wireless communication device 1701 transmits a service discovery query for querying a service corresponding to the second wireless communication device 1702 discovered in the device discovery. Then, the first wireless communication device 1701 acquires the service corresponding to the second wireless communication device 1702 by receiving a service discovery response from the second wireless communication device 1702. That is, it is possible to acquire a partner-executable service or the like by the service discovery. The partner-executable service, for example, is a service, a protocol (digital living network alliance (DLNA)), a digital media renderer (DMR), or the like.

Subsequently, the user performs an operation (connection partner selection operation) of selecting a connection partner (1713). This connection partner selection operation occurs in only any one of the first wireless communication device 1701 and the second wireless communication device 1702. For example, a connection partner selection picture is displayed on the display section of the first wireless communication device 1701, and the second wireless communication device 1702 is selected as the connection partner in the connection partner selection picture according to the user operation.

When the user performs the connection partner selection operation (1713), group owner negotiation is performed between the first wireless communication device 1701 and the second wireless communication device 1702 (1714). In FIGS. 60 and 61, an example in which the first wireless communication device 1701 becomes a group owner 1715 and the second wireless communication device 1702 becomes a client 1716 according to a result of the group owner negotiation is illustrated.

Subsequently, processes 1717 to 1720 are performed between the first wireless communication device 1701 and the second wireless communication device 1702, so that a direct connection is set up. That is, association (L2 (second layer) link setup) 1717 and secure link setup 1718 are sequentially performed. In addition, IP address assignment 1719 and L4 setup 1720 on L3 by a simple service discovery protocol (SSD) or the like are sequentially performed. Also, L2 (layer 2) refers to a second layer (data link layer), L3 (layer 3) refers to a third layer (network layer), and L4 (layer 4) refers to a fourth layer (transport layer).

Subsequently, the user performs a designation or activation operation on a specific application and an activation operation (application designation/activation operation) (1721). This application designation/activation operation occurs in only any one of the first wireless communication device 1701 and the second wireless communication device 1702. For example, an application designation/activation operation picture is displayed on the display section of the first wireless communication device 1701, and the specific application is selected by the user operation in this application designation/activation operation picture.

When the user performs the application designation/activation operation (1721), the specific application corresponding to this application designation/activation operation is executed between the first wireless communication device 1701 and the second wireless communication device 1702 (1722).

Here, the case in which a connection between an access point (AP) and a station (STA) is set up within a range of specs (specs standardized in IEEE 802.11) before the Wi-Fi direct standard is assumed. In this case, before a connection is made in the second layer (before association in the terminology of IEEE 802.11), it is difficult to know what device is connected in advance.

On the other hand, as illustrated in FIGS. 60 and 61, in the Wi-Fi direct, it is possible to acquire information of a connection partner when a connection candidate partner is found in the device discovery or service discovery (option). The information of the connection partner, for example, is a basic type of device, a corresponding specific application, or the like. Then, it is possible to allow the user to select a connection partner based on the acquired information of the connection partner.

By extending this mechanism, a wireless communication system for designating a specific application before a connection is set up in the second layer, selecting a connection partner, and automatically activating a specific application after the selection can also be implemented. An example of a sequence leading to the connection of this case is illustrated in FIG. 63. In addition, a configuration example of a format of a frame to be transmitted and received in this communication process is illustrated in FIG. 62.

[Configuration Example of Frame Format]

Figure 62:
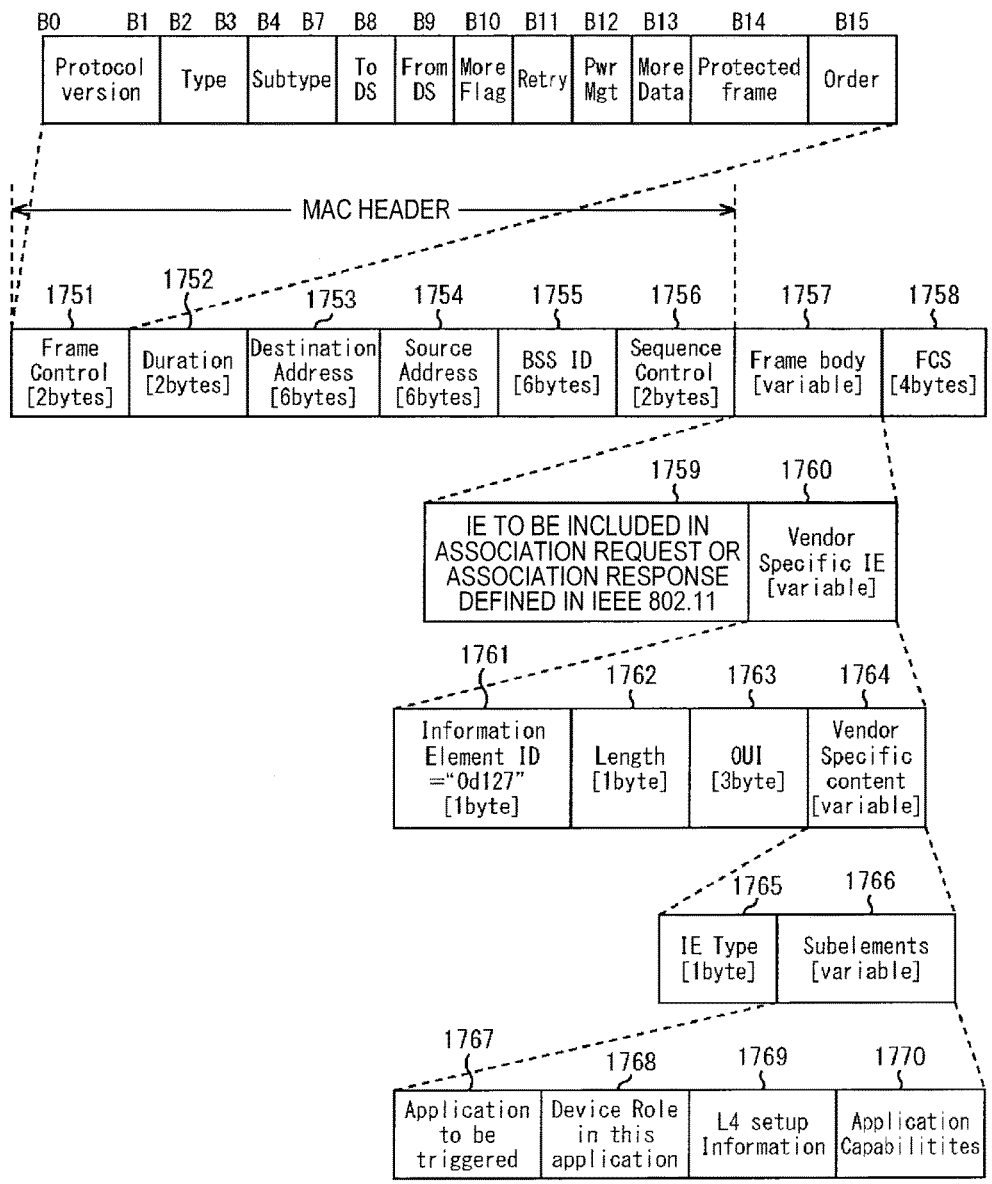
FIG. 62 is a diagram schematically illustrating a configuration example of a frame format to be transmitted and received in a communication process by each device of the wireless communication system.
Figure 63:
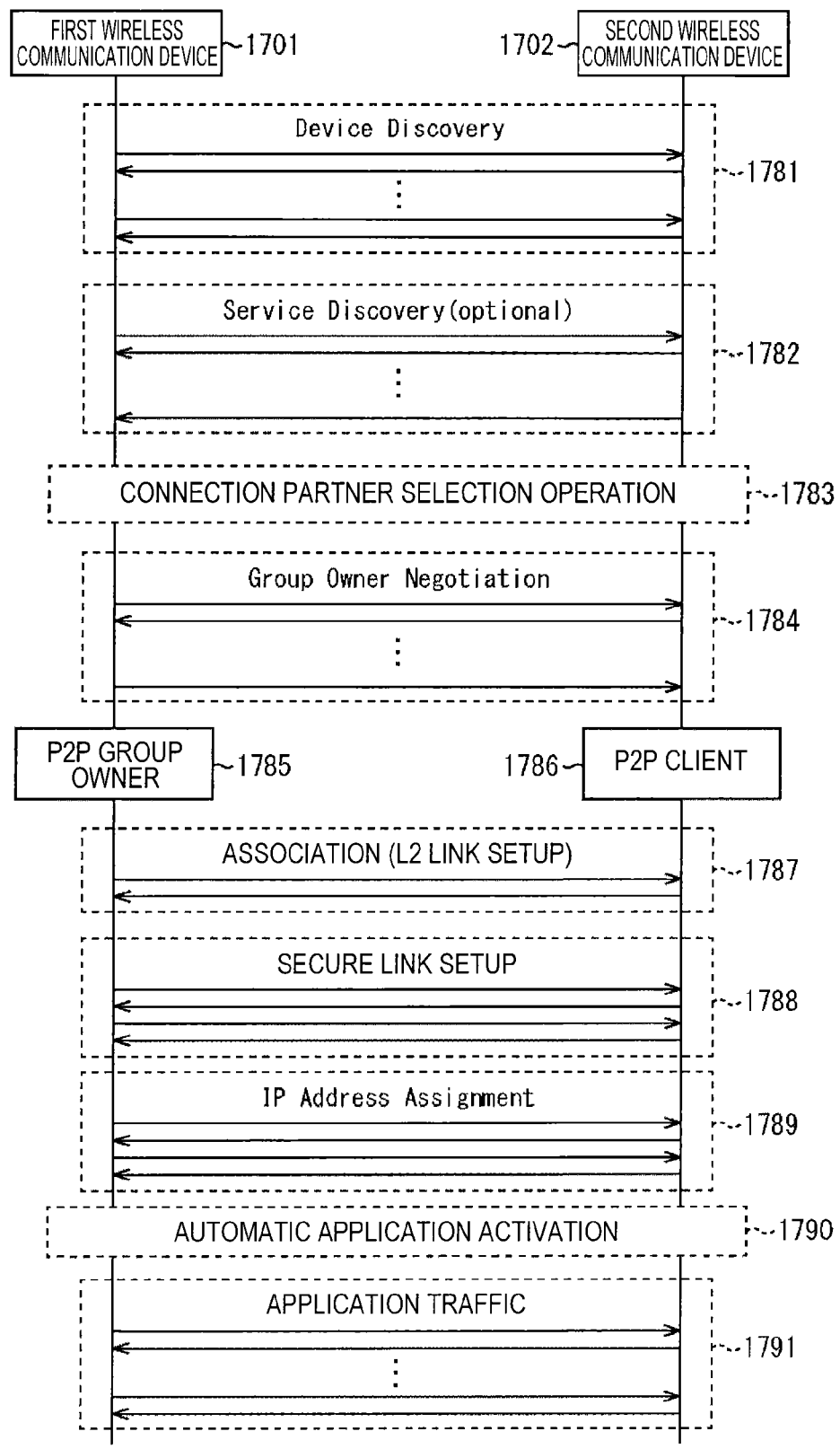
FIG. 63 is a sequence chart illustrating a communication process example by each device of the wireless communication system.

FIG. 62 is a diagram schematically illustrating a configuration example of a format of a frame to be transmitted and received in a communication process by each device used as the basis of the present technology. That is, in FIG. 62, a configuration example of a medium access control (MAC) frame for setting up the connection in the second layer is illustrated. Specifically, this is an example of a frame format of an association request/response 1787 for implementing the sequence illustrated in FIG. 63.

Also, fields from frame control 1751 to sequence control 1756 are a MAC header. In addition, when an association request is transmitted, B3B2="0b00" and B7B6B5B4="0b0000" are set in the frame control 1751. In addition, when an association response is encapsulated, B3B2="0b00" and B7B6B5B4="0b0001" are set in the frame control 1751. Also, "0b00" represents "00" in the binary notation, "0b0000" represents "0000" in the binary notation, and "0b0001" represents "0001" in the binary notation.

Here, the MAC frame illustrated in FIG. 62 is basically an association request/response frame format written in Sections 7.2.3.4 and 7.2.3.5 of IEEE 802.11-2007 specification document. However, the format is different in that an independently extended IE as well as an information element (hereinafter abbreviated as an IE) is included.

In addition, in order to indicate that there is a vendor specific IE 1760, 127 is set in decimal in an IE type 1761. In this case, according to Section 7.3.2.26 of the IEEE 802.11-2007 specification document, a length field 1762 and an organizationally unique identifier (OUI) field 1763 continue, and then vendor specific content 1764 is arranged.

As the content of the vendor specific content 1764, a field (IE type 1765) indicating a type of vendor specific IE is first provided. Then, thereafter, a plurality of subelements 1766 is configured to be stored.

As the content of the sub-element 1766, a name 1767 of a specific application to be used or a device role 1768 when the specific application operates is considered to be included. In addition, the specific application, information (information for L4 setup) 1769 such as a port number to be used for control, and information (capability information) related to capability is considered to be included. Here, for example, when a designated specific application is DLNA, the capability information is information for specifying correspondence to audio transmission/reproduction, correspondence to video transmission/reproduction, and the like.

In the wireless communication system of the above-described configuration, it is possible to obtain effects similar to those described above with reference to FIGS. 1 to 36 by applying the present technology as described above with reference to FIGS. 1 to 36. That is, it is possible to perform parallel processing of a base view image and a dependent image on the encoding side or the decoding side. In addition, because it is possible to limit the V direction of the inter-view MV by transmitting and receiving encoded data according to the present technology in the above-described wireless communication system, it is possible to perform parallel processing of a base view image and a dependent image on the encoding side or the decoding side.

Also, in the present description, an example in which various types of information such as search range limit information of an inter-view MV which is information related to a limit of the V direction of the search range of the inter-view MV is multiplexed in an encoded stream and transmitted from the encoding side to the decoding side has been described. However, a technique of transmitting the information is not limited to this example. For example, the information may be transmitted or recorded as individual data associated with an encoded bitstream without being multiplexed in the encoded stream. Here, the term "associate" refers to that an image included in the bitstream (which may be part of an image such a slice or a block) and information corresponding to the image is configured to be linked at the time of decoding. That is, the information may be transmitted on a separate transmission path from an image (or bitstream). In addition, the information may be recorded on a separate recording medium (or a separate recording area of the same recording medium) from the image (or bitstream). Further, the information and the image (or the bitstream), for example, may be associated with each other in an arbitrary unit such as a plurality of frames, one frame, or a portion within the frame.

In addition, although the case in which the encoding process is performed after the set search range limit information is set has been described above, any one may be first performed in the order. Further, in the encoding of image data, encoded search range limit information or search range limit information before encoding may be used.

The preferred embodiments of the present disclosure have been described above with reference to the accompanying drawings, whilst the present invention is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An image processing device including:

a reception section configured to receive an encoded stream set in syntax of the encoded stream in which motion vector (MV) range limit information is encoded in units in which image data have a hierarchical structure and the MV range limit information, the MV range limit information being information about a limit of a value of a vertical direction of an MV for referring to a view different from a view of a current block in an inter-view MV corresponding to the current block; and a decoding section configured to decode the encoded stream received by the reception section using the MV range limit information received by the reception section.

(2)

The image processing device according to (1), wherein the MV range limit information is a flag indicating that there is a limit of the vertical direction in a range of the inter-view MV.

(3)

The image processing device according to (1) or (2), wherein the MV range limit information is a value indicating a limit of a vertical positive direction of the range of the inter-view MV.

(4)

The image processing device according to (1) or (2), wherein a value of a limit of a vertical positive direction of the range of the inter-view MV is preset and is (largest coding unit (LCU) size—8).

(5)

The image processing device according to (1) or (2), wherein a value of a limit of a vertical positive direction of the range of the inter-view MV is preset and is (LCU size—4) when a loop filter is turned off.

(6)

The image processing device according to (1) or (2), wherein a value of a limit of a vertical positive direction of the range of the inter-view MV is determined according to vertical resolution of an image format.

(7)

The image processing device according to (1) or (2), wherein a value of a limit of a vertical positive direction of the range of the inter-view MV is determined according to a level.

(8)

The image processing device according to any one of (1) to (7), wherein the setting section sets the search range limit information in an SPS.

(9)

The image processing device according to any one of (1) to (7), wherein the MV range limit information is set in a video parameter set (VPS).

(10)

The image processing device according to any one of (1) to (7), wherein the MV range limit information is set in video usability information (VUI).

(11)

The image processing device according to any one of (1) to (10), wherein the decoding section decodes the MV range limit information received by the reception section, and decodes the encoded stream received by the reception section using the decoded MV range limit information.

(12)

An image processing method including:

receiving, by an image processing device, an encoded stream set in syntax of the encoded stream in which MV range limit information is encoded in units in which image data have a hierarchical structure and the MV range limit information, the MV range limit information being information about a limit of a value of a vertical direction of an MV for referring to a view different from a view of a current block in an inter-view MV corresponding to the current block; and decoding, by the image processing device, the received encoded stream using the received MV range limit information.

(13)

An image processing device including:

a setting section configured to set MV range limit information which is information about a limit of a value of a vertical direction of an MV for referring to a view different from a view of a current block in an inter-view MV corresponding to the current block in syntax of an encoded stream;

an encoding section configured to generate the encoded stream by encoding image data in units having a hierarchical structure using the MV range limit information set by the setting section; and a transmission section configured to transmit the encoded stream generated by the encoding section and the MV range limit information set by the setting section.

(14)

The image processing device according to (13), wherein the setting section sets a flag indicating that there is a limit of the vertical direction in a range of the inter-view MV as the MV range limit information.

(15)

The image processing device according to (13) or (14), wherein the setting section sets a value indicating the limit of the vertical positive direction in the range of the inter-view MV as the MV range limit information.

(16)

The image processing device according to (13) or (14), wherein a value of a limit of a vertical positive direction of the range of the inter-view MV is preset and is (LCU size—8).

(17)

The image processing device according to (13) or (14), wherein a value of a limit of a vertical positive direction of the range of the inter-view MV is preset and is (LCU size—4) when a loop filter is turned off.

(18)

The image processing device according to (13) or (14), wherein a value of a limit of a vertical positive direction of the range of the inter-view MV is determined according to vertical resolution of an image format.

(19)

The image processing device according to (13) or (14), wherein a value of a limit of a vertical positive direction of the range of the inter-view MV is determined according to a level.

(20)

The image processing device according to (13) or (14), wherein the setting section sets the MV range limit information in an SPS.

(21)

The image processing device according to (13) or (14), wherein the setting section sets the MV range limit information in a VPS.

(22)

The image processing device according to (13) or (14), wherein the setting section sets the MV range limit information in VUI.

(23)

The image processing device according to any one of (13) to (22), wherein the encoding section generates the encoded stream by encoding the MV range limit information set by the setting section and encoding the image data using the encoded MV range limit information.

(24)

An image processing method including:

setting, by an image processing device, MV range limit information which is information about a limit of a value of a vertical direction of an MV for referring to a view different from a view of a current block in an inter-view MV corresponding to the current block in syntax of an encoded stream;

generating, by the image processing device, the encoded stream by encoding image data in units having a hierarchical structure using the set MV range limit information; and transmitting, by the image processing device, the generated encoded stream and the set MV range limit information.

(25)
An image processing device including:
a reception section configured to receive an encoded stream set by a number of coding tree unit (CTU) lines in syntax of an encoded stream in which MV range limit information is encoded in units in which image data have a hierarchical structure and the MV range limit information, the MV range limit information being information about a limit of a value of a vertical direction of an MV for referring to a view different from a view of a current block in an inter-view MV corresponding to the current block; and
a decoding section configured to decode the encoded stream received by the reception section using the MV range limit information received by the reception section.

(26)
The image processing device according to (25), wherein the MV range limit information is set by the number of CTU lines of the vertical direction delayed from the different view.

(27)
The image processing device according to (25) or (26), wherein the number of CTU lines of the vertical direction is

[Math 3]

$$1<<(6-\mathrm{Log}_2\mathrm{CTUsize}) \qquad (3)$$

The image processing device according to any one of (25) to (27), wherein the MV range limit information is set in an SPS.

(29)
An image processing method including:
receiving, by an image processing device, an encoded stream set by a number of CTU lines in syntax of an encoded stream in which MV range limit information is encoded in units in which image data have a hierarchical structure and the MV range limit information, the MV range limit information being information about a limit of a value of a vertical direction of an MV for referring to a view different from a view of a current block in an inter-view MV corresponding to the current block; and
decoding, by the image processing device, the received encoded stream using the received MV range limit information.

(30)
An image processing device including:
a setting section configured to set MV range limit information by a number of CTU lines, the MV range limit information being information about a limit of a value of a vertical direction of an MV for referring to a view different from a view of a current block in an inter-view MV corresponding to the current block in syntax of an encoded stream;
an encoding section configured to generate the encoded stream by encoding image data in units having a hierarchical structure using the MV range limit information set by the setting section; and
a transmission section configured to transmit the encoded stream generated by the encoding section and the MV range limit information set by the setting section.

(31)
The image processing device according to (30), wherein the setting section sets the MV range limit information by the number of CTU lines of the vertical direction delayed from the different view.

(32)
The image processing device according to (30) or (31), wherein the number of CTU lines of the vertical direction is

[Math 3]

$$1<<(6-\mathrm{Log}_2\mathrm{CTUsize}) \qquad (3)$$

(33)
The image processing device according to any one of (30) to (32), wherein the setting section sets the MV range limit information in an SPS.

(34)
An image processing method including:
setting, by an image processing device, MV range limit information by a number of CTU lines, the MV range limit information being information about a limit of a value of a vertical direction of an MV for referring to a view different from a view of a current block in an inter-view MV corresponding to the current block in syntax of an encoded stream;
generating, by the image processing device, the encoded stream by encoding image data in units having a hierarchical structure using the set MV range limit information; and
transmitting, by the image processing device, the generated encoded stream and the set MV range limit information.

(35)
An image processing device including:
an encoding section configured to generate an encoded stream by encoding image data in units having a hierarchical structure using MV range limit information which is information about a limit of a value of a V direction of an MV for referring to a view different from a view of a current block in an inter-view MV corresponding to the current block; and
a transmission section configured to transmit the encoded stream generated by the encoding section.

(36)
The image processing device according to (35), wherein the MV range limit information is information indicating a limit in which the inter-view MV is 0 pixel.

(37)
The image processing device according to (35), wherein the MV range limit information is information indicating a limit in which the inter-view MV is one pixel or less.

(38)
The image processing device according to (35), wherein the MV range limit information is information indicating a limit in which the inter-view MV is X pixels or less.

REFERENCE SIGNS LIST 11 multi-view image encoding device
21 syntax encoding section
22 timing control section
23 base view encoding section
24 dependent view encoding section
25 DPB
26 transmission section
123 inter prediction section
211 multi-view image decoding device
221 reception section
222 syntax decoding section
223 timing control section
224 base view decoding section
225 dependent view decoding section
226 DPB
320 inter prediction section
322 cache

The invention claimed is:

1. An image processing device comprising:
   circuitry configured to:
   receive an encoded stream that includes syntaxes in which motion vector (MV) range limit information is encoded, the MV range limit information including a flag indicating whether an inter-view MV corresponding to a current block for referring to a view different from a view of the current block has a range limit in a vertical direction; and
   decode the received encoded stream based on the flag included in the MV range limit information,
   wherein a value indicating a limit of a range in a vertical positive direction for the inter-view MV is preset and is determined by subtracting 8 from a largest coding unit (LCU) size of the encoded stream, or by subtracting 4 from the LCU size of the encoded stream when a loop filter is turned off.

2. The image processing device according to claim 1, wherein the MV range limit information further includes the value indicating the limit of the range in the vertical positive direction for the inter-view MV.

3. The image processing device according to claim 1, wherein the MV range limit information is set in a sequence parameter set (SPS).

4. The image processing device according to claim 1, wherein the MV range limit information is set in a video parameter set (VPS).

5. The image processing device according to claim 1, wherein the MV range limit information is set in video usability information (VUI).

6. The image processing device according to claim 1, wherein the circuitry is further configured to decode the MV range limit information.

7. An image processing method comprising:
   receiving, by an image processing device, an encoded stream that includes syntaxes in which MV range limit information is encoded, the MV range limit information including a flag indicating whether an inter-view MV corresponding to a current block for referring to a view different from a view of the current block has a range limit in a vertical direction; and
   decoding, by the image processing device, the received encoded stream based on the flag included in the MV range limit information,
   wherein a value indicating a limit of a range in a vertical positive direction for the inter-view MV is preset and is determined by subtracting 8 from a largest coding unit (LCU) size of the encoded stream, or by subtracting 4 from the LCU size of the encoded stream when a loop filter is turned off.

8. The image processing method according to claim 7, wherein decoding the received encoded stream comprises:
   starting decoding first encoded data in the encoded stream to obtain a base view image; and
   when the flag indicates that the inter-view MV has the range limit in the vertical direction, starting decoding second encoded data in the encoded stream to obtain a dependent view image that is associated with the base view image before completion of decoding the first encoded data.

9. The image processing method according to claim 8, wherein decoding the received encoded stream further comprises:
   when the flag indicates that the inter-view MV does not have the range limit in the vertical direction, starting decoding the second encoded data in the encoded stream to obtain the dependent view image after the completion of decoding the first encoded data.

10. The image processing device according to claim 1, wherein the circuitry is further configured to:
    start decoding first encoded data in the encoded stream to obtain a base view image; and
    when the flag indicates that the inter-view MV has the range limit in the vertical direction, start decoding second encoded data in the encoded stream to obtain a dependent view image that is associated with the base view image before completion of decoding the first encoded data.

11. The image processing device according to claim 10, wherein the circuitry is further configured to:
    when the flag indicates that the inter-view MV does not have the range limit in the vertical direction, start decoding the second encoded data in the encoded stream to obtain the dependent view image after the completion of decoding the first encoded data.

12. The image processing device according to claim 1, wherein the range limit in the vertical direction is 56 samples.

13. The image processing method according to claim 7, wherein the range limit in the vertical direction is 56 samples.

* * * * *